US009691342B2

(12) United States Patent
Furihata et al.

(10) Patent No.: US 9,691,342 B2
(45) Date of Patent: Jun. 27, 2017

(54) DISPLAY DEVICE AND DISPLAY DEVICE DRIVER

(71) Applicant: Renesas Electronics Corporation, Kawasaki-shi, Kanagawa (JP)

(72) Inventors: Hirobumi Furihata, Kawasaki (JP); Takashi Nose, Kawasaki (JP)

(73) Assignee: RENESAS ELECTRONICS CORPORATION, Kawasaki-Shi, Kanagawa (JP)

(*) Notice: Subject to any disclaimer, the term of this patent is extended or adjusted under 35 U.S.C. 154(b) by 0 days.

(21) Appl. No.: 14/052,628

(22) Filed: Oct. 11, 2013

(65) Prior Publication Data

US 2014/0104249 A1 Apr. 17, 2014

(30) Foreign Application Priority Data

Oct. 16, 2012 (JP) ................................ 2012-229332

(51) Int. Cl.
*G06F 3/038* (2013.01)
*G09G 5/00* (2006.01)
(Continued)

(52) U.S. Cl.
CPC ............. *G09G 3/3674* (2013.01); *G09G 3/32* (2013.01); *G09G 3/3648* (2013.01);
(Continued)

(58) Field of Classification Search
CPC ........... H04N 19/00; G09G 2300/0413; G09G 2300/0452; G09G 2340/02;
(Continued)

(56) References Cited

U.S. PATENT DOCUMENTS 6,784,891 B2 8/2004 Inuzuka et al.
7,912,304 B2 3/2011 Furihata et al.
(Continued)

FOREIGN PATENT DOCUMENTS

JP 3-171116 A 7/1991
JP 2002-262243 A 9/2002
(Continued)

OTHER PUBLICATIONS

Japanese Office Action dated Jul. 5, 2016 with an English translation thereof.

(Continued)

*Primary Examiner* — Kumar Patel
*Assistant Examiner* — Insa Sadio
(74) *Attorney, Agent, or Firm* — McGinn IP Law Group, PLLC

(57) ABSTRACT

A display device includes a display device, a driver to drive the source line of the display device, and a control unit to compress image data and generate compression data, and supply transfer data containing compression data to the driver. The control unit includes a first sorter circuit to perform a sorting process on image data, and a compression circuit to perform a compression processing on a first sorted image data output from the sorter circuit and generate compression data. The compression processing performs different processing on image data of sub-pixels corresponding to different colors. The driver includes a decompression circuit to decompress compression data and generate decompression data, a second sorter circuit to perform the sorting process on the image data and generate a second sorted image data, and a display drive circuit to drive a source line in response to the second sorted image data.

20 Claims, 66 Drawing Sheets

(51) Int. Cl.
*G09G 3/36* (2006.01)
*G09G 3/32* (2016.01)

(52) U.S. Cl.
CPC ... *G09G 3/3688* (2013.01); *G09G 2300/0413* (2013.01); *G09G 2300/0452* (2013.01); *G09G 2340/02* (2013.01); *G09G 2370/08* (2013.01)

(58) Field of Classification Search
CPC .... G09G 2370/08; G09G 3/32; G09G 3/3648; G09G 3/3674; G09G 3/3688
USPC .......................................................... 345/211
See application file for complete search history.

(56) References Cited

U.S. PATENT DOCUMENTS 7,932,914 B1 * 4/2011 Geiss ..................... G09G 5/393 345/555
8,638,285 B2 1/2014 Nose et al.
2002/0118183 A1 8/2002 Inuzuka et al.
2005/0012754 A1 1/2005 Inuzuka et al.
2007/0147691 A1 * 6/2007 Ozaki ........................... 382/233
2009/0033604 A1 * 2/2009 Silzars ..................... G09G 3/30 345/84
2009/0231262 A1 * 9/2009 Kwon .................. G09G 3/3648 345/99
2009/0322713 A1 12/2009 Furihata et al.
2011/0242120 A1 * 10/2011 Akai et al. .................... 345/531
2012/0120043 A1 * 5/2012 Cho et al. ..................... 345/211
2012/0127188 A1 5/2012 Furihata et al.
2013/0141449 A1 6/2013 Furihata et al.

FOREIGN PATENT DOCUMENTS

JP 2003-111096 A 4/2003
JP 2010-11386 A 1/2010
JP 2010-286676 A 12/2010

OTHER PUBLICATIONS

Chinese Office Action dated Feb. 16, 2017 in Chinese Application No. 2013104827409 with an English translation thereof.

* cited by examiner

FIG. 23A

| | R | G | B |
|---|---|---|---|
| A | 10 | 5 | 15 |
| B | 10 | 5 | 15 |
| C | 10 | 5 | 15 |
| D | 10 | 5 | 15 |

FIG. 23B

| | R | G | B |
|---|---|---|---|
| A | 50 | 50 | 50 |
| B | 200 | 200 | 200 |
| C | 100 | 100 | 100 |
| D | 10 | 10 | 10 |

FIG. 23C

| | R | G | B |
|---|---|---|---|
| A | 50 | 5 | 5 |
| B | 200 | 5 | 5 |
| C | 100 | 5 | 5 |
| D | 10 | 5 | 5 |

FIG. 23D

| | R | G | B |
|---|---|---|---|
| A | 5 | 5 | 5 |
| B | 5 | 200 | 5 |
| C | 5 | 100 | 5 |
| D | 5 | 10 | 5 |

FIG. 23E

| | R | G | B |
|---|---|---|---|
| A | 5 | 5 | 50 |
| B | 5 | 5 | 200 |
| C | 5 | 5 | 100 |
| D | 5 | 5 | 10 |

FIG. 23F

| | R | G | B |
|---|---|---|---|
| A | 50 | 5 | 50 |
| B | 200 | 5 | 200 |
| C | 100 | 5 | 100 |
| D | 10 | 5 | 10 |

*FIG. 23G*

| | R | G | B |
|---|---|---|---|
| A | 50 | 50 | 5 |
| B | 200 | 200 | 5 |
| C | 100 | 100 | 5 |
| D | 10 | 10 | 5 |

*FIG. 23H*

| | R | G | B |
|---|---|---|---|
| A | 5 | 5 | 5 |
| B | 5 | 200 | 200 |
| C | 5 | 100 | 100 |
| D | 5 | 10 | 10 |

FIG. 25A (1×4) PIXEL COMPRESSION

| | R | G | B | α |
|---|---|---|---|---|
| A | 50 | 1 | 30 | 0 |
| B | 51 | 100 | 39 | 5 |
| C | 4 | 4 | 100 | 10 |
| D | 100 | 1 | 2 | 15 |

ADD α →

| PIXEL | R | G | B |
|---|---|---|---|
| A | 50 | 1 | 30 |
| B | 56 | 105 | 44 |
| C | 14 | 14 | 110 |
| D | 115 | 16 | 17 |

ROUNDING/ ROUND DOWN →

| | R | G | B |
|---|---|---|---|
| A | 3 | 0 | 2 |
| B | 4 | 7 | 3 |
| C | 1 | 1 | 7 |
| D | 7 | 1 | 1 |

ROUNDING/BIT ROUND DOWN: AFTER ADDING 16 ONLY TO B SUB-PIXEL OF PIXEL D, ROUND DOWN 5 BITS AND AFTER ADDING 8 TO THE OTHERS, ROUND DOWN 4 BITS

FIG. 25B (1×4) PIXEL DECOMPRESSION

| | R | G | B |
|---|---|---|---|
| A | 3 | 0 | 2 |
| B | 4 | 7 | 3 |
| C | 1 | 1 | 7 |
| D | 7 | 1 | 1 |

ROUND BIT UP →

| | R | G | B |
|---|---|---|---|
| A | 48 | 0 | 32 |
| B | 64 | 112 | 48 |
| C | 16 | 16 | 112 |
| D | 112 | 16 | 32 |

SUBTRACT α →

| | R | G | B |
|---|---|---|---|
| A | 48 | 0 | 32 |
| B | 59 | 107 | 43 |
| C | 6 | 6 | 102 |
| D | 97 | 1 | 17 |

ROUND BIT UP: ROUND UP ONLY 5 BITS OF B SUB-PIXEL OF PIXEL D,
ROUND UP OTHERS 4 BITS

FIG. 27A (2+1×2) PIXEL COMPRESSION

TARGET PIXEL DATA

| | R | G | B |
|---|---|---|---|
| A | 50 | 2 | 30 |
| B | 59 | 1 | 39 |
| C | 4 | 4 | 100 |
| D | 100 | 1 | 2 |

PIXELS A AND B: HIGH CORRELATION

| | R | G | B |
|---|---|---|---|
| A | 50 | 2 | 30 |
| B | 59 | 1 | 39 |
| (A+B+1)/2 | 55 | 2 | 35 |
| COMPARE WITH $\beta$ | LARGE | SMALL | – |
| WHICHEVER IS LARGE | B | – | – |

ADD $\alpha$ →

| R | G | B |
|---|---|---|
| 55 | 2 | 35 |

ROUNDING/ ROUND DOWN →

TYPICAL VALUE

| R | G | B |
|---|---|---|
| 7 | 1 | 4 |

| | R | G | B |
|---|---|---|---|
| C | 4 | 4 | 100 |
| D | 100 | 1 | 2 |

ADD $\alpha$ →

| | R | G | B |
|---|---|---|---|
| C | 14 | 14 | 110 |
| D | 115 | 16 | 17 |

ROUNDING/ ROUND DOWN →

| | R | G | B |
|---|---|---|---|
| C | 1 | 1 | 7 |
| D | 7 | 1 | 1 |

FIG. 27B (2+1×2) PIXEL DECOMPRESSION

TARGET COMPRESSION IMAGE DATA

| | R | G | B |
|---|---|---|---|
| TYPICAL VALUE | 7 | 1 | 4 |
| COMPARE WITH $\beta$ | LARGE | SMALL | – |
| WHICHEVER IS LARGE | B | – | – |

ROUND BIT UP →

| | R | G | B |
|---|---|---|---|
| | 56 | 4 | 32 |
| COMPARE WITH $\beta$ | LARGE | SMALL | – |
| WHICHEVER IS LARGE | B | – | – |

SUBTRACT $\alpha$ →

| | R | G | B |
|---|---|---|---|
| | 56 | 4 | 32 |
| COMPARE WITH $\beta$ | LARGE | SMALL | – |
| WHICHEVER IS LARGE | B | – | – |

±5 ACCORDING TO SIZE OF A AND B →

| | R | G | B |
|---|---|---|---|
| A | 51 | 4 | 32 |
| B | 61 | 4 | 32 |

| | R | G | B |
|---|---|---|---|
| C | 1 | 1 | 7 |
| D | 7 | 1 | 1 |

ROUND BIT UP →

| | R | G | B |
|---|---|---|---|
| C | 16 | 16 | 112 |
| D | 112 | 16 | 16 |

SUBTRACT $\alpha$ →

| | R | G | B |
|---|---|---|---|
| C | 6 | 6 | 102 |
| D | 97 | 1 | 1 |

FIG. 31A (4×1) PIXEL COMPRESSION

TARGET PIXEL DATA

| | R | G | B |
|---|---|---|---|
| A | 10 | 12 | 14 |
| B | 6 | 7 | 8 |
| C | 5 | 4 | 3 |
| D | 0 | 1 | 2 |

MATRIX PROCESSING →

| | Y | Cb | Cr |
|---|---|---|---|
| A | 48 | 2 | −2 |
| B | 28 | 1 | −1 |
| C | 16 | −1 | 1 |
| D | 4 | 1 | −1 |

→

PROCESSING OF Ymin, Ydist0, Ydist1, Ydist2 Cb', Cr'

FIG. 31B (4×1) PIXEL DECOMPRESSION

RESTORE $Y_A$ TO $Y_D$ →

| | Y | Cb' | Cr' |
|---|---|---|---|
| A | 48 | 1 | −1 |
| B | 28 | 1 | −1 |
| C | 16 | 1 | −1 |
| D | 4 | 1 | −1 |

MATRIX PROCESSING →

| | R | G | B |
|---|---|---|---|
| A | 11 | 12 | 13 |
| B | 6 | 7 | 8 |
| C | 3 | 4 | 5 |
| D | 0 | 1 | 2 |

FIG. 32

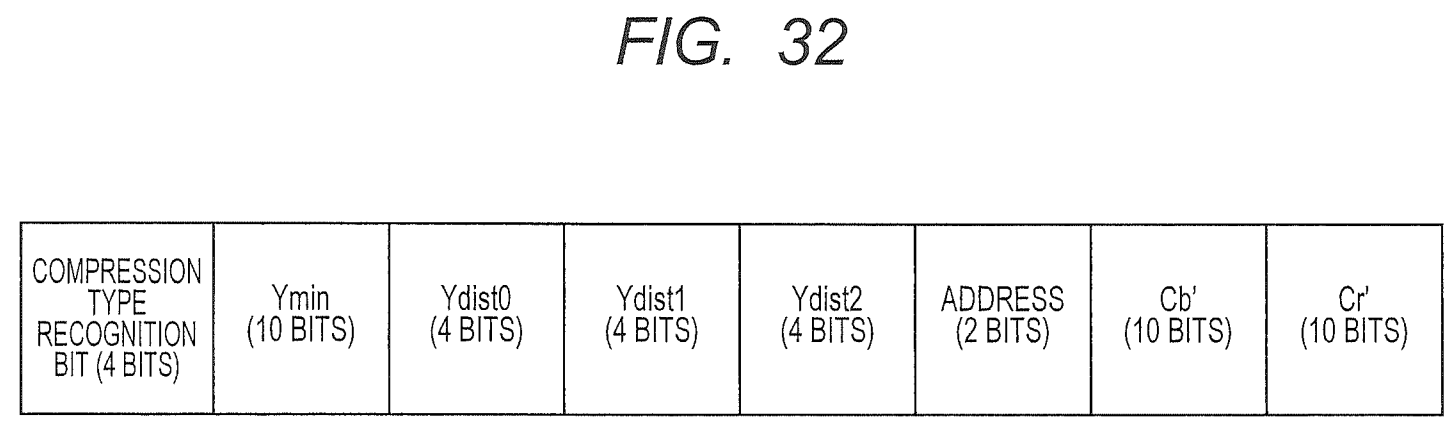

| | | | | | | | |
|---|---|---|---|---|---|---|---|
| COMPRESSION TYPE RECOGNITION BIT (4 BITS) | Ymin (10 BITS) | Ydist0 (4 BITS) | Ydist1 (4 BITS) | Ydist2 (4 BITS) | ADDRESS (2 BITS) | Cb' (10 BITS) | Cr' (10 BITS) |

*FIG. 33*

| | | X1X0 | | | |
|---|---|---|---|---|---|
| | | 00 | 01 | 10 | 11 |
| Y1Y0 | 00 | 15 | 05 | 01 | 11 |
| | 01 | 00 | 10 | 14 | 04 |
| | 10 | 07 | 09 | 13 | 02 |
| | 11 | 08 | 06 | 03 | 12 |

DISPLAY DEVICE AND DISPLAY DEVICE DRIVER

CROSS-REFERENCE TO RELATED APPLICATIONS

The disclosure of Japanese Patent Application No. 2012-229332 filed on Oct. 16, 2012 including the specification, drawings and abstract is incorporated herein by reference in its entirety.

BACKGROUND

The present invention relates to a display device and display device driver and relates in particular for example to technology ideal for transferring data to a display device driver.

In data transfer (typically, data transfer from a timing controller to display device driver) to a driver for driving a display device (for example a liquid crystal display panel or EL {electroluminescence} display panel), compressed image data is sent to a driver. Sending compressed image data to the display device driver can reduce EMI (electromagnetic interference) as well as the power consumption required for data transfer (compared to when transferring image data that was not compressed). Technology for sending compressed image data to a display device driver is disclosed for example in Japanese Unexamined Patent Application Publication No. 2010-11386 (patent document 1). Technology for sending compressed image data to display devices is disclosed for example in Japanese Unexamined Patent Application Publication No. 2002-262243 (patent document 2).

In compression of image data, the sensitivity of the human eye to light is utilized in order to improve the compression ratio and suppress deterioration in image quality. The human eye for example has high visual sensitivity to the color green so that by assigning more of the data to pixel data displaying green, a high data compression ratio can be obtained within minimal deterioration in image quality. Moreover, a characteristic of the human eye is sensitivity to changes in luminance more than changes in color so that by assigning more of the data to luminance information, a high data compression ratio can be achieved with minimal deterioration in image quality. The optical component of the color green contributes greatly to the luminance so the reader should be aware that there is no essential difference between the method that allocates many bits to the luminance information, and the method that allocates many bits to the green color image data.

SUMMARY

One problem perceived by the present inventors is that technology for transferring compressed image data compressed by processing utilizing color (chrominance) information to a display device driver as described in Japanese Unexamined Patent Application Publication No. 2010-11386 and Japanese Unexamined Patent Application Publication No. 2002-262243, cannot be applied when the pixel color placement is different on each line. Therefore, technology is needed that is capable of transferring data to a display device driver for driving a display device in which the pixel color placement is different on each line, while utilizing compression processing having minimal image quality deterioration and highly efficient in utilization of color information.

Other issues and novel features of the present invention will hereinafter be clarified while referring to the description of the present invention and the accompanying drawings.

In an embodiment of the present invention, the display device includes a display device containing a plurality of pixels including a plurality of sub-pixels corresponding to the respectively different colors, and a plurality of source lines, a driver to drive the source lines, and a control unit to compress the image data showing the sub-pixel levels to generate compression data, and supply transfer data containing the compression data to the driver. The control unit includes a first sorter circuit configured so as to perform a first sorting processing for sorting at least one of either the time sequence or the spatial sequence of data contained within the image data, and a compression circuit to perform compression processing the first sorted image data output from the sorter circuit and generate compression data. Compression processing here is the performing of different processing on image data from sub-pixels corresponding to different colors. The driver includes a decompression circuit to decompress the compression data contained in the transfer data to generate decompression data, a second sorter circuit configured so as to perform a second sorting processing for sorting at least one of either the time sequence or the spatial sequence of the decompression data to generate a second sorted image data, and a display drive circuit to drive a source line in response to the second sorted image data.

The above described embodiment is capable of transferring data to the display device driver to drive a display device whose color pixel placement is different on each line while utilizing compression processing having minimal image quality deterioration and highly efficient in utilization of color information.

BRIEF DESCRIPTION OF THE DRAWINGS

FIG. 23A is a drawing showing an example of a designated pattern implemented by lossless compression;

FIG. 23B is a drawing showing an example of a designated pattern implemented by lossless compression;

FIG. 23C is a drawing showing an example of a designated pattern implemented by lossless compression;

FIG. 23D is a drawing showing an example of a designated pattern implemented by lossless compression;

FIG. 23E is a drawing showing an example of a designated pattern implemented by lossless compression;

FIG. 23F is a drawing showing an example of a designated pattern implemented by lossless compression;

FIG. 23G is a drawing showing an example of a designated pattern implemented by lossless compression;

FIG. 23H is a drawing showing an example of a designated pattern implemented by lossless compression;

FIG. 25A is a concept view for describing (1×4) pixel compression;

FIG. 25B is a concept view for describing the decompression method for compression data compressed by (1×4) pixel compression;

FIG. 27A is a concept view for describing (2+1×2) pixel compression

FIG. 27B is a concept view for describing the decompression method for compression data compressed by (2+1×2) pixel compression;

FIG. 31A is a concept view for describing (4×1) pixel compression;

FIG. 31B is a concept view for describing the decompression method for compression data compressed by (4×1) pixel compression;

FIG. 32 is a drawing the (4×1) compression data format; and

FIG. 33 is a drawing showing the basic matrix utilized in generating the error data α.

DETAILED DESCRIPTION

The problems perceived by the present inventors are hereafter described in detail to allow an easy understanding of the technical significance of the present embodiment.

The technology as disclosed in Japanese Unexamined Patent Application Publication No. 2010-11386 and Japanese Unexamined Patent Application Publication No. 2002-262243 as described above for transferring image data compressed by compression processing using color (chrominance) information to a display device driver cannot for example be applied when the pixel color placement is different on each line. A structure for a display panel where the pixel color placement varies on each line is disclosed for example in Japanese Unexamined Patent Application Publication No. Hei3 (1991)-171116.

Figure 1:
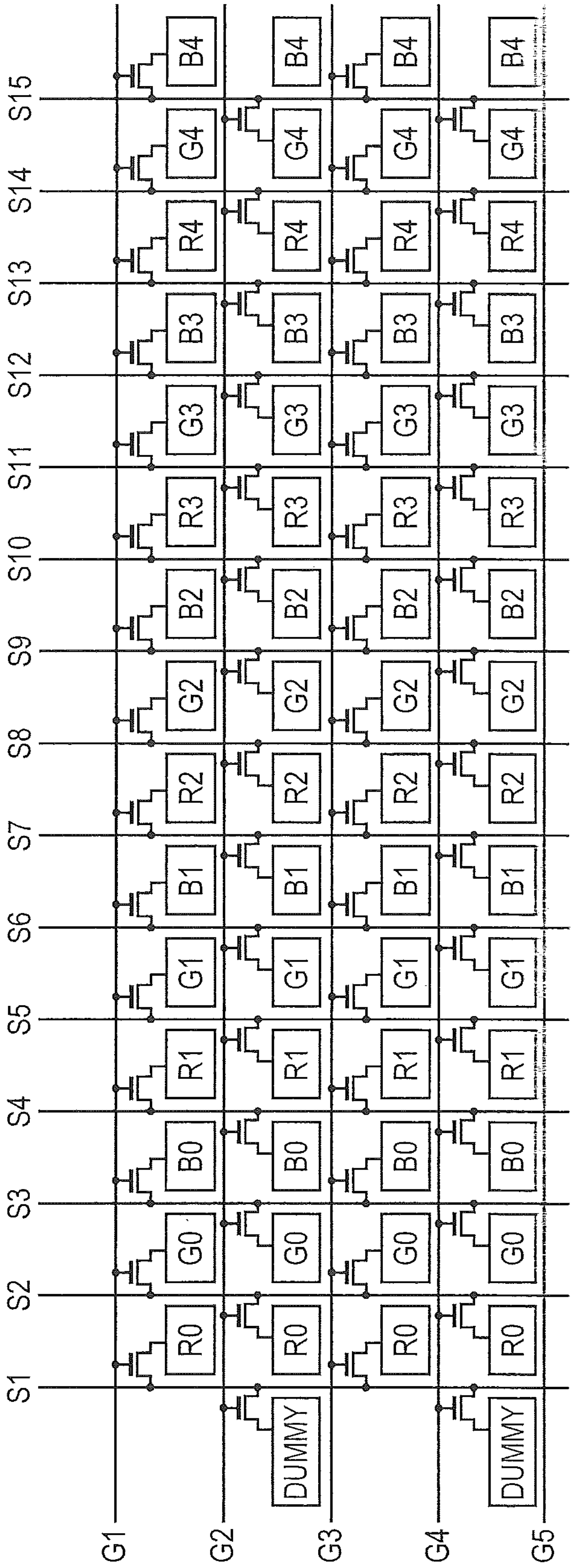
FIG. 1 is a drawing showing an example of the pixel color placement in a liquid crystal display panel.

More specifically, in a display panel utilizing a staggered placement as shown for example in FIG. 1, the positioning of the color of the sub-pixels that configure each pixel is different on any two adjacent lines. In the example in FIG. 1, each pixel is configured from the three pixels; R sub-pixel, G sub-pixel, and B sub-pixel. The three sub-pixels are connected to the same gate line (Gi). Here, the R sub-pixel is the sub-pixel corresponding to the red color (R). The G sub-pixel and the B sub-pixel in the same way are respectively sub-pixels corresponding to the green color (G) and corresponding to the blue color (B). Moreover, dummy sub-pixels (sub-pixels not actually contributing to the display) are coupled to the source line S1 on the left end, on the even-numbered gate lines (G2, G4, . . . ).

On the pixel lines coupled to the gate line G1 (first horizontal line) the source lines S1, S2, S3 are respectively coupled to the R sub-pixel, the G sub-pixel, and the B sub-pixel; and sub-pixels are also coupled in the same spatial sequence to the remaining source lines. On the other hand, on the pixel line (second horizontal line) coupled to the gate line G2, a dummy sub-pixel, the R sub-pixel, and the G sub-pixel are coupled to the source lines S1, S2, and S3. The B sub-pixels, R sub-pixels, and G sub-pixels are repetitively coupled in this spatial sequence to the remaining source lines.

In this type of example, to drive the sub-pixels on the first horizontal line, the R data, G data, and B data are sent to the drive circuit unit (circuit section for driving the source line) of the display device driver in this "sequence." Here, the R data is data showing the level or gradation level of the R sub-pixel, the G data and B data are in the same way respectively data for showing the level of the G sub-pixel and R sub-pixel. Moreover, the "sequence" referred to here, includes the meaning of both a time sequence and a spatial sequence. The drive circuit unit for example is a structure is in some cases a structure that loads (or takes in) image data one after another in each sub-pixel. In such cases, the R data is first sent to the drive circuit unit, the G data is sent next, and the B data is next sent, and thereafter, the R data, G data, and B data is sent to the drive circuit unit in the same time sequence. The drive circuit unit has an input node (input terminals) corresponding to the image data of the plurality of sub-pixels, and in some cases is structured so as to load the image data of the plurality of sub-pixels in parallel. The drive circuit unit may for example in some cases have an input node (or input terminal) to load the R data, and an input node to load the G data, and an input node to load the B data. In this type of case, the sequence that R data, G data, and B data is supplied to the drive circuit unit is supplied in that input node spatial sequence to the drive circuit section.

In driving the sub-pixels on the second horizontal line on the other hand, after sending the dummy data, the R data, and the G data in this sequence to the drive circuit unit, the B data, the R data, and the G data are repeatedly sent in this sequence to the drive circuit unit. The "sequence" as referred to here, also signifies both the time sequence and the spatial sequence.

According the evaluation made by the present inventors, implementing compression processing on image data used in the display on a display panel with this type of structure requires a special structure for the compression circuit and decompression circuit. If for example utilizing a compression circuit under the precondition that image data will be sent in the "sequence" of R data, G data, and B data, suitable compression processing is implemented on the first horizontal line however the image quality will deteriorate if the wrong type of compression processing is applied on the second horizontal line. In other words, B data (or dummy data) is supplied to the input of the compression circuit where R data is essentially supposed to be supplied, R data is supplied to the input where G data is essentially supposed to be supplied, and G data is supplied to the input where B data is essentially supposed to be supplied. The appropriate processing consequently is not applied to the image data for each color and the image quality deteriorates.

Hereafter the display device and display device driver structure for resolving these types of problems is proposed. More specifically, the display device of the following described embodiments is configured so as to be capable of sorting the "sequence" of image data input to the compression circuit and image data output from the decompression circuit. Technology is therefore provided by which deterioration in image quality due to incorrect compression processing can be prevented and data can be transferred to the display device driver for driving a display device such as where the pixel color placement is different on each line, while also utilizing compression processing that causes little image quality deterioration yet is highly efficient in utilizing color (chrominance) information.

First Embodiment (Overall Structure)

Figure 2A:
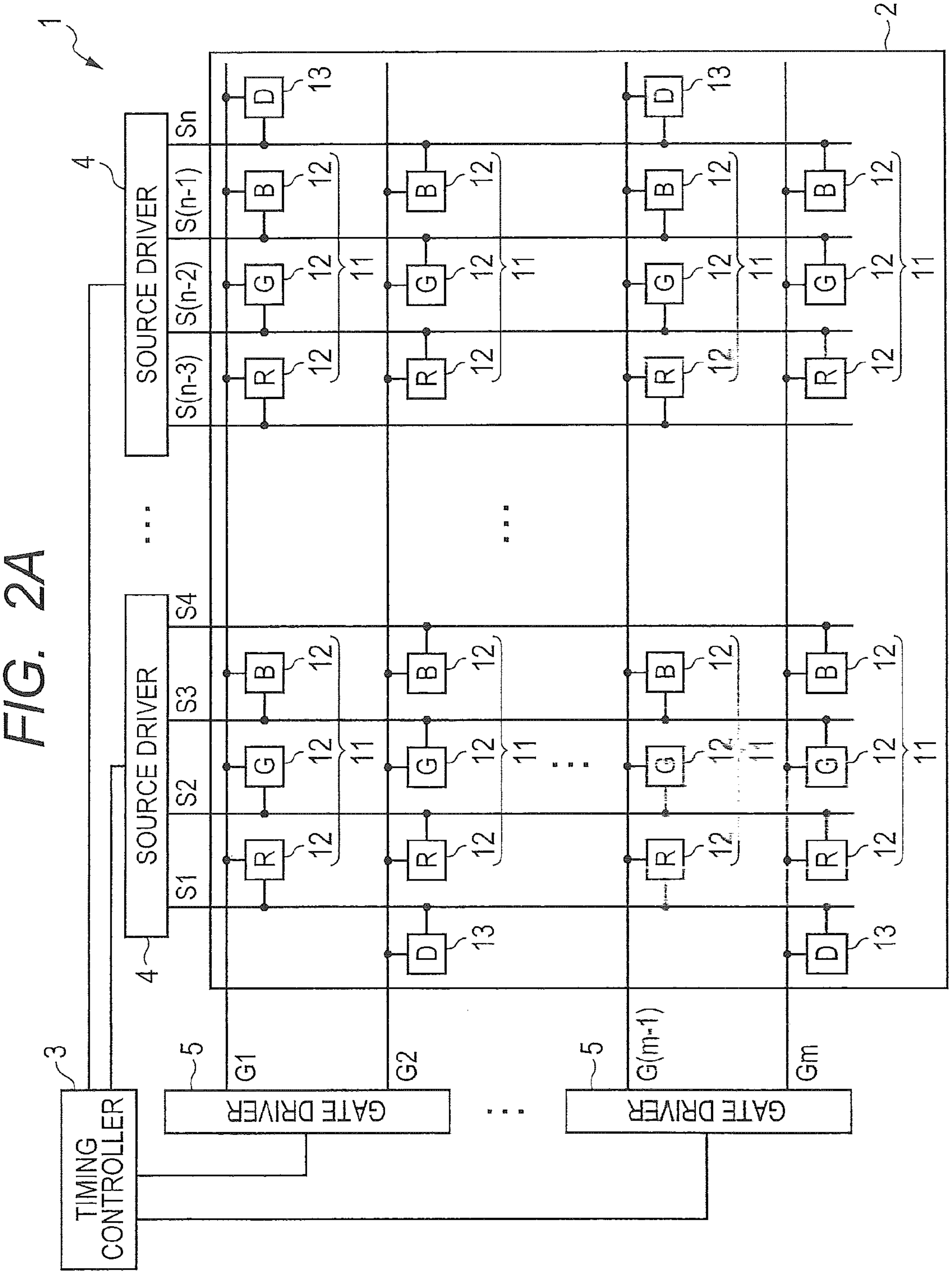
FIG. 2A is a block diagram showing the structure of the liquid crystal display device of the first embodiment.

FIG. 2A is a block diagram showing the structure of the display device of the first embodiment. The display device of the first embodiment is configured as a liquid crystal display device 1, which includes a liquid crystal display panel 2, and timing controller 3, and a plurality of source drivers 4, and a plurality of gate drivers 5.

The liquid crystal display panel 2 includes source lines S1 through Sn, gate lines G1 through Gm, and pixels 11 arrayed in matrix. Each pixel 11 includes three sub-pixels 12 coupled to the same gate line Gj. One among the three sub-pixels 12 is an R sub-pixel corresponding to the red color (R), another one is a G sub-pixel corresponding to the green color (G), and the remaining sub-pixel is a B sub-pixel corresponding to the blue color (B). Each of the sub-pixels 12 is formed at a position intersecting the corresponding gate line and source line.

Figure 2B:
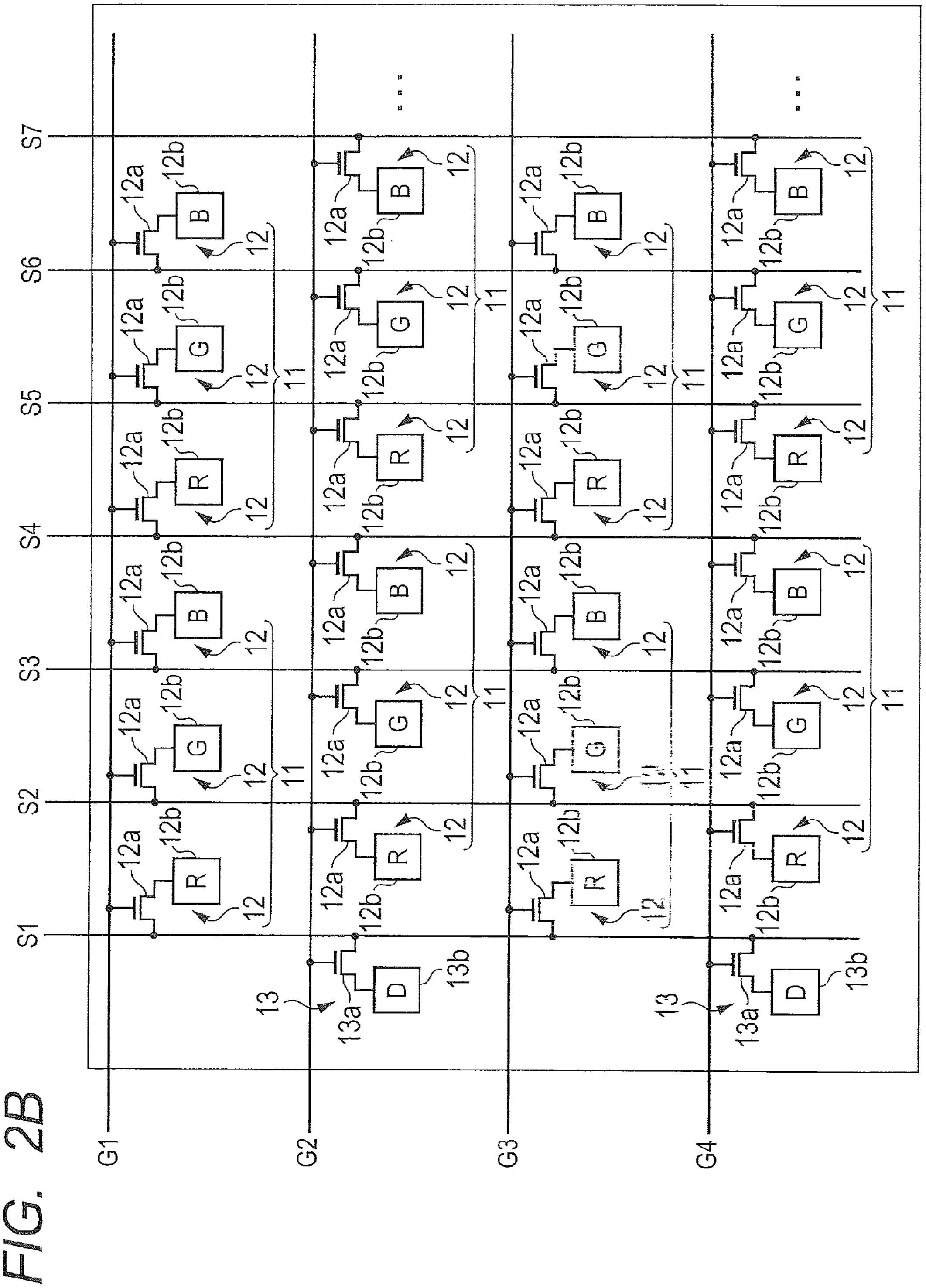
FIG. 2B is a drawing showing the structure of each pixel in the liquid crystal display panel.

FIG. 2B is a drawing showing the structure of the liquid crystal display panel 2 in the present embodiment, and in particular showing the structure of each sub-pixel 12. Each sub-pixel 12 includes a TFT (thin film transistor) 12*a* and a pixel electrode 12*b*. The source of the TFT12*a* is coupled to the corresponding source line Si, the gate of the TFT12*a* is coupled to the corresponding gate line Gj, and the drain of the TFT12*a* is coupled to the pixel electrode 12*b*. The pixel electrode 12*b* is formed facing the opposing electrode (not shown in drawing); and a liquid crystal capacity filled with liquid crystal is formed between the pixel electrode 12*b* and the opposing electrode. The quantity of light passing through the liquid crystal capacity varies depends on the voltage across the pixel electrode 12*b* and the opposing electrode, and the desired level (gradation) in each sub-pixel 12 is attained in this way.

Returning now to FIG. 2A, the timing controller 3 supplies control data (such as horizontal synchronizing signals, vertical synchronizing signals, or control commands) and control signals for controlling the operation timing of the source driver 4 and gate driver 5 to the source driver 4 and the gate driver 5. Moreover, the timing controller 3 supplies image data (data showing the levels of each sub-pixel of each pixel 11) that should be displayed on the source driver 4.

The source driver 4 drives the source lines S1 through Sn of the liquid crystal display panel 2 in response to the control signals, control data, and image data supplied from the timing controller 3. In the present embodiment, the plural source drivers 4 are utilized to drive the source lines S1 through Sn of the liquid crystal display panel 2. The gate driver 5 drives the gate lines G1 through Gm of the liquid crystal display panel 2 in response to the control signal supplied from the timing controller 3.

Figure 3:
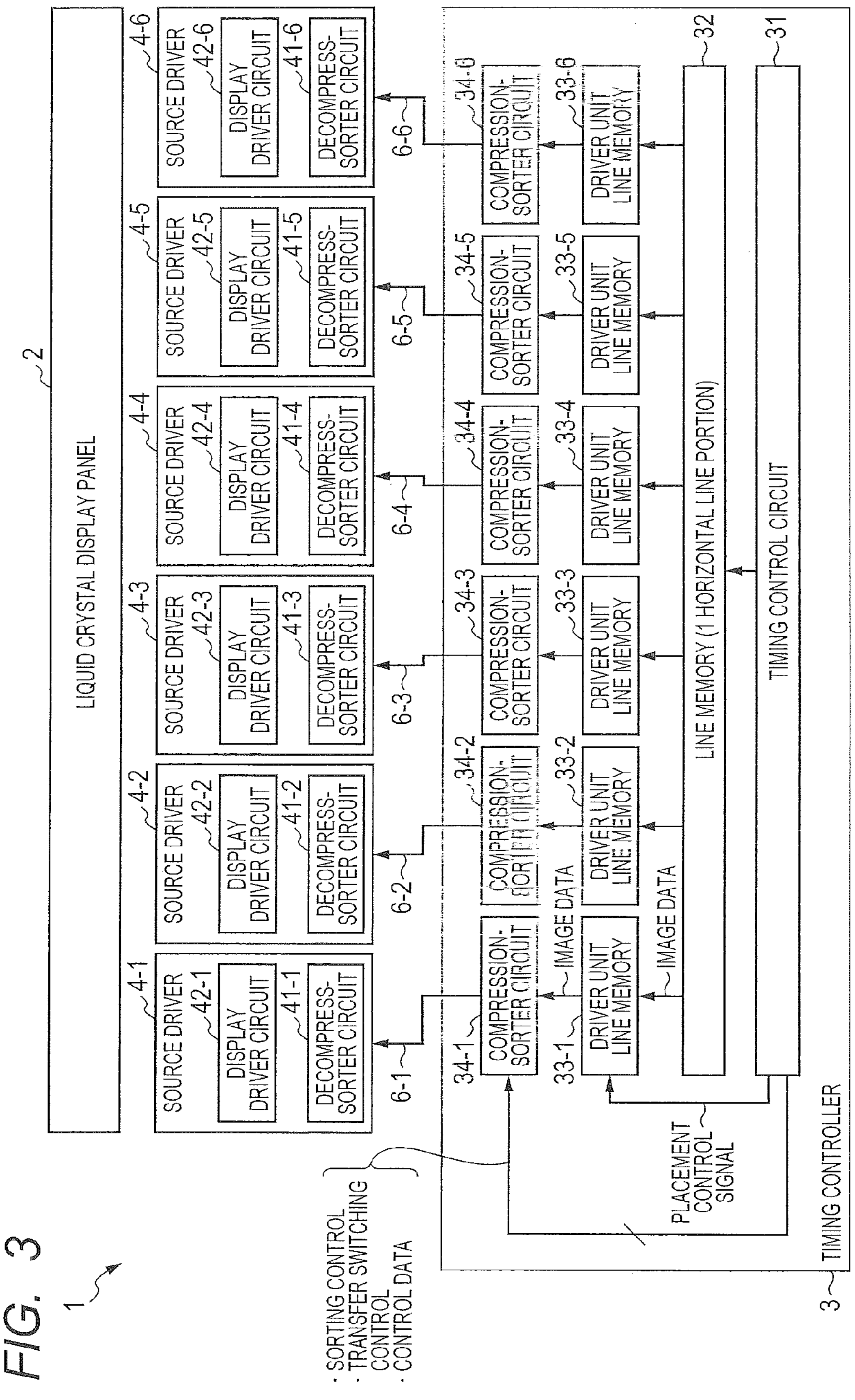
FIG. 3 is a block diagram showing the structure of the timing controller and the source driver in the first embodiment.

FIG. 3 is a block diagram showing an example of the structure of the timing controller 3 and the source driver 4 in the present embodiment. FIG. 3 shows the structure of the case where the number of source drivers 4 is six. However, the number of source drivers 4 is not limited to six.

The timing controller 3 includes a timing control circuit 31, a line memory 32, and the driver unit line memories 33-1 through 33-6, and compression-sorter circuits 34-1 through 34-6. The timing control circuit 31 controls each circuit of the timing controller 3 and the source driver 4. More specifically, the timing control circuit 31 supplies position control signals to the driver unit line memories 33-1 through 33-6, and supplies sorting control signals, transfer switching control signals, and control data to the compression-sorter circuits 34-1 through 34-6. The tasks performed by the position control signals, sorting control signals, transfer switching control signals, and control data are described later on.

The line memory 32 loads video data from an external source and temporarily stores that data. The line memory 32 contains a capacity for storing the image data corresponding to the pixel 11 (pixel 11 coupled to one gate line) of one horizontal line of the liquid crystal display panel 2.

The driver unit line memories 33-1 through 33-6 respectively load and store image data from the line memory 32 that should be sent to the source drivers 4-1 through 4-6. The position control signal controls what section of the image data stored in the line memory 32 that the driver unit line memories 33-1 through 33-6 will load.

The compression-sorter circuits 34-1 through 34-6 respectively load (take in) image data from the driver unit line memories 33-1 through 33-6, and generate the transfer data 6-1 through 6-6 transferred to the source drivers 4-1 through 4-6. More specifically, the compression-sorter circuits 34-1 through 34-6 respectively contain a function to perform compression processing on the image data loaded from the driver unit line memories 33-1 through 33-6 to generate the compression data, and assemble that compression data into the transfer data 6-1 through 6-6 and transfer that data to the source drivers 4-1 through 4-6. The transfer data 6-1 through 6-6 transferred to the source drivers 4-1 through 4-6 also contains control data supplied from the timing control circuit 31, and the operation of the source drivers 4-1 through 4-6 is controlled by that control data.

In the present embodiment, the reader should be aware that each of the source drivers 4-1 through 4-6 and the timing controller 3 is coupled in a peer-to-peer relation.

The compression-sorter circuits 34-1 through 34-6 that generate the transfer data 6-1 through 6-6, contain a function to sort (rearrange) the time sequence and/or spatial sequence of the image data loaded from the driver unit line memories 33-1 through 33-6. The image data loaded from the driver unit line memories 33-1 through 33-6 is input to the compression-sorter circuits 34-1 through 34-6 in a time sequence or a spatial sequence according to the color placement of the sub-pixel 12 in the liquid crystal display panel 2. The compression-sorter circuits 34-1 through 34-6 perform "sorting" of the image data so as to match the compression circuit inputs contained there. By "sorting" this image data, the image data for a sub-pixel 12 of a suitable color can be input to the compression circuit at an appropriate timing. R data (image data showing R sub-pixel levels) for example in the compression circuit is input at an input terminal and/or timing where the R data should be input. In the same way, G data is input at an input terminal and/or timing where the G data should be input; and B data is input at an input terminal and/or timing where the B data should be input. The structure and operation of the compression-sorter circuits 34-1 through 34-6 for "sorting" is described later on in detail.

The source drivers 4-1 through 4-6 each contain a decompress-sorter circuit 41 and display driver circuit 42. Here, FIG. 3 shows the decompress-sorter circuit 41 contained in the source driver 4-i with the reference symbol 41-i, and the display driver circuit 42 contained in the source driver 4-i with the reference symbol 42-i.

The decompress-sorter circuit 41-i, generates decompression data to implement decompression processing on the compression data contained in the transfer data 6-i loaded from the compression-sorter circuit 34-i. The decompress-sorter circuit 41-i moreover performs "sorting" or rearranging of that decompression data to match the color placement of the sub-pixel 12 in the liquid crystal display panel 2. The "sorting" in the decompress-sorter circuit 41-i is basically for restoring the image data loaded from the driver unit line memories 33-1 through 33-6. The display driver circuit 42-i drives the source lines assigned to the source driver 4-i in response to the decompression data that was "sorted."

Here, the reader should be aware that in the present embodiment, the compression-sorter circuits 34-1 through 34-6 that generate the transfer data 6-1 through 6-6 and the source drivers 4-1 through 4-6 correspond in a one-to-one relation.

(Structure of the Compression-Sorter Circuit and Decompression Sorter Circuit)

Figure 4A:
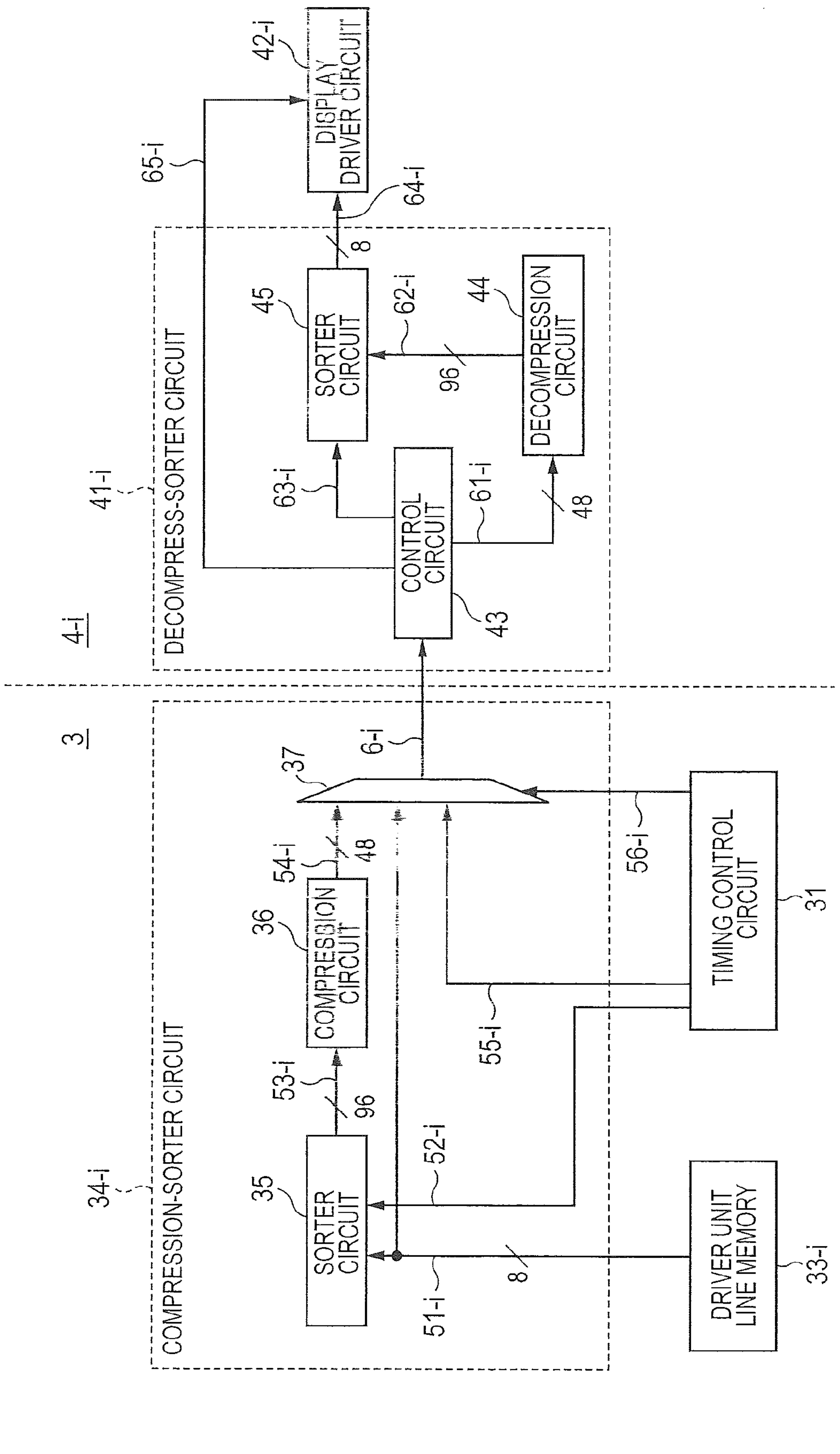
FIG. 4A is a block diagram showing an example of the structure of the compression-sorter circuit and decompression-sorter circuit in the first embodiment.

FIG. 4A is a block diagram showing a structure of each compression-sorter circuit 34-i and each decompression-sorter circuit 41-i. The compression-sorter circuit 34-i contains a sorter circuit 35, a compression circuit 36, and a transfer data output circuit 37. The sorter circuit 35 implements "sorting" processing on the image data (shown by reference numeral 51-i in FIG. 4A) loaded from the driver unit line memories 33-i, and supplies the sorted image data 53-i obtained from this "sorting" processing to the compression circuit 36. In this "sorting" processing, the "sequence" of the R data (data showing the level of the R sub-pixel), the G data, and the B data contained in the image data 51-i is sorted as needed. This "sorting" processing is implemented according to the sorting control signal 52-i that is sent from the timing control circuit 31. More specifically, the timing control circuit 31 generates a sorting control signal 52-i that instructs performing the "sorting" processing contents according to the color placement of the pixel 11 (for example, the spatial sequence of the R sub-pixel, the G sub-pixel, and the B sub-pixel in each pixel 11) and the placement of the pixel 11 (display position) corresponding to the image data sent to the sorter circuit 35 from the driver unit line memories 33-i. The sorter circuit 35 implements "sorting" processing according to this sorting control signal 52-i.

The compression circuit 36 performs compression processing on the sorted image data 53-i to generate compression data 54-i. The compression circuit 36 is structured so as to compress the sorted image data 53-i of the plurality of pixels 11 or more specifically, in the present embodiment collectively compresses the sorted image data 53-i corresponding to the four pixels 11. The compression circuit further is structured so as to implement different processing according to the color of the sub-pixel 12. Namely, the compression processing in the compression circuit 36 is performed differently among the image data of the R sub-pixel, image data of the G sub-pixel, and image data of the B sub-pixel.

The compression processing within the compression circuit 36 may also be implemented for example according the YUV method or more specifically the YUV420 method. In the YUV420 method, the luminance data Y, and color difference data Cb and Cr are calculated for each pixel 11. The following formulas (1a) through (1c) are general formula utilized to calculate the luminance data Y, and color difference data Cb and Cr for each pixel 11 (the reader should be aware that there are actually all manner of variations): $Y=0.2989\times R+0.5866\times G+0.1145\times B$ . . . (1a) $Cb=-0.168\times R-0.3312\times G+0.5000\times B$ . . . (1b) $Cr=0.5000\times R-0.4183\times G-0.0816\times B$ . . . (1c). Here, R, G, and B are the respective level (gradation) values shown in the image data for the R sub-pixel, the G sub-pixel, and the B sub-pixel.

The YUV420 method is one type of block compression that processes in units of four pixels. In the YUV420 method, the respective luminance data Y for the four pixels, the average value of the color difference data Cb for the four pixels, and the average value of the color difference data Cr for the four pixels are contained in the compression data. In this method, information is lost when calculating the color difference data Cb, Cr since the average value of the color difference data Cb, Cr is not maintained, causing the image quality to deteriorate. In other words, the YUV420 method is not lossless compression. On the other hand, information is retained unchanged when calculating the luminance data Y so deterioration in image quality does not occur.

As can be understood from formula (1a), the G sub-pixel image data takes up a large percentage in the luminance data Y and to state in other words, there is little deterioration in the G sub-pixel image data. The B sub-pixel image data on the other hand takes up a small percentage in the luminance data Y or stated in other words, there is large deterioration in the B sub-pixel image data. Therefore in the YUV420 method the amount of information lost among the respective R sub-pixels, G sub-pixels, and B sub-pixels will vary among the R sub-pixels, G sub-pixels, and B sub-pixels. This loss in the amount of information signifies that unless image data (G data) corresponding to the G sub-pixels is input to the corresponding G sub-pixel of compression circuit 36, there will be large deterioration in image data in the G sub-pixel, and consequently the image quality will deteriorate.

In the present embodiment, the sorter circuit 35 performed "sorting" processing of the image data 51-i input to match the color placement of sub-pixel 12 in the liquid crystal display panel 2. The sorted image data 53-i obtained as a result of this "sorting" processing is input to the compressor circuit 36 so that deterioration in image quality can be suppressed.

Other types of block compression may be utilized as the compression processing implemented by the compression circuit 36. Preferred types of block compression implemented by the compression circuit 36 are described later on in detail.

Figure 5:
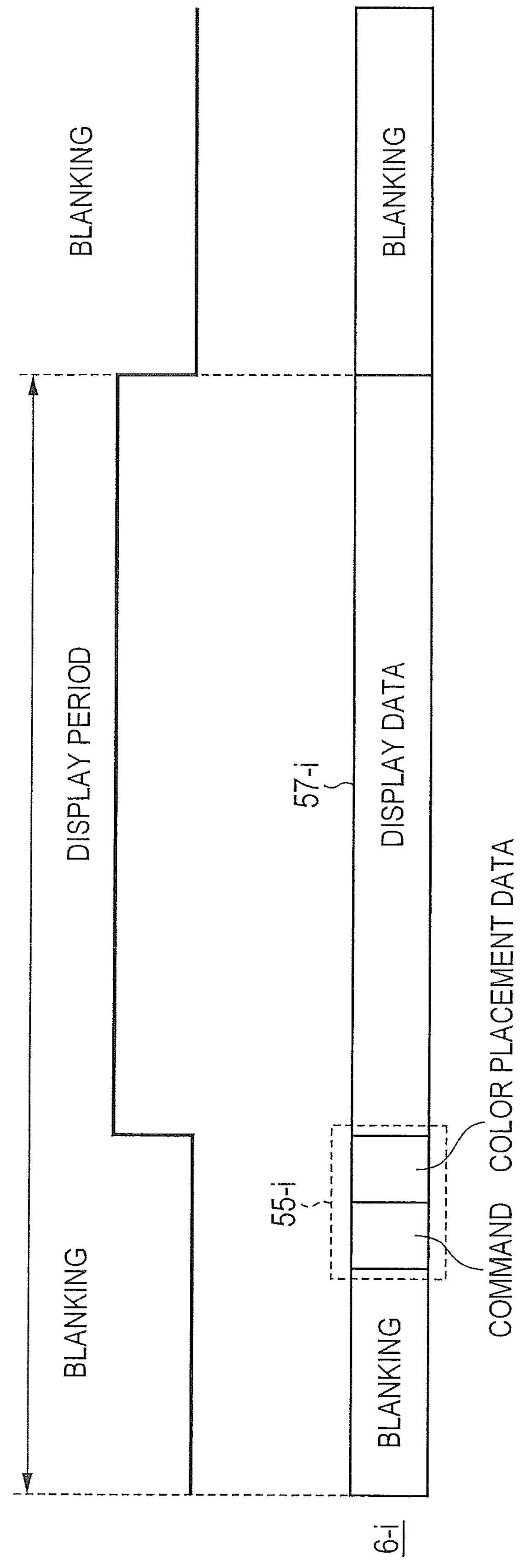
FIG. 5 is a drawing showing an example of the transfer data format.

The transfer data output circuit 37 loads the compression data 54-i from the compression circuit 36, loads the control data 55-i from the timing control circuit 31, and generates the transfer data 6-i. FIG. 5 is a drawing showing the format of the transfer data 6-i. Each horizontal synchronizing period contains a blanking period and a display period following that blanking period.

The blanking period is an interval where no driving of the source lines S1 through Sn of liquid crystal display panel 2 is performed, and the control data 55-i is sent during this blanking period. The control data 55-i contains color placement data, and a variety of control commands used in order to control the source driver 4-i. The color placement data is data corresponding to the color placement of the sub-pixel 12 in the liquid crystal display panel 2; and that shows a description of the "sorting" processing implemented by the sorter circuit 35. The color placement data as described later on, is data showing the content of the "sorting" processing that should be performed by the decompress-sorter circuit 41-i.

The display period is a period where no driving of the source lines S1 through Sn of the liquid crystal display panel is performed, and the display data 57-i is sent in this display period. Either of the compression data 54-i and (non-compression) image data 51-i is sent as the display data 57-i. During normal operation for example, the compression data 54-i is sent to the source driver 4-i as the display data 57-i, and during inspections on the other hand, the image data 54-i is sent as the display data 57-i in special applications such as inspections. The transfer switching control signal 56-i sent from the timing control circuit 31 switches according to whether using the compression data 54-i or the (non-compression) display data 57-i as the display data 57-i.

Returning to FIG. 4A, the decompress-sorter circuit 41-i includes the control circuit 43, and the decompression circuit 44, and the sorter circuit 45. The control circuit 43 controls each circuit of the source driver 4-i in response to the control data 55-i contained in the transfer data 6-i. More specifically, the control circuit 43 generates driver operation control signals 65-i to control the operation of the display driver circuit 42-i in response to the control commands contained in the control data 55-i. The control circuit 43 also generates the sorting control signals 63-i from the color placement data contained in the control data 55-i, and supplies the sorting control signals 63-i to the sorter circuit 45. The sorting control signals 63-i are signals to control the "sorting" processing in the sorter circuit 45. The control circuit 43 also extracts compression data from the transfer data 6-i and supplies that compression data to the decompression circuit 44. FIG. 4A shows the compression data extracted from the transfer data 6-i by way of the reference numeral 61-i.

The decompression circuit 44 implements decompression processing of the compression data 61-i, and generates the decompression data 62-i. The decompression circuit 44 sends the decompression data 62-i to the sorter circuit 45.

The sorter circuit 45 implements "sorting" processing on the decompression data taken from the decompression circuit 44 and supplies the sorted image data 64-i obtained from the "sorting" processing to the display driver circuit 42-i. In this "sorting" processing, the "sequence" of the R data, G data, and B data contained in the decompression data 62-i is sorted as necessary. The "sorting" processing is implemented when the sorting control signals 63-i are sent from the control circuit 43. The sorting control signals 63-i as described above, are generated from the color placement data contained in the transfer data 6-i. The color placement data referred to here is data showing the contents of the "sorting" processing that should be implemented in the decompress-sorter circuit 41-i and is generated according to the contents of the "sorting" processing implemented by the sorter circuit 35 of the compression-sorter circuit 34-i. The display driver circuit 42-i drives the source lines assigned to the source drivers 4-i in response to the sorted image data 64-i.

The R data, G data, and B data contained in the decompression data 62-i and the image data 51-i are sorted as necessary in the "sorting" processing implemented by the sorter circuit 45 of the decompress-sorter circuit 41-i and the sorter circuit 35 of the compression-sorter circuit 34-i as was described above. The "sorting" referred to here, signifies at least one of the interchanging of the time sequence that the R data, G data, B data are input, and the interchanging of the spatial sequence of nodes where the R data, G data, and B data are transferred.

Figure 4B:
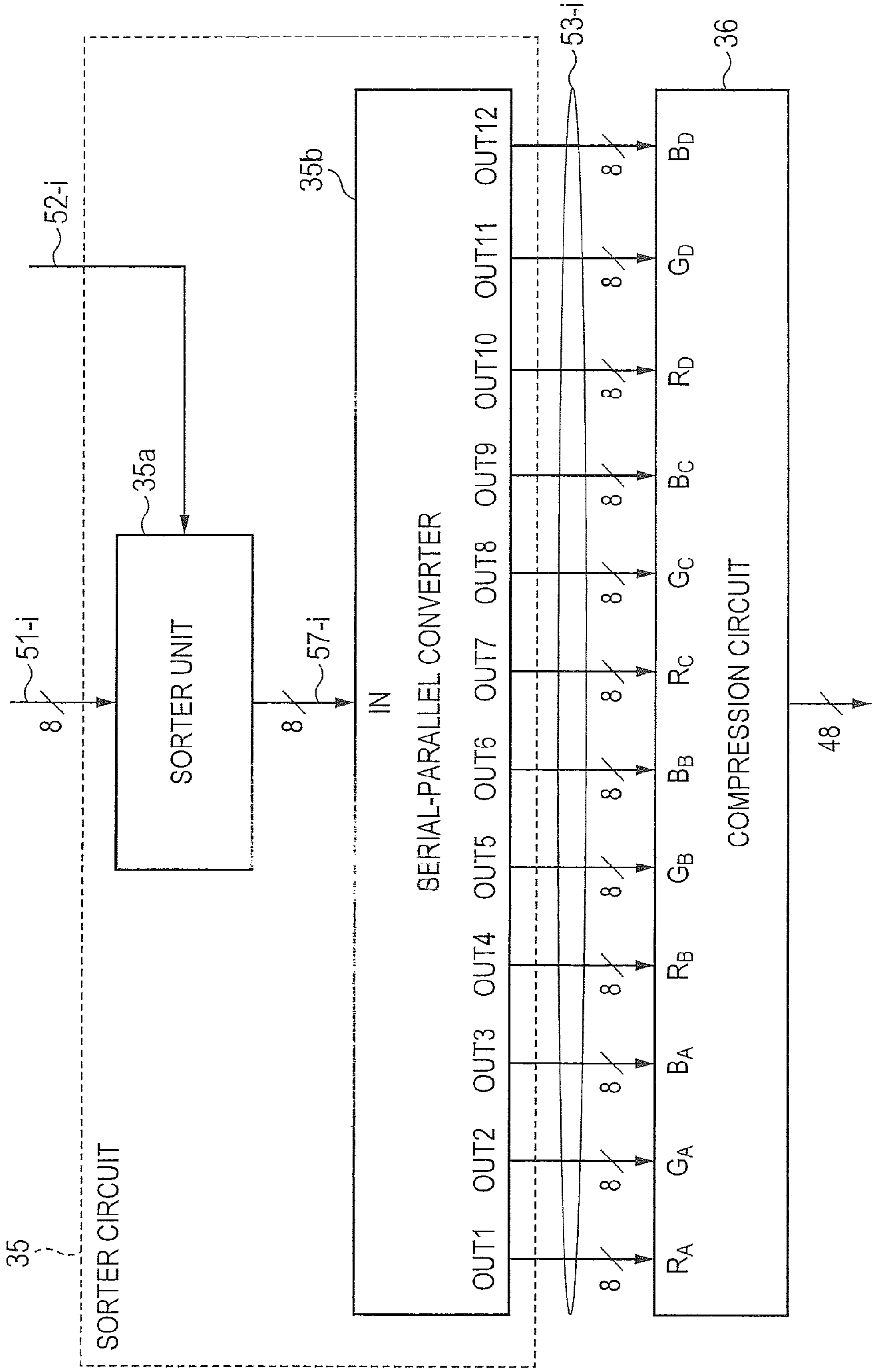
FIG. 4B is a block diagram showing an example of the structure of the sorter circuit and compression circuit in the compression-sorter circuit.

FIG. 4B is a block diagram showing an example of the structure of the compression circuit 36 and the sorter circuit 35 of compression-sorter circuit 34-i. This diagram shows an example of the structure when utilizing a sorter circuit 35 such as for interchanging the time sequence that the R data, G data, B data are input. In the structure in FIG. 4B, the R data, G data, and B data of the image data 51-i are all 8 bits, and the image data 51-i is input to the sorter circuit 35 as an 8 bit signal. Restated in other words, the four pixels 11 for the R data, G data, and B data are supplied one after another to the sorter circuit 35, and the sorter circuit 35 loads the image data 51-i as the sub-pixels 12 (R sub-pixels, G sub-pixels or B sub-pixels) in units.

The sorter circuit 35 generates time-sequentially sorted image data 53-i according to the sorting control signal 52-i from the R data, G data, and B data contained in the image data 51-i that was input. The sorted image data 53-i is input as an 8 bit signal to the compression circuit 36.

The compression circuit 36 includes a serial-parallel converter circuit 36a and a compression processor unit 36*b*. The serial-parallel converter circuit 36*a* performs serial-parallel conversion of the sorted image data 53-i, and generates the parallel sorted image data 58-i. In the structure in FIG. 4B, the parallel sorted image data 58-i is input to the compression processor unit 36*b* as a 96 bit signal. More specifically, the serial-parallel converter circuit 36*a* contains twelve 8-bit outputs OUT1-OUT12, and each of these outputs OUT1-OUT12 outputs one sub-pixel of image data (8 bits).

The outputs OUT1-OUT12 of the serial-parallel converter circuit 36*a* are coupled to the input of the compression processor unit 36*b*. More specifically, the outputs OUT1, OUT2, OUT3 of the serial-parallel converter circuit 36*a* are respectively coupled to the inputs $R_A$, $G_A$, $B_A$ of the compression circuit 36; and the outputs OUT4, OUT5, OUT6 are respectively coupled to the inputs $R_B$, $G_B$, $B_B$. In the same way, the outputs OUT7, OUT8, OUT9 of the serial-parallel converter circuit 36*a* are respectively coupled to the inputs $R_C$, $G_C$, $B_C$ of the compression circuit 36, and the outputs OUT10, OUT11, OUT12 are respectively coupled to the inputs $R_D$, $G_D$, $B_D$. Here, the inputs $R_A$, $G_A$, $B_A$ are respectively the input terminals where the R data, G data, and B data of a certain pixel (first pixel) should be input; and the inputs $R_B$, $G_B$, $B_B$ are respectively the input terminals where the R data, G data, and B data of another single pixel (second pixel) should be input. In the same way, the inputs $R_C$, $G_C$, $B_C$ are the input terminals where the R data, G data, and B data of still another single pixel (third pixel) should be input; and the inputs $R_D$, $G_D$, $B_D$ are the input terminals where the R data, G data, and B data of yet another single pixel (fourth pixel) should be input.

The compression processor unit 36*b* compresses the parallel sorted image data 58-i, and outputs the compression data 54-i. The compression data 54-i is output as a 48 bit signal.

In the structure in FIG. 4B, the sorter circuit 35 and series-parallel converter circuit 36*a* inputs the R data to the inputs $R_A$ through $R_D$ where the R data of the compression circuit 36*b* should be input, regardless of the sequence of the R data, G data, and B data in the image data 51-i that was input to the sorter circuit 35. In the same way, the G data is input to the inputs $G_A$ through $G_D$ where the G data of the compression circuit 36*b* should be input, and the B data is input to the inputs $B_A$ through $B_D$ where the B data should be input.

Figure 4C:
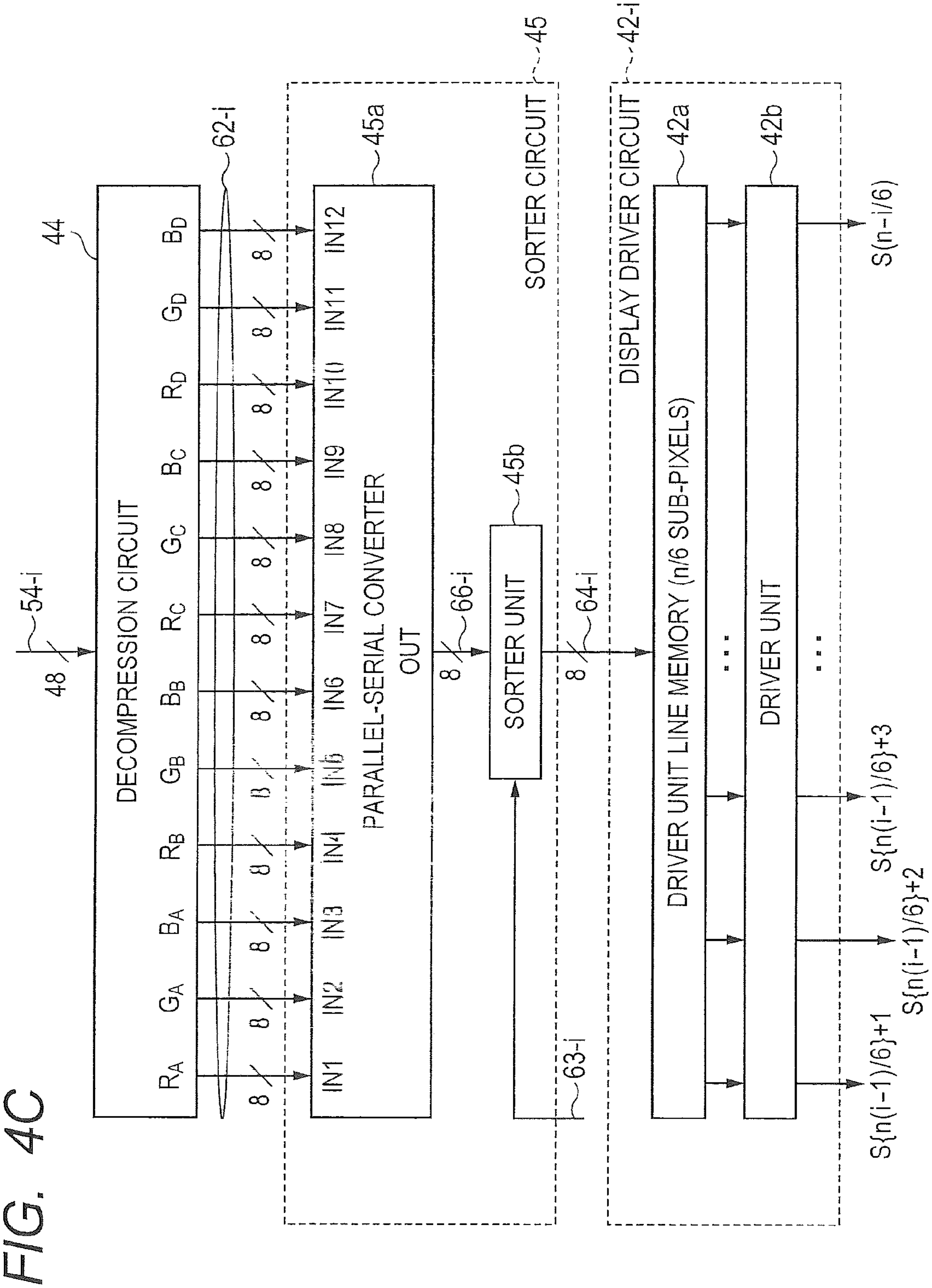
FIG. 4C is a block diagram showing an example of the structure of the decompression circuit and sorter circuit in the decompression-sorter circuit

FIG. 4C on the other hand, shows one example of the structure of the decompression circuit 44 of the decompress-sorter circuit 41, and the sorter circuit 45 and display driver circuit 42-i. FIG. 4C shows one example of the sorter circuit 45 for interchanging the time sequence that the R data, G data, and B data is output. In the structure in FIG. 4C, the R data, G data, and B data of the sorted image data 64-i are all 8 bits, and the R data, G data, and B data of the four pixels 11 is supplied one after another to the display driver circuit 42-i.

More specifically, the decompression circuit 44 of the decompress-sorter circuit 41-i includes a decompression processing unit 44*a* and a parallel-serial converter circuit 44*b*. The decompression processing unit 44*a* decompresses the compression data 61-i and generates parallel decompression data 66-i. The parallel decompression data 66-i is output to the parallel-serial converter circuit 44*b* as a 96 bit signal. More specifically, the decompression processing unit 44*a* contains the twelve 8-bit data outputs $R_A$, $G_A$, $B_A$, $R_B$, $G_B$, $B_B$, $R_C$, $G_C$, $B_C$, $R_D$, $G_D$, $B_D$. Here, the outputs $R_A$, $G_A$, $B_A$ are each output terminals where the R data, G data, and B data for a certain pixel (first pixel) are output; and the outputs $R_B$, $G_B$, $B_B$ are each output terminals where the R data, G data, and B data for another single pixel (second pixel) are output. The outputs $R_C$, $G_C$, $B_C$ are in the same way, each output terminals where the R data, G data, and B data for still another single pixel (third pixel) are output; and the outputs $R_D$, $G_D$, $B_D$ are each output terminals where the R data, G data, and B data for yet another single pixel (fourth pixel) are output.

The parallel-serial converter circuit 44*b* includes twelve 8-bit inputs IN1 through IN12. The inputs IN1, IN2, IN3 for the parallel-serial converter circuit 44*b* are each coupled to the outputs $R_A$, $G_A$, $B_A$ of the decompression processing unit 44*a*, and the inputs IN4, IN5, IN6 are respectively coupled to the outputs $R_B$, $G_B$, $B_B$. The inputs IN7, IN8, IN9 for the parallel-serial converter circuit 44*b* are respectively coupled to the outputs $R_C$, $G_C$, $B_C$ of the decompression processing unit 44*a*; and the inputs IN10, IN11, IN12 are respectively coupled to the outputs $R_D$, $G_D$, $B_D$.

The parallel-serial converter circuit 44*b* performs parallel-to-serial conversion of the parallel decompression data 66-i to generate the decompression data 62-i. The decompression data 62-i is input to the sorter circuit 45 as an 8 bit signal.

The sorter circuit 45 loads the decompression data 62-I as the sub-pixels 12 (R sub-pixels, G sub-pixels or B sub-pixels) in units. The sorter circuit 45 further sorts (rearranges) the R data, G data, and B data contained in the decompression data 62-i by time sequence corresponding to the sorting control signals 63-i to generate the sorted image data 64-i. The sorted image data 64-i is input to the display driver circuit 42-i as an 8 bit signal.

The display driver circuit 42-i contains the driver unit line memory 42*a* and the driver unit 42*b*. The driver unit line memory 42*a* has a capacity corresponding to the number of pixel matching the source driver 4-i, among the pixels of one horizontal line in the liquid crystal display panel 2. The driver unit line memory 42*a* one after another loads and stores the sorted image data 64-i. The driver unit 42*b* loads the sorted image data 64-i from the driver unit line memory 42*a*, and drives the source line S{n(i−1)/6}+1 to S (n·i/6) in response to the sorted image data 64-i.

In the structure in FIG. 4C, the operation of the parallel-serial converter circuit 44*b* and the sorter circuit 45 restores the sequence of the R data, G data, B data in the image data 51-i input to the sorter circuit 35 in the sorted image data 64-i. The R sub-pixels, G sub-pixels, and B sub-pixels of each pixel in the liquid crystal display panel 2 are in this way driven according to the R data, G data, and B data.

Figure 4D:
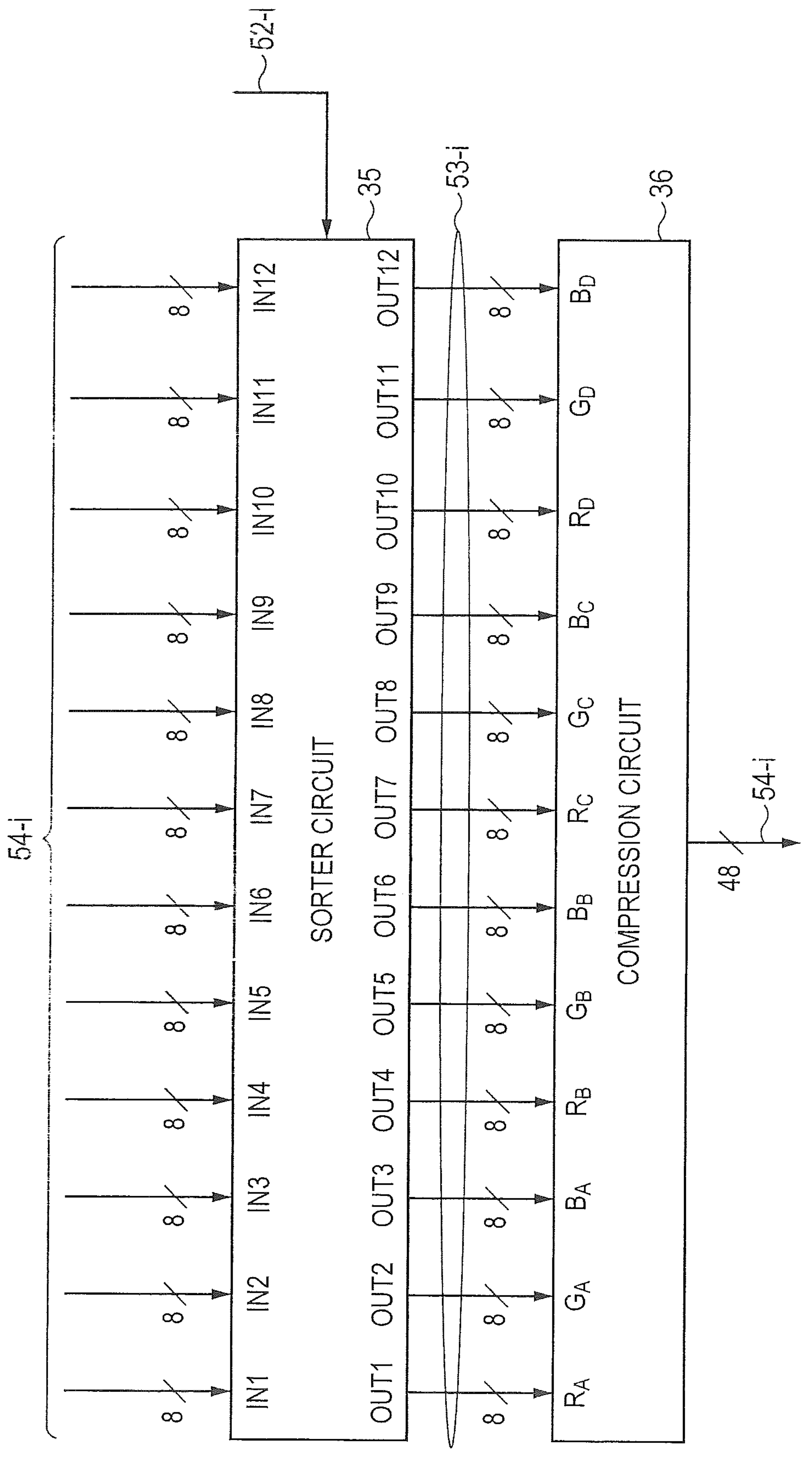
FIG. 4D is a block diagram showing an example of the structure of the sorter circuit and compression circuit in the compression-sorter circuit.

FIG. 4D is a block diagram showing another example of the structure of the sorter circuit 35 and compression circuit 36 in the compression-sorter circuit 34-i. This example shows the structure when utilizing the sorter circuit 35 such as for implementing spatial sequence interchanging of the nodes that transmit the R data, G data, and B data.

In the structure in FIG. 4D, the R data, G data, and B data of the image data 51-i are all 8 bits, and the R data, G data, and B data of the four pixels 11 are supplied (arranged) in parallel to the sorter circuit 35. In other words, the sorter circuit 35 contains twelve 8-bit inputs IN1 through IN12. Moreover the sorter circuit 35 contains twelve 8-bit outputs OUT1 through OUT12. The sorter circuit 35 sorts the R data, G data, and B data contained in the image data 51-i, in a time sequence corresponding to the sorting control signal 52-i to generate the sorted image data 53-i.

In the structure in FIG. 4D on the other hand, the compression circuit 36 includes only the compression processor unit 36*b* and does not include the serial-parallel converter circuit 36*a*. More specifically, the inputs $R_A$, $G_A$, $B_A$ of the compression processor unit 36*b* are respectively coupled to the outputs OUT1, OUT2, OUT3 of the sorter circuit 35; and the inputs $R_B$, $G_B$, $B_B$ are respectively coupled to the outputs OUT4, OUT5, OUT6. In the same way, the inputs $R_C$, $G_C$, $B_C$ of the compression processor unit 36*b* are respectively coupled to the outputs OUT7, OUT8, OUT9 of the sorter circuit 35, and the inputs $R_D$, $G_D$, $B_D$ are respectively coupled to the outputs OUT10, OUT11, OUT12. Here, the inputs $R_A$, $G_A$, $B_A$ are respectively the input terminals where the R data, G data, and B data of a certain pixel (first pixel) should be input; and the inputs $R_B$, $G_B$, $B_B$ are respectively the input terminals where the R data, G data, and B data of another pixel (second pixel) should be input. In the same way, the inputs $R_C$, $G_C$, $B_C$ are the input terminals where the R data, G data, and B data of still another single pixel (third pixel) should be input; and the inputs $R_D$, $G_D$, $B_D$ are the input terminals where the R data, G data, and B data of yet another single pixel (fourth pixel) should be input. The compression processor unit 36*b* compresses the sorted image data 53-i and outputs the compression data 54-i. The compression data 54-i is output as a 48 bit signal.

Figure 4E:
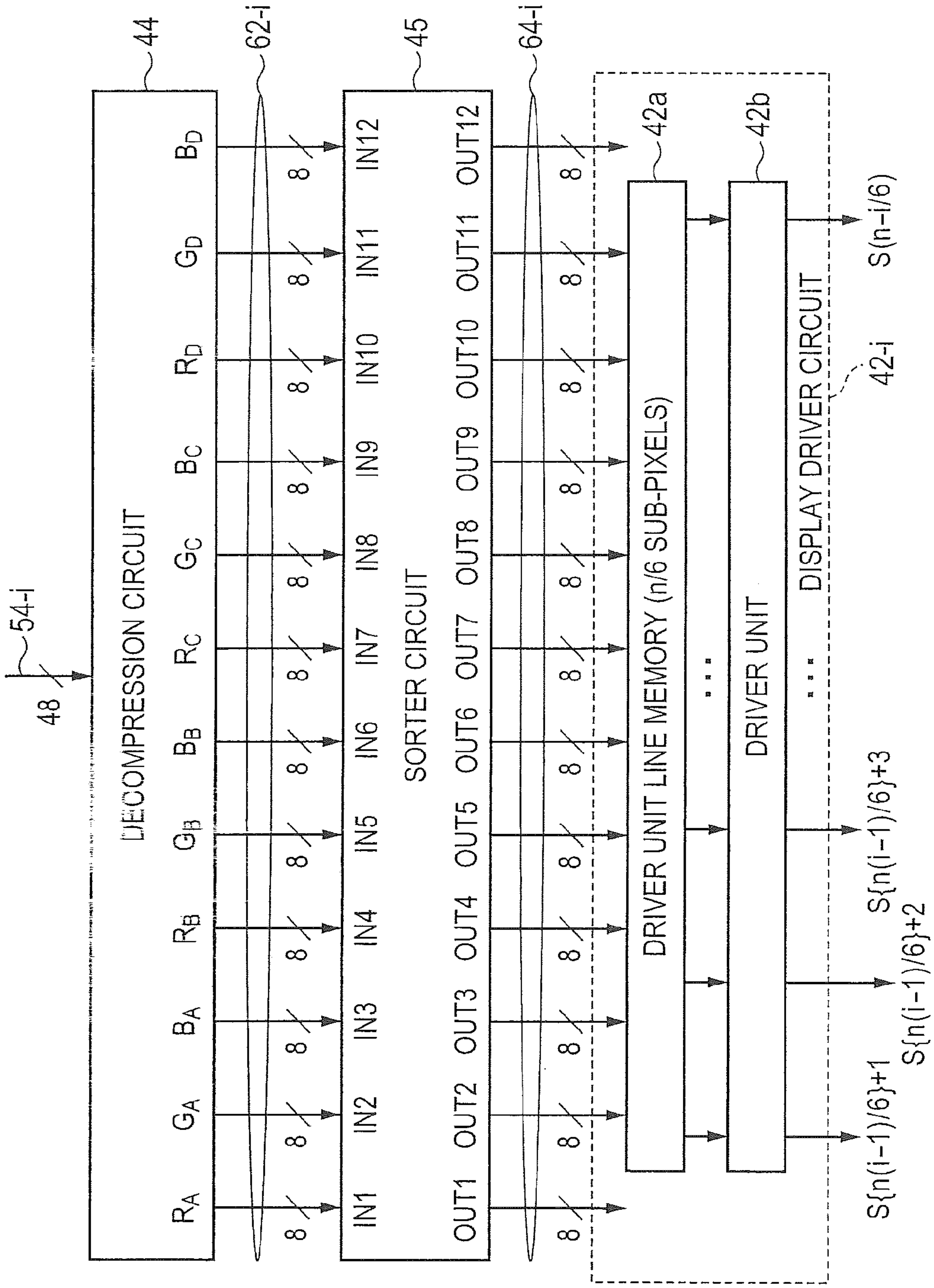
FIG. 4E is a block diagram showing another example of the decompression circuit and the sorter circuit in the decompression-sorter circuit.

FIG. 4E is a block diagram showing another example of the decompression circuit 44 and the sorter circuit 45 in the decompress-sorter circuit 41-i. This example shows an example of the structure when utilizing the sorter circuit 45 such as for implementing spatial sequence interchanging of the nodes that transmit the R data, G data, and B data. The structure in FIG. 4E contains only a decompression processing unit 44*a* and does not include a parallel-serial converter circuit 44*b* such as shown in FIG. 4C. The decompression processing unit 44*a* has twelve 8-bit outputs $R_A$, $G_A$, $B_A$, $R_B$, $G_B$, $B_B$, $R_C$, $G_C$, $B_C$, $R_D$, $G_D$, $B_D$. The decompression processing unit 44*a* decompresses the compression data 61-i to generate the decompression data 62-i.

The sorter circuit 45 includes twelve 8-bit inputs IN1 through IN12 and the twelve 8-bit outputs OUT1 through OUT12. The inputs IN1, IN2, IN3 for the sorter circuit 45 are respectively coupled to the outputs $R_A$, $G_A$, $B_A$ of the decompression processing unit 44*a*, and the inputs IN4, IN5, IN6 are respectively coupled to the outputs $R_B$, $G_B$, $B_B$. Further, the inputs IN7, IN8, IN9 for the sorter circuit 45 are respectively coupled to the outputs $R_C$, $G_C$, $B_C$ of the decompression processing unit 44*a*; and the inputs IN10, IN1, IN12 are respectively coupled to the outputs $R_D$, $G_D$, $B_D$.

The sorter circuit 45 sorts the R data, G data, and B data contained in the decompression data 62-i in at time sequence according to the sorting control signals 63-i to generate the sorted image data 64-i. The sorted image data 64-i is output to and stored in the driver unit line memory 42*a* of the display driver circuit 42-i as a 96 bit signal. The driver unit 42*b* loads the sorted image data 64-i from the driver unit line memory 42*a* and drives the source line S {n(i−1)/6}+1 to S (n·i/6) in response to the sorted imaged data 64-i.

Hereafter, an example of interchanging the time sequence that the R data, G data, and B data are input (FIG. 4B, FIG. 4C); and an example of interchanging the spatial sequence at the terminals that the R data, G data, and B data are input and output (FIG. 4D, FIG. 4E) are presented as the "sorting" processing. However in the sorter circuit 35 in the compression-sorter circuits 34-i, both the time sequence and the spatial sequence may be interchanged. Both the time sequence and the spatial sequence may be interchanged even in the sorter circuit 45 of the decompress-sorter circuit 41-i.

(Specific Example of "Sorting" Processing)

A specific example of color placement in a liquid crystal display panel 2 and the "sorting" processing implemented corresponding to that color placement is described next.

One problem occurring in the "sorting" processing is that the number of pixels 11 (4 in this embodiment) collectively compressed in the compression circuit 36 in the compression-sorter circuits 34-i, and the number of output from each of the source drivers 4-i does not always match. Though the number of collectively compressed pixels 11 is dependent on the compression processing method; the number of outputs from each of the source drivers 4-i is determined by the number of source lines S1 through Sn in the liquid crystal display panel 2 and the number of source drivers 4-i. Therefore, the number of pixels 11 (4 in this embodiment) collectively compressed and the number of pixels in each horizontal line capable of being driven by the each source driver 4-i do not necessarily match per the specifications required in the product market. If the number of collectively processed pixels 11 for example is 4, and the number of pixels in each horizontal line capable of being driven by the each source driver 4-i is a multiple of 4, then the number of collectively processed pixels 11 will match the number of outputs from each of the source drivers 4-i. However, in the case for example where the number of outputs from each of the source drivers 4-i is 681 pixels (=12×56+9), when the pixels are collectively processed in 4-pixel units, there is excess image data 11 for 3 pixels. Some type of process is therefore required to resolve this problem. In the description of the following "sorting" processing, a processing for resolving the problem of a mismatch in the number of pixels where compression processing is collectively performed, and the number of outputs from each of the source drivers 4-i is described.

Figure 6A:
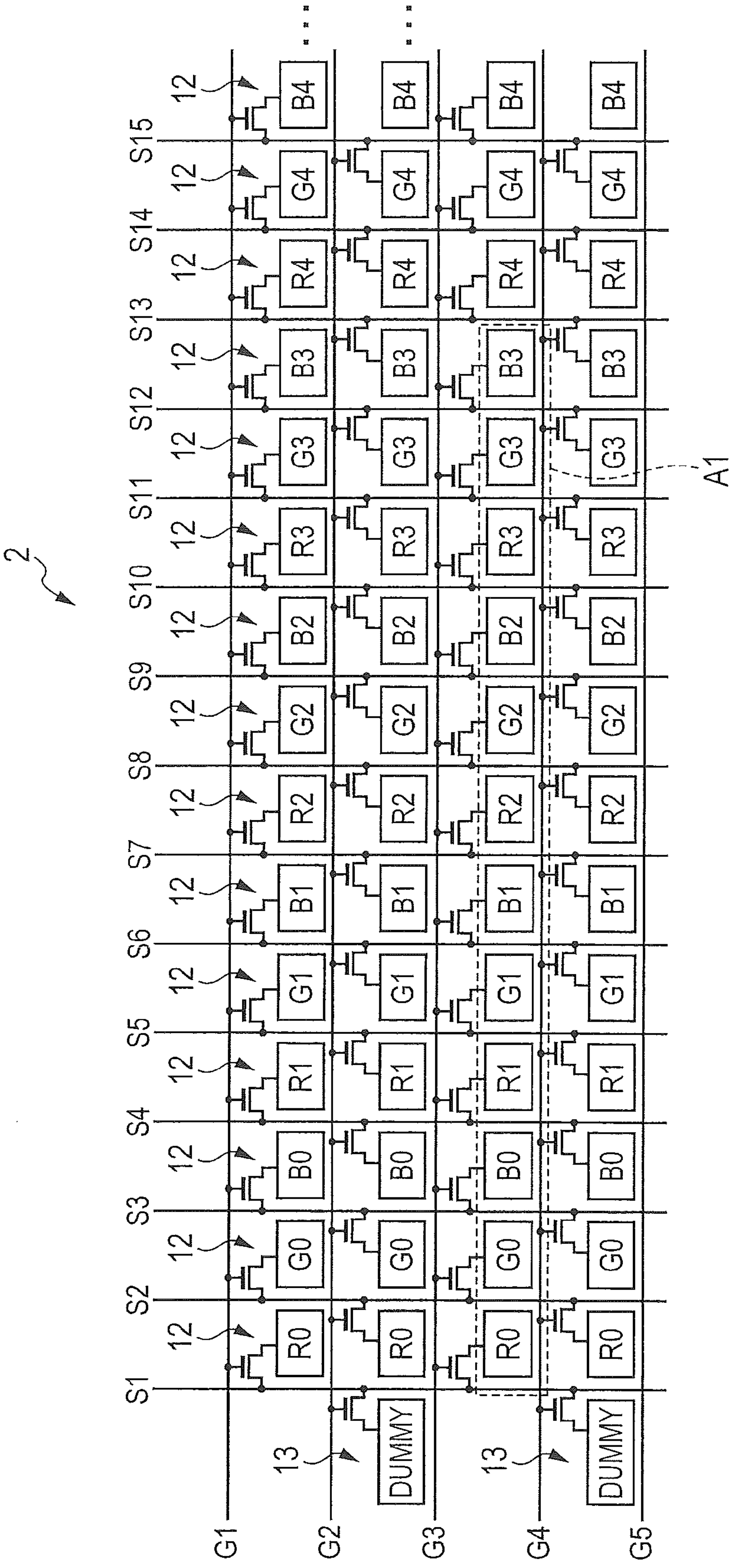
FIG. 6A is a drawing showing the pixel color placement in the liquid crystal display device of the first embodiment.
Figure 6B:
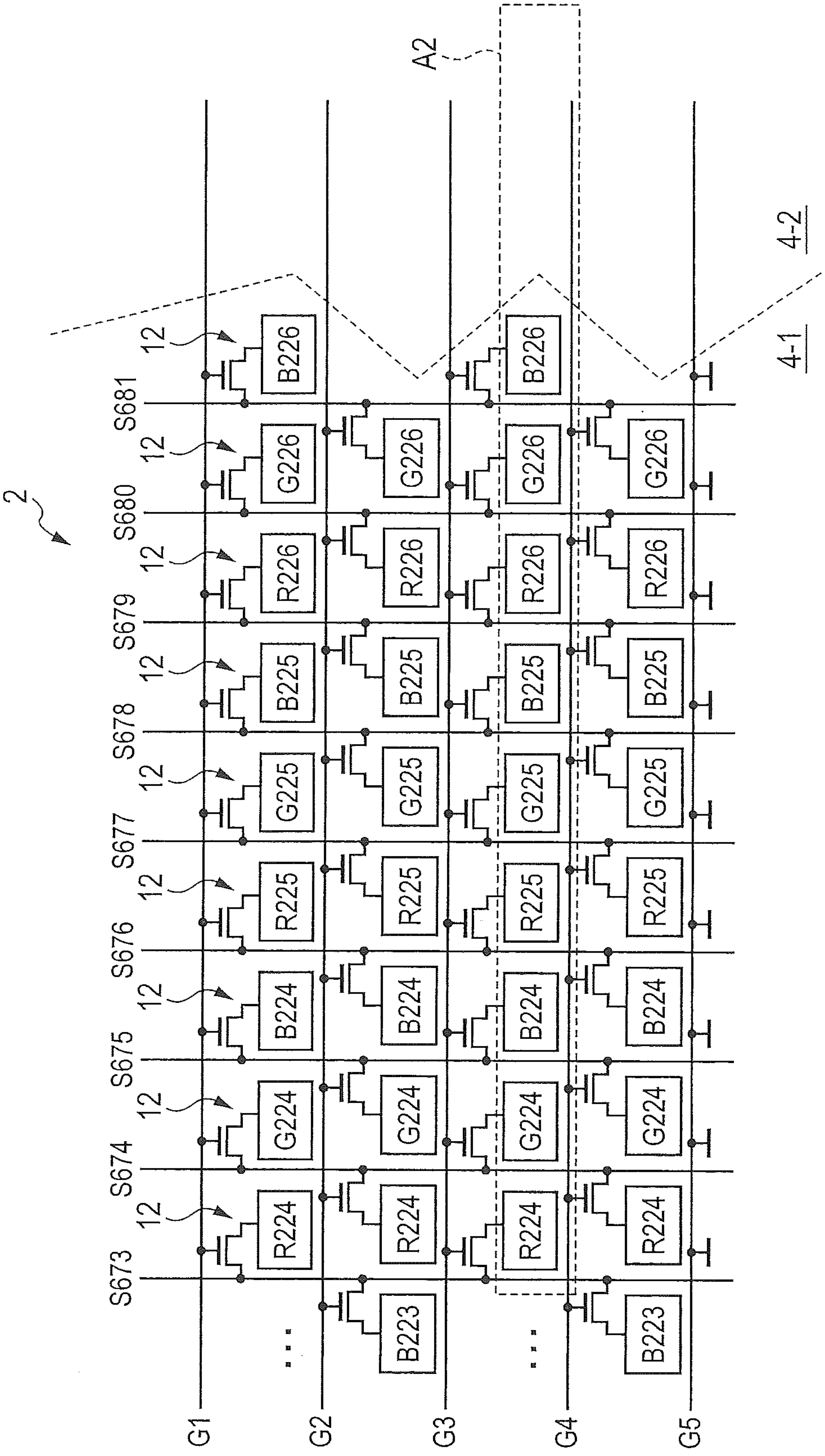
FIG. 6B is a drawing showing the pixel color placement in the liquid crystal display device of the first embodiment.

FIG. 6A and FIG. 6B shows the structure of the liquid crystal display panel 2 in this embodiment. These figures also show the structure of the liquid crystal display panel 2 where the R sub-pixels, G sub-pixels, and B sub-pixels are arranged in a staggered placement. In this liquid crystal display panel 2, the line of pixels (odd-numbered horizontal line) coupled to the odd-numbered gate lines G1, G3, G5 . . . have a different color placement of sub-pixels than the line of pixels (even-numbered line) coupled to the even-numbered gate lines G2, G4, G6 . . . . In the odd-numbered horizontal lines, the R sub-pixels, G sub-pixels, and B sub-pixels are respectively coupled to the source lines S1, S2, S3, and sub-pixels 12 are coupled in the same sequence to the remaining source lines also. Here, in FIG. 6A and FIG. 6B, the symbol "$R_x$" ($_x$=0, 1, 2, . . . ) of pixel 12 indicates the R sub-pixel, the symbol "$G_x$" indicates the G sub-pixels, and the symbol "$B_x$" indicates the B sub-pixel. In the even-numbered horizontal lines on other hand, the dummy sub-pixel 13, R sub-pixel, and G sub-pixel are respectively coupled to the source lines S1, S2, S3; and the B sub-pixel, R sub-pixel, and G sub-pixel are repeatedly coupled in this sequence to the remaining source lines.

A different "sorting" processing is implemented on the odd-numbered horizontal lines and even-numbered horizontal lines when driving a liquid crystal display panel 2 configured in this way. The "sorting" processing on the odd-numbered horizontal lines and the "sorting" processing on the even-numbered horizontal lines are described next. The following description is given while presuming the following three points.

A first point is that each compression circuit 36 in the compression-sorter circuits 34-i is configured so as to load the image data in the following time sequence (See FIG. 4B) or spatial sequence (See FIG. 4D):

(1) R data of first pixel
(2) G data of first pixel
(3) B data of first pixel
(4) R data of second pixel
(5) G data of second pixel
(6) B data of second pixel
(7) R data of third pixel
(8) G data of third pixel
(9) B data of third pixel
(10) R data of fourth pixel
(11) G data of fourth pixel
(12) B data of fourth pixel A second point is that the R data, G data, and B data of the image data 51-1 through 51-6 in each horizontal line is input in a sequence corresponding to the color placement of the sub-pixel in the horizontal line.

A third point is that the number of collectively compressed pixels 11 is 4, and that the number of outputs from each source driver 4-i is 681. In this case, the number of pixels 11 on each horizontal line capable of being driven by each source driver 4-i is 227 pixels (=681/3). The number of collectively compressed pixels 11, and the number of outputs from each of the source drivers 4-i can be changed as needed.

("Sorting" Processing for Odd-Numbered Horizontal Lines)

Figure 7A:
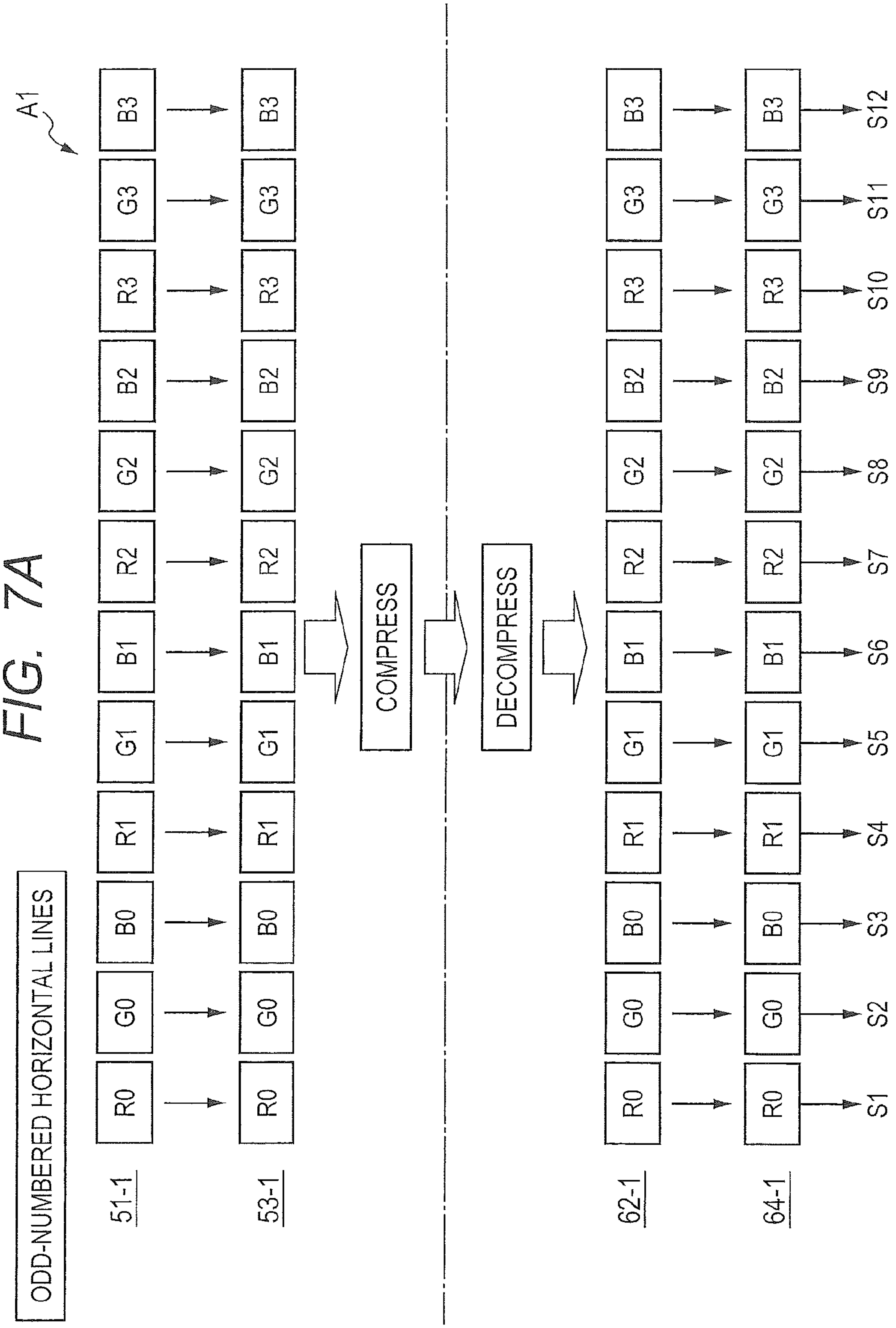
FIG. 7A is a concept view showing the "sorting" processing performed on the odd-numbered horizontal lines in the first embodiment.
Figure 7B:
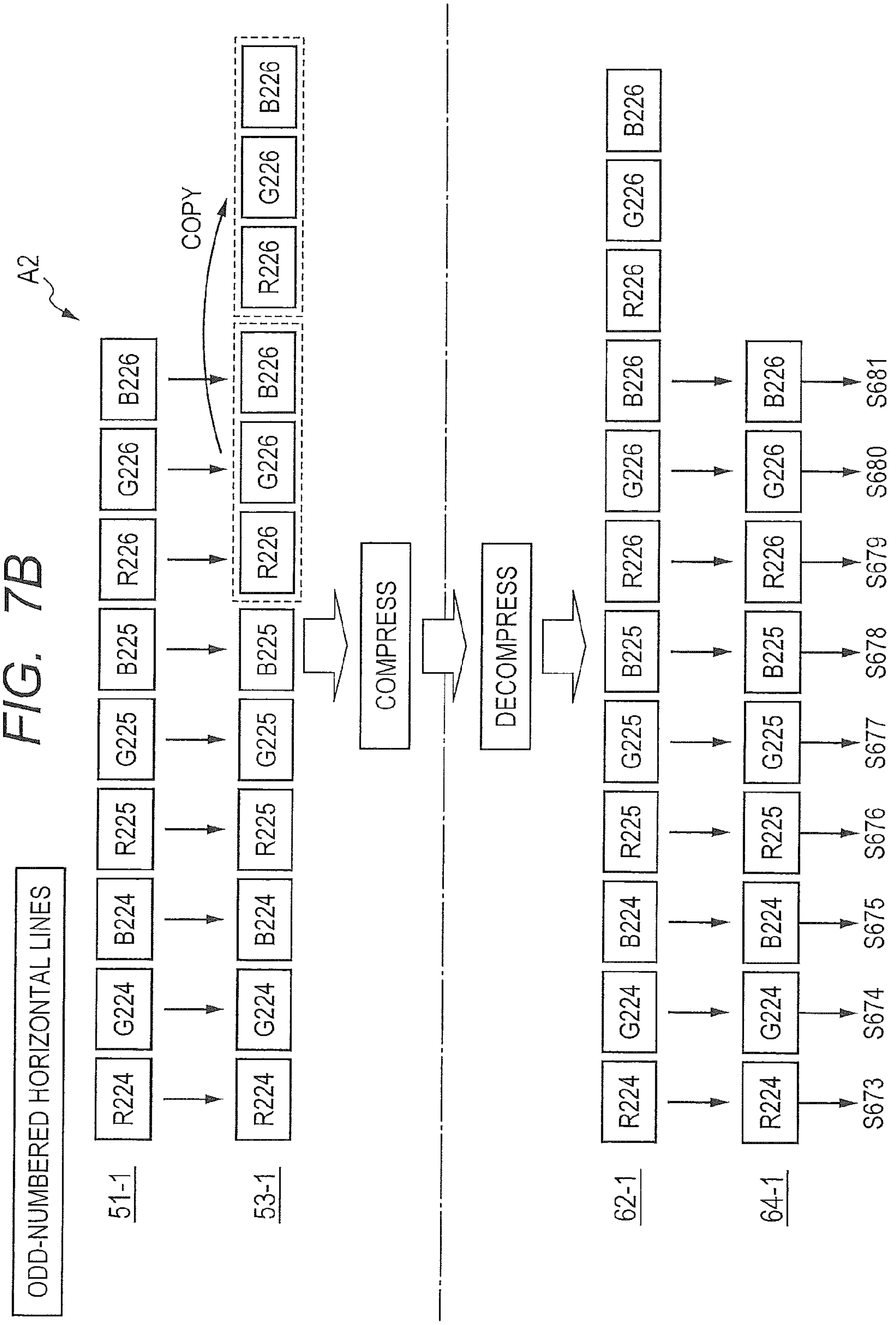
FIG. 7B is a concept view showing the "sorting" processing performed on the odd-numbered horizontal lines in the first embodiment.

FIG. 7A and FIG. 7B are drawings showing contents of the "sorting" processing implemented on the image data 51-1 and decompression data 62-1 corresponding to the pixels 11 in the odd-numbered horizontal lines, in the sorter circuit 45 of the decompress-sorter circuit 41-1 and the sorter circuit 35 of the compress-sorter circuit 34-1 in the source driver 4-1.

More specifically, FIG. 7A shows details of the "sorting" processing implemented on the image data 51-1 corresponding to the pixel 11 positioned in section A1 of the liquid crystal display panel 2. Here, the section A1 is the section where the twelve sub-pixels R0, G0, B0, R1, G1, B1, R2, G2, B2, R3, G3, B3 are formed at a position on the left end of the odd-numbered horizontal lines (horizontal line of the pixel 11 coupled to the gate line G3 in FIG. 6A) as illustrated in FIG. 6A.

FIG. 7B on the other hand, shows details of the "sorting" processing implemented on the image data 51-1 corresponding to the pixel 11 positioned in section A2 of the liquid crystal display panel 2. Here, the section A2 is the section where the nine sub-pixels R224, G224, B224, R225, G225, B225, R226, G226, B226 are formed at a position on the right end of the section corresponding to the source driver 4-1 of the odd-numbered horizontal lines (border with section corresponding to the source driver 4-2).

In the odd-numbered horizontal lines as shown in FIG. 7A and FIG. 7B, the sequence (time sequence or spatial sequence) that the R data, G data, and B data of image data 51-1 in each pixel 11 is input to the sorter circuit 35, matches the sequence (time sequence or spatial sequence) that the R data, G data, and B data is input to the compression circuit 36. Therefore there is basically no "sorting." In other words, the image data for the sub-pixels R0, G0, B0, R1, G1, B1, R2, G2, B2, R3, G3, B3 is input unchanged into the inputs $R_A$, $G_A$, $B_A$, $R_B$, $G_B$, $B_B$, $R_C$, $G_C$, $B_C$, $R_D$, $G_D$, $B_D$ of the compression processor unit 36*b* of the compression circuit 36. Moreover, the decompression data from the sub-pixels R0, G0, B0, R1, G1, B1, R2, G2, B2, R3, G3, B3 output from the outputs $R_A$, $G_A$, $B_A$, $R_B$, $G_B$, $B_B$, $R_C$, $G_C$, $B_C$, $R_D$, $G_D$, $B_D$ of the decompression processing unit 44*a* of decompression circuit 44 are utilized unchanged to drive the source lines S1 through S12.

However, since as shown in FIG. 7B, the number of pixels 11 driven by the source driver 4-1 is 227 pixels (=681/3) for the compression performed in units of four pixels 11, there is only image data 51-1 corresponding to the three pixels 11 or namely the nine sub-pixels 12 in section A2. Whereupon, in the "sorting" processing, the image data for a specified number of pixels 11 (namely, the pixel 11 comprised of the sub-pixels R226, G226, B226) positioned at the end of a section corresponding to the source driver 4-1 of liquid crystal display panel 2, are copied as the image data for the pixels 11 that are lacking in the compression processing.

More specifically, when the number N of pixels corresponding to the source driver 4-1 for each horizontal line is divided by the number $\alpha$ of pixel units in the compression processing and the obtained surplus is $\beta$, image data for $(\alpha-\beta)$ pixels 11 is copied and utilized. There is little significant difference in levels among adjacent R sub-pixels, G sub-pixels, and B sub-pixels in the pixel 11 so that no large deterioration in image quality occurs in the operation to copy image data for pixels 11 positioned on the ends.

In the example in FIG. 7B, the image data for the sub-pixels R224, G224, B224, R225, G225, B225, R226, G226, B226 for example are respectively input to the inputs $R_A$, $G_A$, $B_A$, $R_B$, $G_B$, $B_B$, $R_C$, $G_C$, $B_C$ of the compression circuit 36. Moreover, the image data 51-1 for the sub-pixels R226, G226, B226 are input to the $R_D$, $G_D$, $B_D$ of the compression processor unit 36*b*. At this time, the decompression data for the sub-pixels R224, G224, B224, R225, G225, B225, R226, G226, B226 output from the outputs $R_A$, $G_A$, $B_A$, $R_B$, $G_B$, $B_B$, $R_C$, $G_C$, $B_C$ of the decompression processing unit 44*a* are utilized unchanged to drive the source lines S673 to S681. The decompression data for the sub-pixels R226, G226, B226 output from the outputs $R_D$, $G_D$, $B_D$ of the decompression processing unit 44*a* are not utilized to driver the source lines.

As described above, this type of operation is related to usage of the structure in this embodiment where the source drivers 4-1 through 4-6 and compression-sorter circuits 34-1 through 34-6 of timing controller 3 correspond in a one-to-one relation (See FIG. 2A). Instead of the above described operation, image data for pixels (sub-pixels R227, G227, B227) positioned on the ends of the section corresponding to the source driver 4-2 of the liquid crystal display panel 2 may be transferred to the source driver 4-1 and compression processed. However, implementing this operation requires transferring data from the driver unit line memory 33-2 to the driver unit line memory 33-1, and operation of the timing controller 3 becomes complicated. The operation to copy the image data of the pixels 11 positioned at the end of the section corresponding to the source driver 4-1 of liquid crystal display panel 2 is superior in that the above drawbacks are eliminated.

("Sorting" Processing for Even-Numbered Horizontal Lines)

Figure 9A:
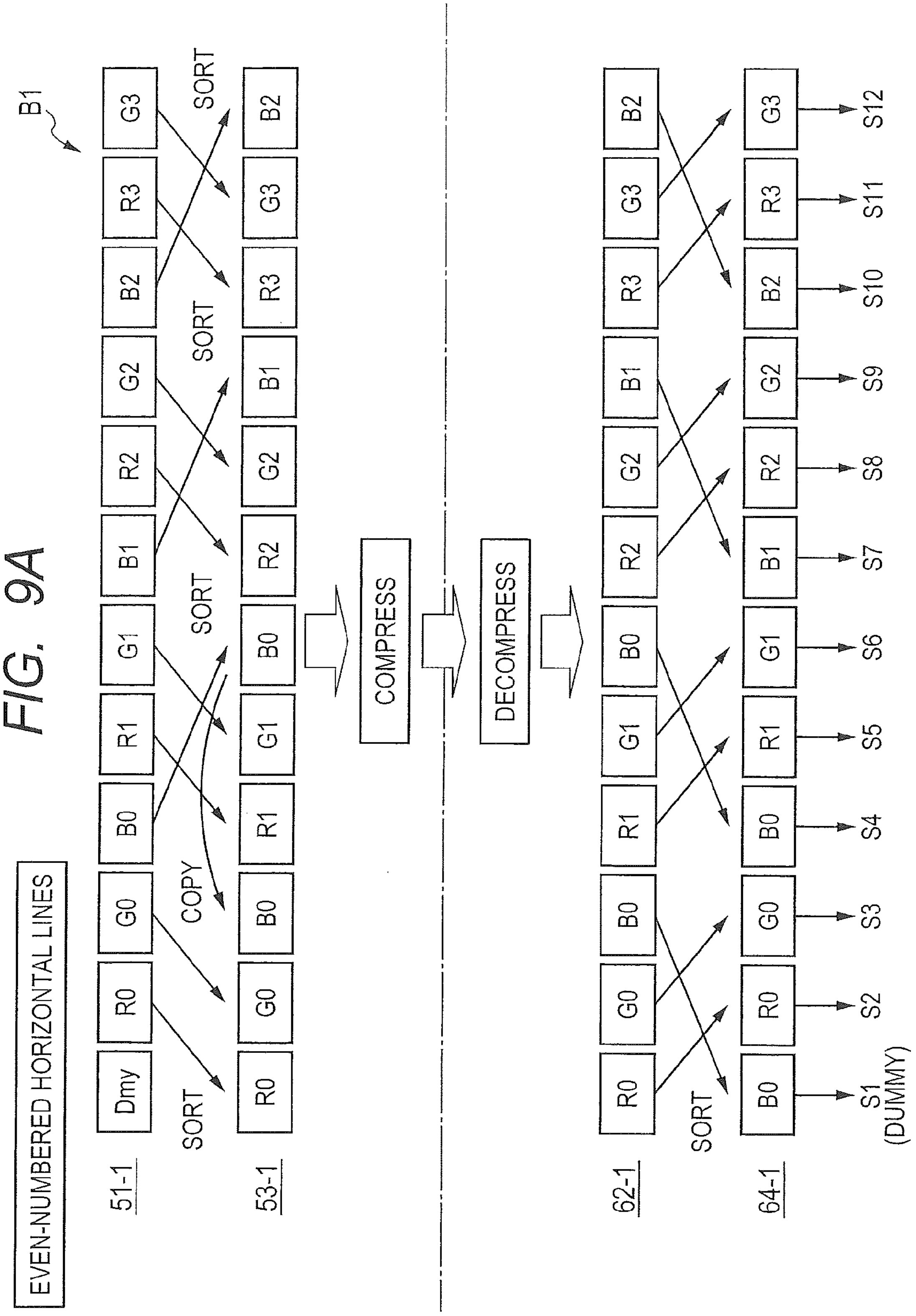
FIG. 9A is a concept view showing the "sorting" processing performed on the even-numbered horizontal lines in the first embodiment.
Figure 9B:
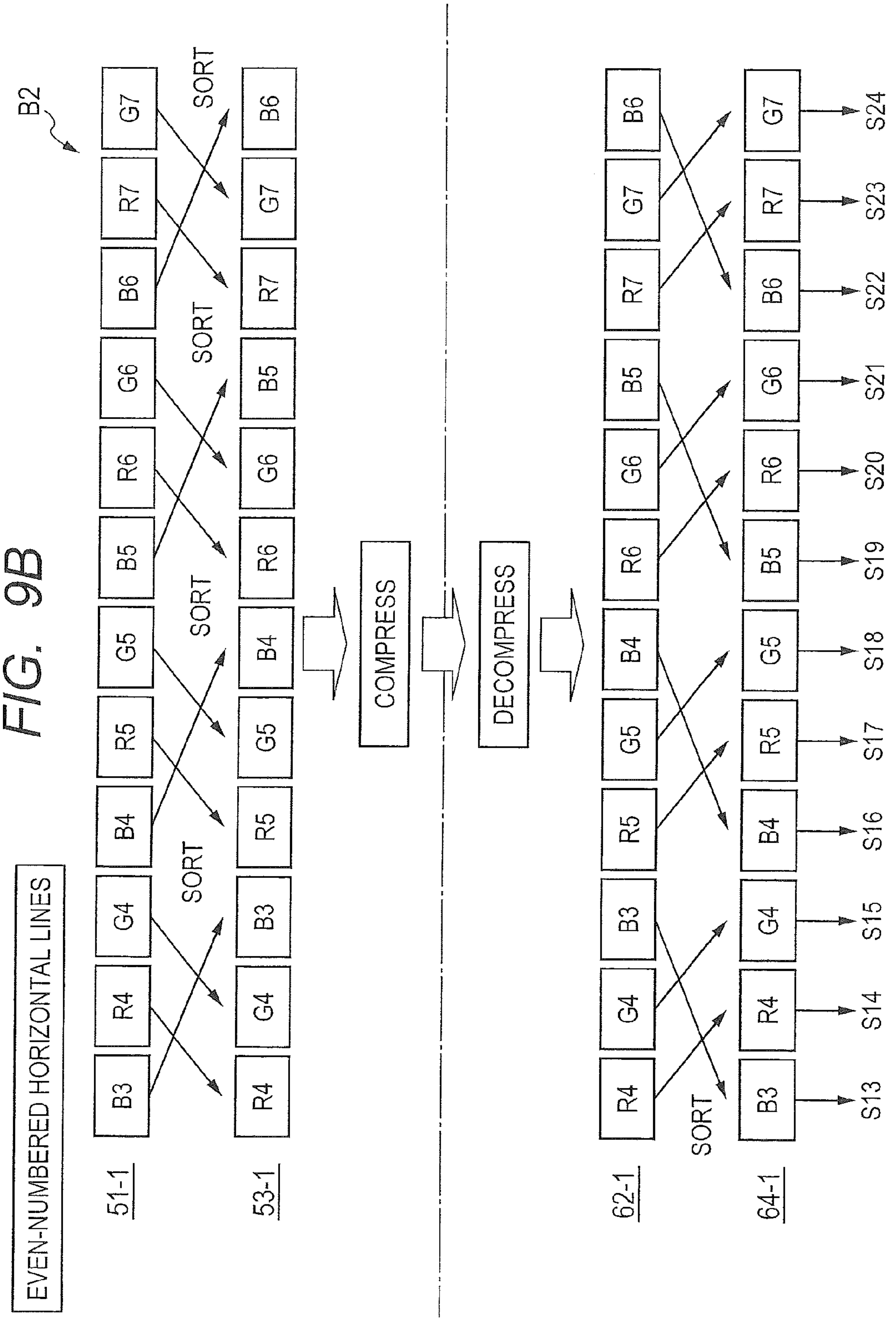
FIG. 9B is a concept view showing the "sorting" processing performed on the even-numbered horizontal lines in the first embodiment.
Figure 9C:
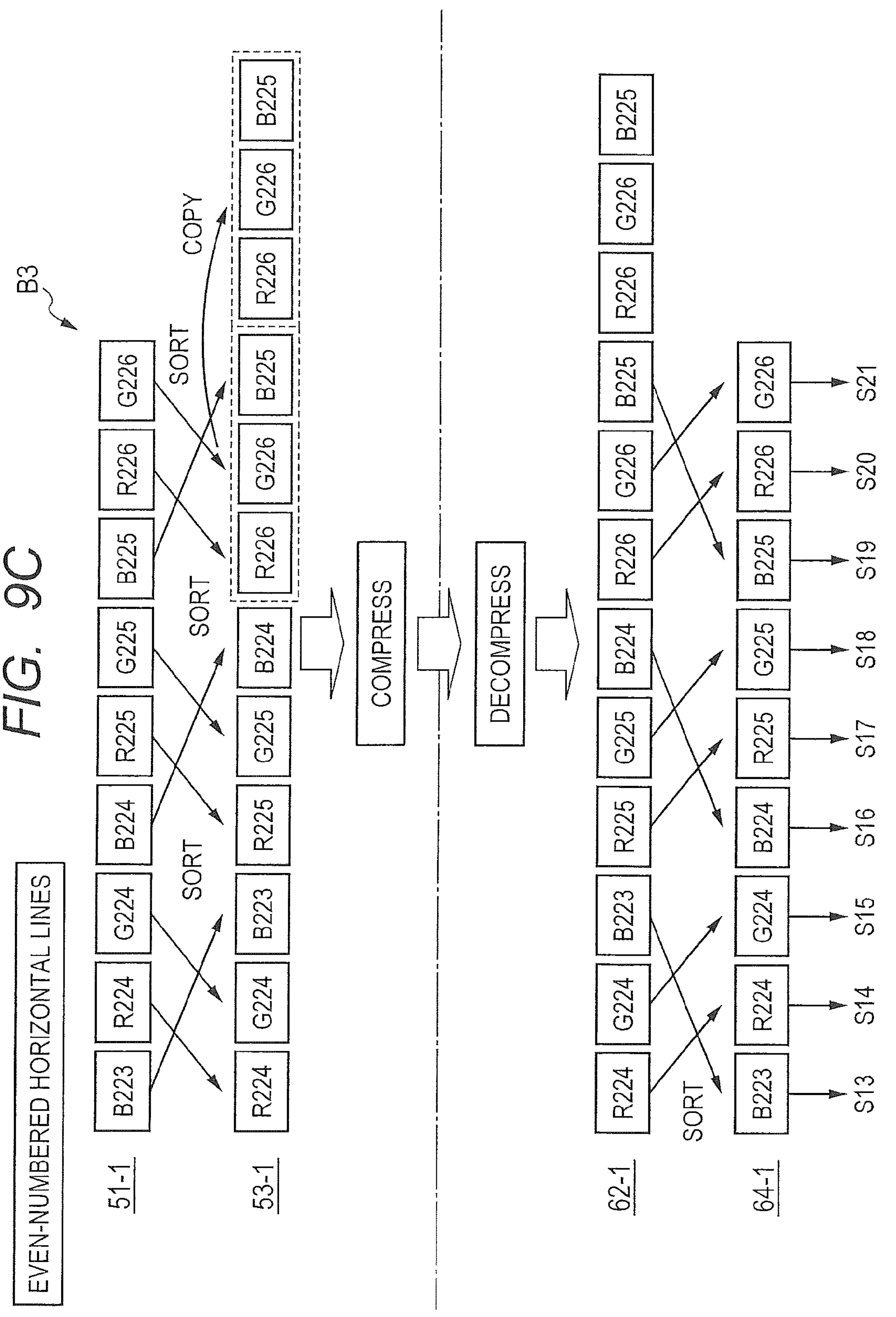
FIG. 9C is a concept view showing the "sorting" processing performed on the even-numbered horizontal lines in the first embodiment.

FIGS. 9A, 9B, and 9C are drawings showing details of the "sorting" processing implemented on the image data 51-1 and decompression data 62-1 corresponding to the pixels 11 for the even-numbered horizontal lines, in the sorter circuit 35 for the compression-sorter circuits 34-1 and the sorter circuit 45 of the decompress-sorter 41-1 of the source driver 4-1.

Figure 8A:
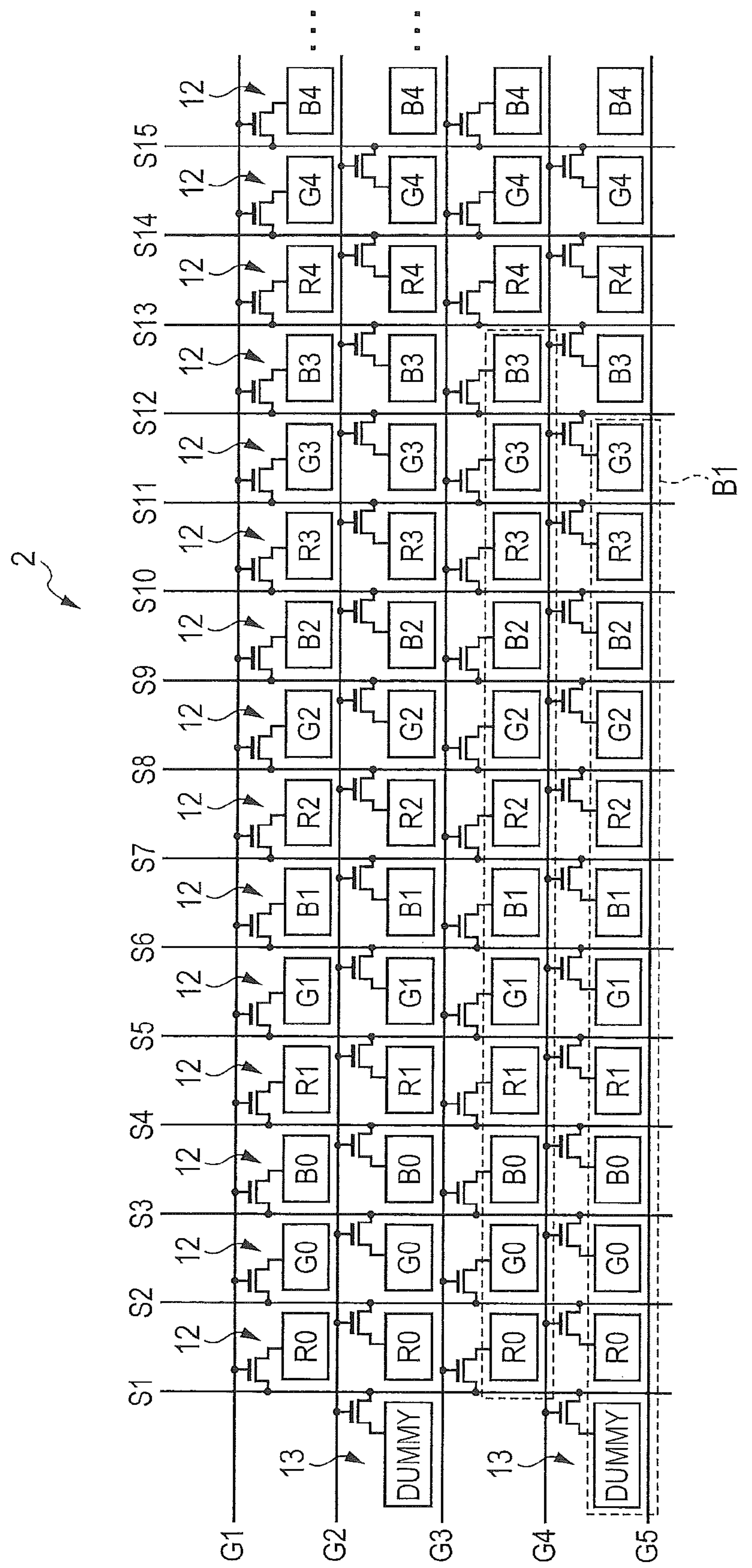
FIG. 8A is a drawing showing the pixel color placement in the liquid crystal display panel in the first embodiment.

More specifically, FIG. 9A shows details of the "sorting" processing implemented on the image data 51-1 corresponding to the pixels 11 positioned in section B1 (See FIG. 8A) of the liquid crystal display panel 2. Here, as shown in FIG. 8A, the section B1 is a section where the twelve sub-pixels positioned on the left end of the even-numbered horizontal lines (horizontal line of the pixel 11 coupled to the gate line G4 in FIG. 8A) or namely the dummy sub-pixel 13, the sub-pixels R0, G0, B0, R1, G1, B1, R2, G2, B2, R3 and G3 are formed.

Figure 8B:
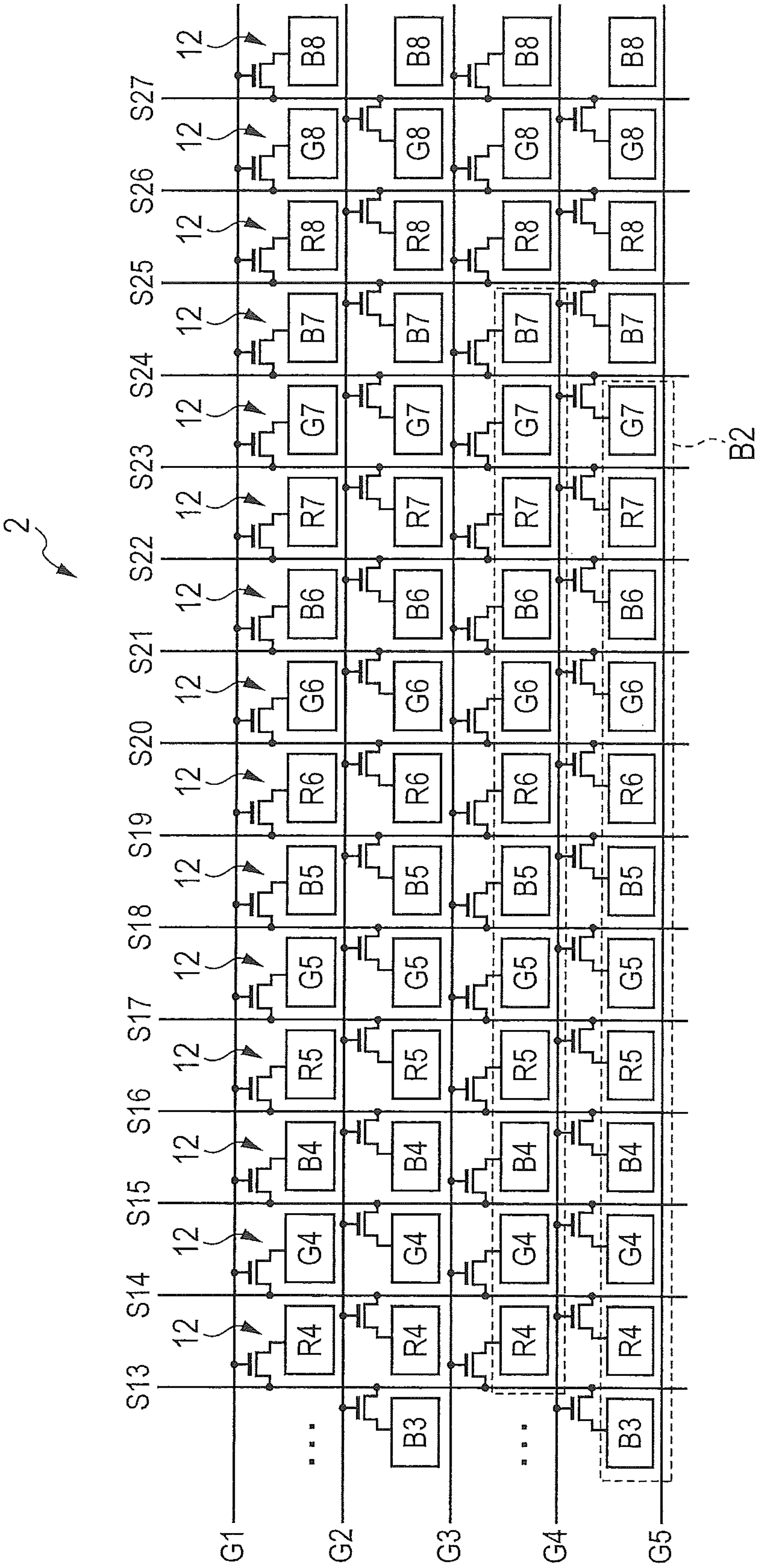
FIG. 8B is a drawing showing the pixel color placement in the liquid crystal display panel in the first embodiment.

FIG. 9B on the other hand, shows details of the "sorting" processing implemented on the image data 51-1 corresponding to the pixel 11 positioned in section B2 (See FIG. 8B) of the liquid crystal display panel 2. Here, the section B2 is the section as shown in FIG. 8B, where the 13th through 24th sub-pixels B3, R4, G4, B4, R5, G5, B5, R6, G6, B6, R7, G7 from the left of the even-numbered horizontal line are formed.

Figure 8C:
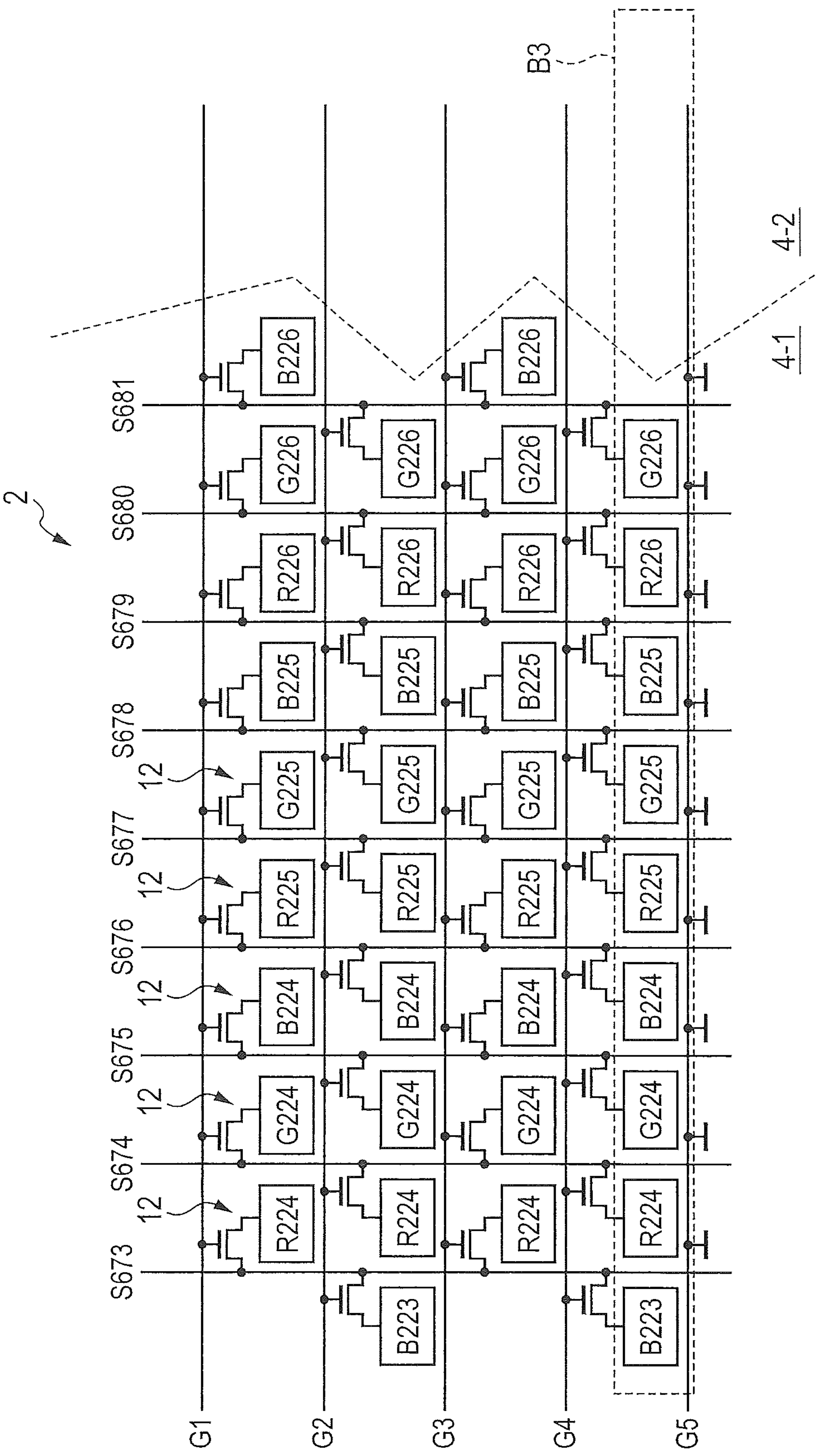
FIG. 8C is a drawing showing the pixel color placement in the liquid crystal display panel in the first embodiment.

FIG. 9C also shows details of the "sorting" processing implemented on the image data 51-1 corresponding to the pixel positioned in section B3 (See FIG. 8C) of the liquid crystal display panel 2. Here, section B3 is a section where the three pixels 11 positioned on the right end (border of section corresponding to the source driver 4-2) corresponding to the source drivers 4-1 or namely the nine sub-pixels B223, R224, G224, B224, R225, G225, B225, R226, G226 are formed as shown in FIG. 8C.

As can be understood from FIG. 9A through FIG. 9C, in the even-numbered horizontal line, the sequence that the R data, G data, and B data of image data 51-1 of each pixel 11 is input to the sorter circuit 35, does not match the sequence that the R data, G data, and B data is input to the compression circuit 36. Whereupon, the "sorting" processing is implemented by the sorter circuit 35 of compression-sorter circuit 34-1 and the sorter circuit 45 of the decompress-sorter circuit 41-1.

First of all, in section B1 of the liquid crystal display panel 2, the image data 51-1 is input to the sorter circuit 35 of compression-sorter circuit 34-1 as shown in FIG. 9A in the following sequence (time sequence or spatial sequence).

(1) Image data for dummy sub-pixel 13 (dummy data)
(2) Image data of sub-pixel R0 (R data)
(3) Image data of sub-pixel G0 (G data)
(4) Image data of sub-pixel B0 (B data)
(5) Image data of sub-pixel R1 (R data)
(6) Image data of sub-pixel G1 (G data)
(7) Image data of sub-pixel B1 (B data)
(8) Image data of sub-pixel R2 (R data)
(9) Image data of sub-pixel G2 (G data)
(10) Image data of sub-pixel B2 (B data)
(11) Image data of sub-pixel R3 (R data)
(12) Image data of sub-pixel G3 (G data)

Here, the reader should note that the image data 51-1 corresponding to section B1 of liquid crystal display panel 2 is related to the dummy data that is contained, and though containing four R data and four G data, only contains three B data.

The sorter circuit 35 generates this image data as the sorted image data 53-1 sorted in the following sequence, and supplies the sorted image data 53-1 to the compression circuit 36:

(1) Image data of sub-pixel R0 (R data)
(2) Image data of sub-pixel G0 (G data)
(3) Image data of sub-pixel B0 (B data)
(4) Image data of sub-pixel R1 (R data)
(5) Image data of sub-pixel G1 (G data)
(6) Image data of sub-pixel B0 (B data)
(7) Image data of sub-pixel R2 (R data)
(8) Image data of sub-pixel G2 (G data)
(9) Image data of sub-pixel B1 (B data)
(10) Image data of sub-pixel R3 (R data)
(11) Image data of sub-pixel G3 (G data)
(12) Image data of sub-pixel B2 (B data)

The reader should be aware that the sequence of the R data, G data, and B data in the sorted image data 53-1, matches the sequence (See FIG. 4B, FIG. 4D) for input of loaded B data, input of loaded B data, and input of loaded R data in the compression circuit 36. In other words, image data for sub-pixels R0, G0, B0, R1, G1, B0, R2, G2, B1, R3, G3 is respectively input to the $R_A$, $G_A$, $B_A$, $R_B$, $G_B$, $B_B$, $R_C$, $G_C$, $B_C$, $R_D$, $G_D$, $B_D$ inputs of the compression processor unit 36*b* of compression circuit 36. The compression circuit

36 implements compression processing on the sorted image data 53-1 that was input in this sequence, to generate the compression data 54-1.

In the "sorting" processing as shown in FIG. 9A, (1) the image data from the dummy sub-pixel 13 (dummy data) is deleted from the sorted image data 53-1, and (2) the B data that was copied the image data for sub-pixel B0 is redundantly supplied to the compression circuit 36. Here, the reader should be aware that is section B1 of liquid crystal display panel 2, though the number of R sub-pixels and G sub-pixels is four, the number of B sub-pixels is three, and is a smaller number than the R sub-pixels and G sub-pixels. One image data among the smaller number of B sub-pixels is copied and utilized. In the present embodiment, the sub-pixel B0 which is the B sub-pixel in closest contact to the dummy sub-pixel 13 among the B sub-pixels in the even-numbered horizontal line is selected as the B sub-pixel copied as the image data. The image data for the sub-pixel B0 is in this way, is input to the two inputs $B_A$, $B_B$ of the compression processor unit 36*b* of the compression circuits of FIG. 4B and FIG. 4D. Deterioration in the image during compression processing can be prevented by using image data from the B sub-pixel in closest contact with the dummy sub-pixel 13 instead of dummy data not used in the image display. There is no significant difference in the size of the levels of adjacent B sub-pixels so that the operation to copy the image data of sub-pixel B0, does not cause a large deterioration in the image quality. The dummy data on the other hand has no correlation with the peripheral sub-pixel image data and so the deterioration in image quality becomes relatively large when the dummy data is utilized.

The sorter circuit 45 of the decompress-sorter circuit 41-1 implements "sorting" processing in order to restore the original image data 51-1 from the decompression data 62-1. More specifically, the decompression circuit 44 outputs the decompression data 62-1 in the following sequence:

(1) Image data of sub-pixel R0 (R data)
(2) Image data of sub-pixel G0 (G data)
(3) Image data of sub-pixel B0 (B data)
(4) Image data of sub-pixel R1 (R data)
(5) Image data of sub-pixel G1 (G data)
(6) Image data of sub-pixel B0 (B data)
(7) Image data of sub-pixel R2 (R data)
(8) Image data of sub-pixel G2 (G data)
(9) Image data of sub-pixel B1 (B data)
(10) Image data of sub-pixel R3 (R data)
(11) Image data of sub-pixel G3 (G data)
(12) Image data of sub-pixel B2 (B data)

The sorter circuit 45 sorts these decompression data into the following sequence to generate sorted image data 64-1, and supplies the sorted image data 64-1 to the display driver circuit 42-1.

(1) Image data of sub-pixel B0 (B data)
(2) Image data of sub-pixel R0 (R data)
(3) Image data of sub-pixel G0 (G data)
(4) Image data of sub-pixel B0 (B data)
(5) Image data of sub-pixel R1 (R data)
(6) Image data of sub-pixel G1 (G data)
(7) Image data of sub-pixel B1 (B data)
(8) Image data of sub-pixel R2 (R data)
(9) Image data of sub-pixel G2 (G data)
(10) Image data of sub-pixel B2 (B data)
(11) Image data of sub-pixel R3 (R data)
(12) Image data of sub-pixel G3 (G data)

The display driver circuit 42-1 drives the source lines S1 through S12 in response to the sorted image data 64-1 input in this type of sequence.

Rather than the original dummy data, the image data for the sub-pixel B0 is allocated to the dummy sub-pixel 13. However, the dummy sub-pixel 13 does not actually contribute to the display so not restoring the original dummy data does not cause a problem.

In the above description, image data for the sub-pixel B0 was copied and used however, image data from the sub-pixels B1, B2, B3 may be copied as well. In order to reduce deterioration in the above described image quality copying and using the image data for the sub-pixel B0 in closest contact with the dummy sub-pixel 13 will prove preferable.

As illustrated in FIG. 9B, the image data 51-1 for section B2 of the liquid crystal display panel 2 is input to the sorter circuit 35 of the compression-sorter circuit 34-1 in the following sequence (time sequence or spatial sequence).

(1) Image data of sub-pixel B3 (B data)
(2) Image data of sub-pixel R4 (R data)
(3) Image data of sub-pixel G4 (G data)
(4) Image data of sub-pixel B4 (B data)
(5) Image data of sub-pixel R5 (R data)
(6) Image data of sub-pixel G5 (G data)
(7) Image data of sub-pixel B5 (B data)
(8) Image data of sub-pixel R6 (R data)
(9) Image data of sub-pixel G6 (G data)
(10) Image data of sub-pixel B6 (B data)
(11) Image data of sub-pixel R7 (R data)
(12) Image data of sub-pixel G7 (G data)

The sorter circuit 35 sorts these image data in the following sequence to generate the image data 53-1, and supplies the generated sorted image data 53-1 to the compression circuit 36:

(1) Image data of sub-pixel R4 (R data)
(2) Image data of sub-pixel G4 (G data)
(3) Image data of sub-pixel B3 (B data)
(4) Image data of sub-pixel R5 (R data)
(5) Image data of sub-pixel G5 (G data)
(6) Image data of sub-pixel B4 (B data)
(7) Image data of sub-pixel R6 (R data)
(8) Image data of sub-pixel G6 (G data)
(9) Image data of sub-pixel B5 (B data)
(10) Image data of sub-pixel R7 (R data)
(11) Image data of sub-pixel G7 (G data)
(12) Image data of sub-pixel B6 (B data)

The compression circuit 36 compresses the sorted image data 53-1 that was input in this type of sequence, and generates the compression data 54-1.

The sorter circuit 45 of the decompress-sorter circuit 41-1 implements "sorting" processing so as to restore the original image data 51-1 from the decompression data 62-1 to the original state. More specifically, the decompression circuit 44 outputs the decompression data 62-1 in the following sequence:

(1) Image data of sub-pixel R4 (R data)
(2) Image data of sub-pixel G4 (G data)
(3) Image data of sub-pixel B3 (B data)
(4) Image data of sub-pixel R5 (R data)
(5) Image data of sub-pixel G5 (G data)
(6) Image data of sub-pixel B4 (B data)
(7) Image data of sub-pixel R6 (R data)
(8) Image data of sub-pixel G6 (G data)
(9) Image data of sub-pixel B5 (B data)
(10) Image data of sub-pixel R7 (R data)
(11) Image data of sub-pixel G7 (G data)
(12) Image data of sub-pixel B6 (B data)

The sorter circuit 45 sorts these decompression data into a sequence identical to the original image data 51-1 to generate the sorted image data 64-1, and supplies the sorted image data 64-1 to the display driver circuit 42-1. This display driver circuit 42-1 drives the source lines S13 through S24 in response to the sorted image data 64-1 that was input in this type of sequence.

Also, as shown in FIG. 9C, in section B3 of the liquid crystal display panel 2, the image data 51-1 is input to the sorter circuit 35 of the compression-sorter circuit 34-1 in the following sequence (time sequence or spatial sequence):

(1) Image data of sub-pixel B223 (B data)
(2) Image data of sub-pixel R224 (R data)
(3) Image data of sub-pixel G224 (G data)
(4) Image data of sub-pixel B224 (B data)
(5) Image data of sub-pixel R225 (R data)
(6) Image data of sub-pixel G225 (G data)
(7) Image data of sub-pixel B225 (B data)
(8) Image data of sub-pixel R226 (R data)
(9) Image data of sub-pixel G226 (G data)

The sorter circuit 35 implements "sorting" processing on these image data to generate the sorted image data 53-1 and supplies this generated sorted image data 53-1 to the compression circuit 36. However, when compression processing was implemented in units of four pixels 11, the number of pixels 11 driven by the source driver 4-1 is 227 pixels (=681/3) so that the section B3 only has image 51-1 for three pixels 11. Whereupon, in the "sorting" processing, the image data for one pixel 11 positioned at the end of a section corresponding to the source driver 4-1 of liquid crystal display panel 2, is copied as the image data for the pixels 11 that are lacking in the compression processing.

Namely, the sorter circuit 35 sorts the above image data in the following sequence to generate the image data 53-1:

(1) Image data of sub-pixel R224 (R data)
(2) Image data of sub-pixel G224 (G data)
(3) Image data of sub-pixel B223 (B data)
(4) Image data of sub-pixel R225 (R data)
(5) Image data of sub-pixel G225 (G data)
(6) Image data of sub-pixel B224 (B data)
(7) Image data of sub-pixel R226 (R data)
(8) Image data of sub-pixel G226 (G data)
(9) Image data of sub-pixel B225 (B data)
(10) Image data of sub-pixel R226 (R data)
(11) Image data of sub-pixel G226 (G data)
(12) Image data of sub-pixel B225 (B data)

Here the reader should be aware that the sorted image data 53-1 contains redundant image data 51-1 for the sub-pixel R226, G226, B226. The compression circuit 36 implements compression processing of the sorted image data 53-1 that was input in this type of sequence, to generate the compression data 54-1.

The sorter circuit 45 of decompress-sorter circuit 41-1 implements "sorting" processing so as to restore the original image data 51-1 from the decompression data 62-1. More specifically, the decompression circuit 44 outputs the decompression data 62-1 in the following sequence:

(1) Decompression data of sub-pixel R224 (R data)
(2) Decompression data of sub-pixel G224 (G data)
(3) Decompression data of sub-pixel B223 (B data)
(4) Decompression data of sub-pixel R225 (R data)
(5) Decompression data of sub-pixel G225 (G data)
(6) Decompression data of sub-pixel B224 (B data)
(7) Decompression data of sub-pixel R226 (R data)
(8) Decompression data of sub-pixel G226 (G data)
(9) Decompression data of sub-pixel B225 (B data)
(10) Decompression data of sub-pixel R226 (R data)
(11) Decompression data of sub-pixel G226 (G data)
(12) Decompression data of sub-pixel B225 (B data)

The sorter circuit 45 sorts these decompression data into the same sequence as the original image data 51-1 to generate the sorted image data 64-1, and supplies this sorted image data 64-1 to the display driver circuit 42-1. The decompression data for the redundant sub-pixels R226, G226, B225 is deleted. The display driver circuit 42-1 drives the source lines S673 through S681 in response to the sorted image data 64-1 that was input in this type of sequence.

The same processing is also performed in the sorter circuit 35 of compression-sorter circuit 34 and the sorter circuit 45 for the decompress-sorter circuit 41 in the other source drivers. If at this time a non-zero fraction occurs when the number of pixels capable of being driven by each source driver 4 is divided by the number α of pixel 11 units in the compression processing (four in the present embodiment), then the image data for the pixel 11 positioned at the end of the section corresponding to each source driver is copied as needed and used in the compression processing. More specifically, when the number N of pixels corresponding to the source driver 4-1 for each horizontal line is divided by the number α of pixel units in the compression processing and the obtained surplus is β, image data for (α−β) pixels 11 is copied and utilized.

As described above, in the present embodiment, sorter circuits (35, 45) are formed respectively for the timing controller 3 and the source driver 4, and implement sorting processing on the image data in a time sequence and/or spatial sequence. In this way, data transfer to the display device driver can be implemented to drive the display devices having pixel color placement that is different on each line, while utilizing compression processing having minimal image quality deterioration and that utilizes the color (chrominance) information with high efficiency.

In this, sorting processing, and in this compression processing of pixels containing dummy sub-pixels, an operation to copy image data of nearby sub-pixels is implemented rather than image data corresponding to dummy sub-pixels. Image deterioration during the compression processing is prevented in this way.

Also, in the case where the number of pixel units in the compression processing does not match the number of source driver 4 outputs, an operation to copy image data so as to match the number of pixel units in the compression processing is implemented in the sorting processing. The problem of the number of pixel units in the compression processing not matching the number of outputs of the source driver 4 is in this way resolved.

Second Embodiment

Figure 10A:
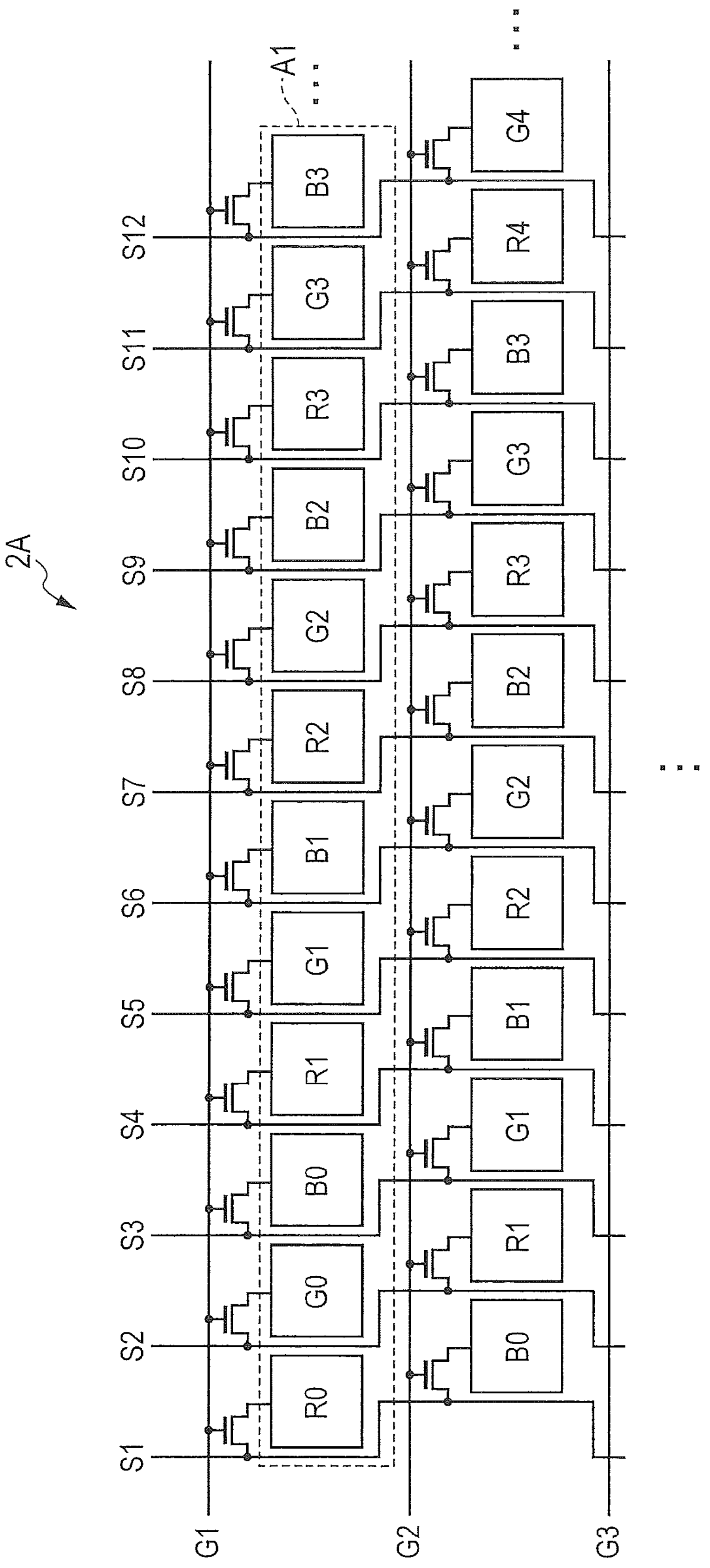
FIG. 10A is a drawing showing the pixel color placement in the liquid crystal display panel of the second embodiment.
Figure 10B:
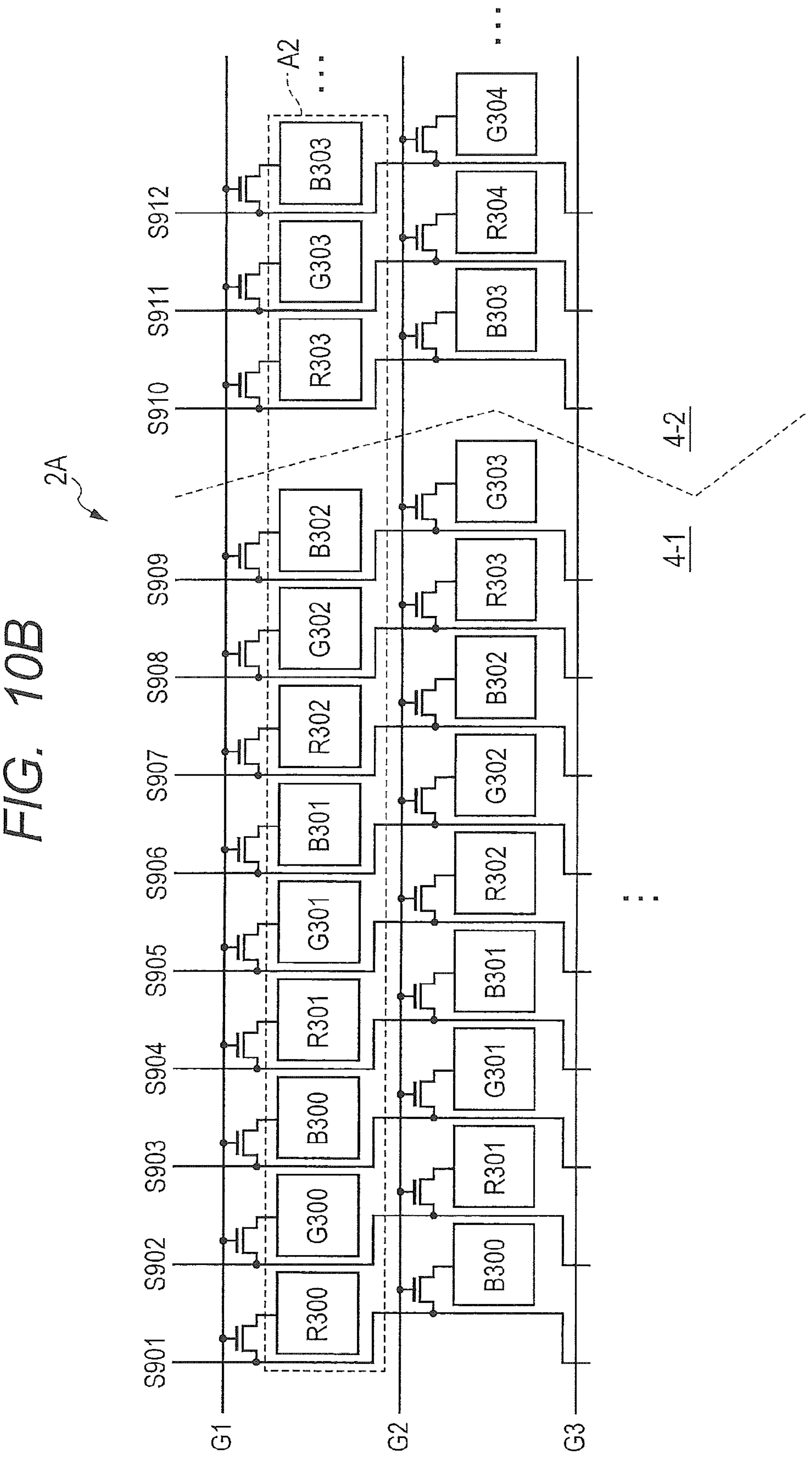
FIG. 10B is a drawing showing the pixel color placement in the liquid crystal display panel of the second embodiment.

FIG. 10A and FIG. 10B are drawings showing the structure of the liquid crystal display panel 2A in the second embodiment. The placement of the R sub-pixels, G sub-pixels, and B sub-pixels in the liquid crystal display panel is not limited to the placement illustrated in FIG. 6A and FIG. 6B. In the present embodiment, a liquid crystal display panel 2A is utilized that employs the so-called delta placement for the R sub-pixels, G sub-pixels, and B sub-pixels as shown in FIG. 10A and FIG. 10B. The structure of the other liquid crystal display devices 1 is identical to the structures illustrated in FIG. 2A and FIG. 3.

Even in the liquid crystal display panel 2A utilized in the present embodiment, the color placement of the sub-pixels is different between the pixel line (odd-numbered horizontal lines) coupled to the odd-numbered gate lines G1, G3, G5 . . . , and the pixel lines (even-numbered horizontal lines) coupled to the even-numbered gate lines G2, G4, G6 . . . . On the odd-numbered horizontal lines, the R sub-pixels, G sub-pixels, and B sub-pixels are respectively coupled to the source lines S1, S2, S3, and the sub-pixels 12 are coupled in the same sequence to the remaining source lines. On the even-numbered horizontal lines on the other hand, the B sub-pixels, R sub-pixels, and G sub-pixels are respectively coupled to the source lines S1, S2, S3, and the sub-pixels 12 are coupled in the same sequence to the remaining source lines.

Even when driving of the liquid crystal display panel 2A utilizing this type of structure, different "sorting" processing is implemented on the odd-numbered horizontal lines and even-numbered horizontal lines. Hereafter, the "sorting" processing on the odd-numbered horizontal lines, and the "sorting" processing on the even-numbered horizontal lines are described. The description given for these "sorting" processing presumes that the number of outputs for each of the source drivers 4-i is the same as above other than for 909.

Figure 11A:
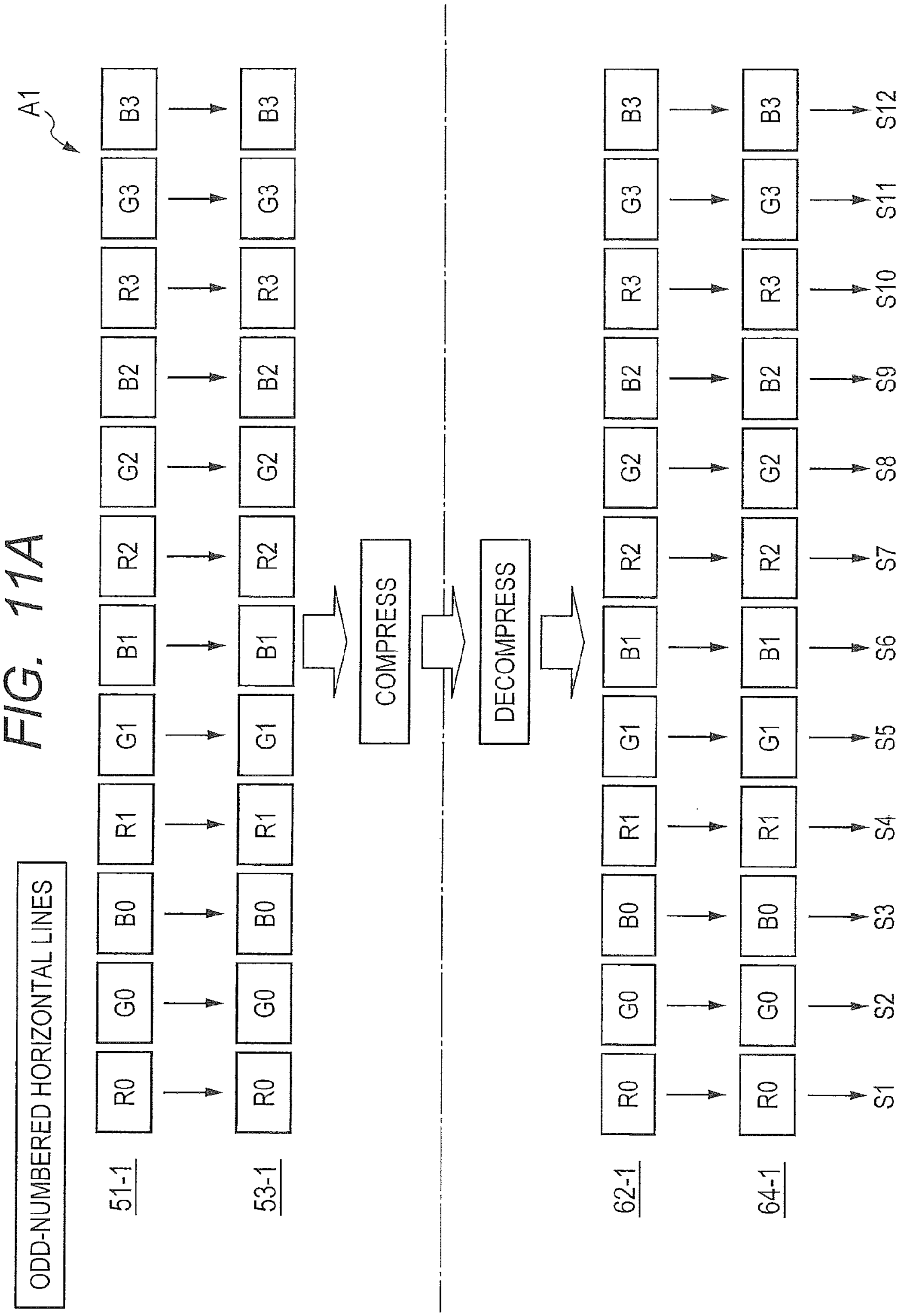
FIG. 11A is a concept view showing the "sorting" processing performed on the odd-numbered horizontal lines in the second embodiment.
Figure 11B:
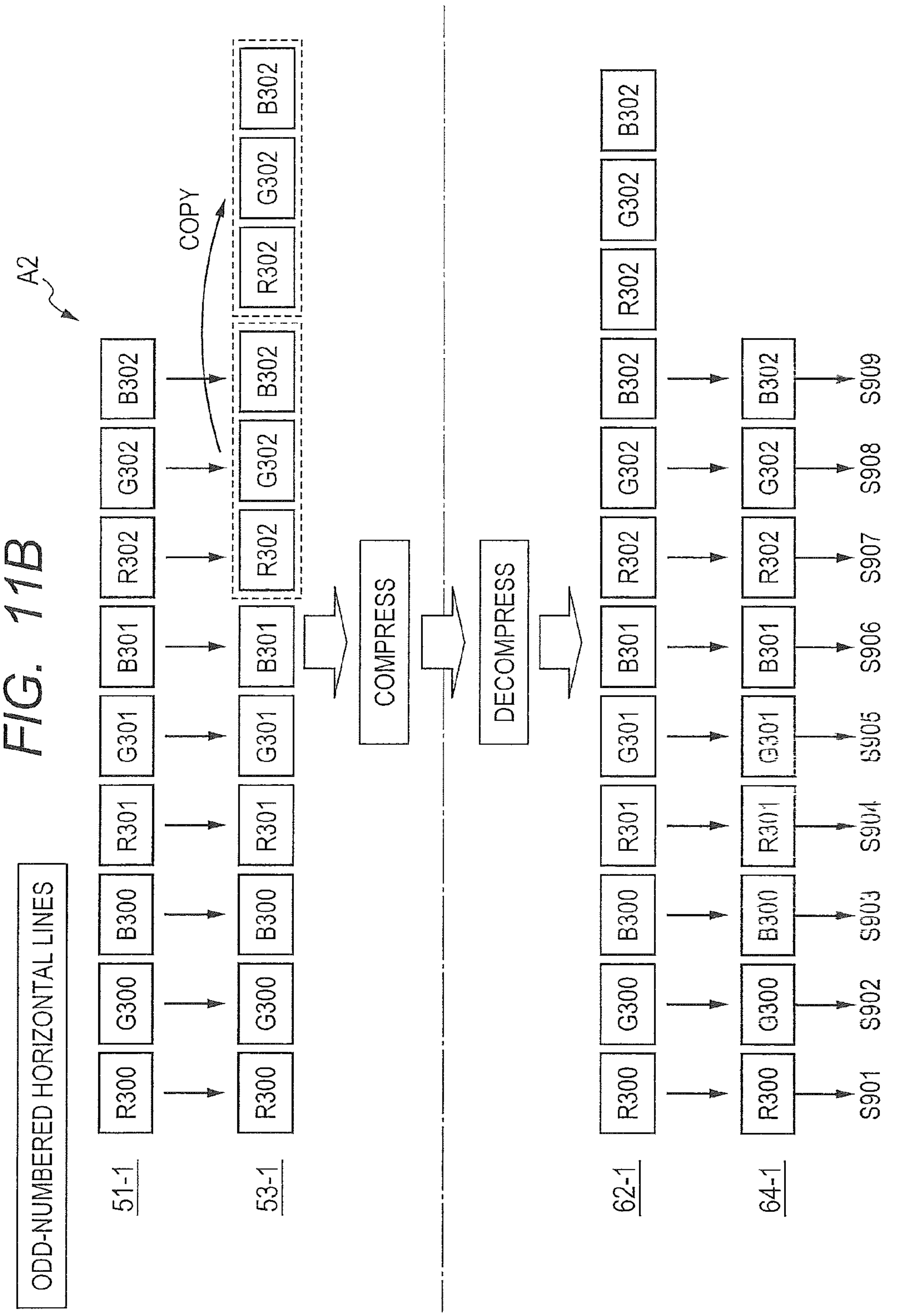
FIG. 11B is a concept view showing the "sorting" processing performed on the odd-numbered horizontal lines in the second embodiment.

FIG. 11A and FIG. 11B is a drawing showing details of the "sorting" processing implemented on the image data 51-1 corresponding to the pixel 11 in the odd-numbered horizontal line of the liquid crystal display panel 2A having the structures shown in FIG. 10A and FIG. 10B. More specifically, FIG. 11A shows details of the "sorting" processing implemented on the image data 51-1 corresponding to the pixel 11 positioned on section A1 (See FIG. 10A) of the liquid crystal display panel 2. FIG. 11B on the other hand, shows details of the "sorting" processing implemented on the image data 51-1 corresponding to the pixel 11 positioned on the section A2 of the liquid crystal display panel 2. Here, the section A2 is a section where the nine sub-pixels R300, G300, B300, R301, G301, B301, R302, G302, B302 are formed, positioned on the right end (border with section corresponding to the source driver 4-2) of the section corresponding to the source driver 4-1 of the odd-numbered horizontal lines.

Basically as shown in FIG. 11A, no "sorting" processing is performed on the odd-numbered horizontal lines. Namely, the image data for the sub-pixels R0, G0, B0, R1, G1, B1, R2, G2, B2, R3, G3, B3 is input unchanged to the $R_A$, $G_A$, $B_A$, $R_B$, $G_B$, $B_B$, $R_C$, $G_C$, $B_C$, $R_D$, $G_D$, $B_D$, of the compression processor unit 36*b* of compression circuit 36. Moreover, the decompression data for the sub-pixels R0, G0, B0, R1, G1, B1, R2, G2, B2, R3, G3, B3 output from the outputs $R_A$, $G_A$, $B_A$, $R_B$, $G_B$, $B_B$, $R_C$, $G_C$, $B_C$, $R_D$, $G_D$, $B_D$ in the decompression processing unit 44*a* of the decompression circuit 44 are utilized unchanged to drive the source lines S1 through S12.

However as illustrated in FIG. 11B, since the number of pixels 11 for driving the source driver 4-1 is 303 pixels (=909/3) for the compression processing implemented in units of four pixels 11, there are 3 pixels 11 in the section A2, in other words only the image data 51-1 corresponds to nine sub-pixels 12. Whereupon, in the "sorting" processing, the image data for a specified number of sub-pixels 12 (namely, the sub-pixels R226, G226, B226) positioned at the end of a section corresponding to the source driver 4-1 of the liquid crystal display panel 2, are copied as the image data for the pixels that are lacking in the compression processing. In the example in FIG. 11B, the image data for the sub-pixels R300, G300, B300, R301, G301, B301, R302, G302, B302 is respectively input to the inputs $R_A$, $G_A$, $B_A$, $R_B$, $G_B$, $B_B$, $R_C$, $G_C$, $B_C$ in the compression processor unit 36*b* of compression circuit 36. Further, the image data 51-1 for the sub-pixels R302, G302, B302 is redundantly input to the inputs $R_D$, $G_D$, $B_D$ in the compression processor unit 36*b*. At this time, the decompression data for the R300, G300, B300, R301, G301, B301, R302, G302, B302 output from the outputs $R_A$, $G_A$, $B_A$, $R_B$, $G_B$, $B_B$, $R_C$, $G_C$, $B_C$ in the decompression processing unit 44*a* of decompression circuit 44 is utilized unchanged to drive the source lines S901 through S909. The decompression data for the sub-pixels R302, G302, B302 output from the outputs $R_D$, $G_D$, $B_D$ of the decompression processing unit 44*a* is utilized to drive the source lines.

Figure 12A:
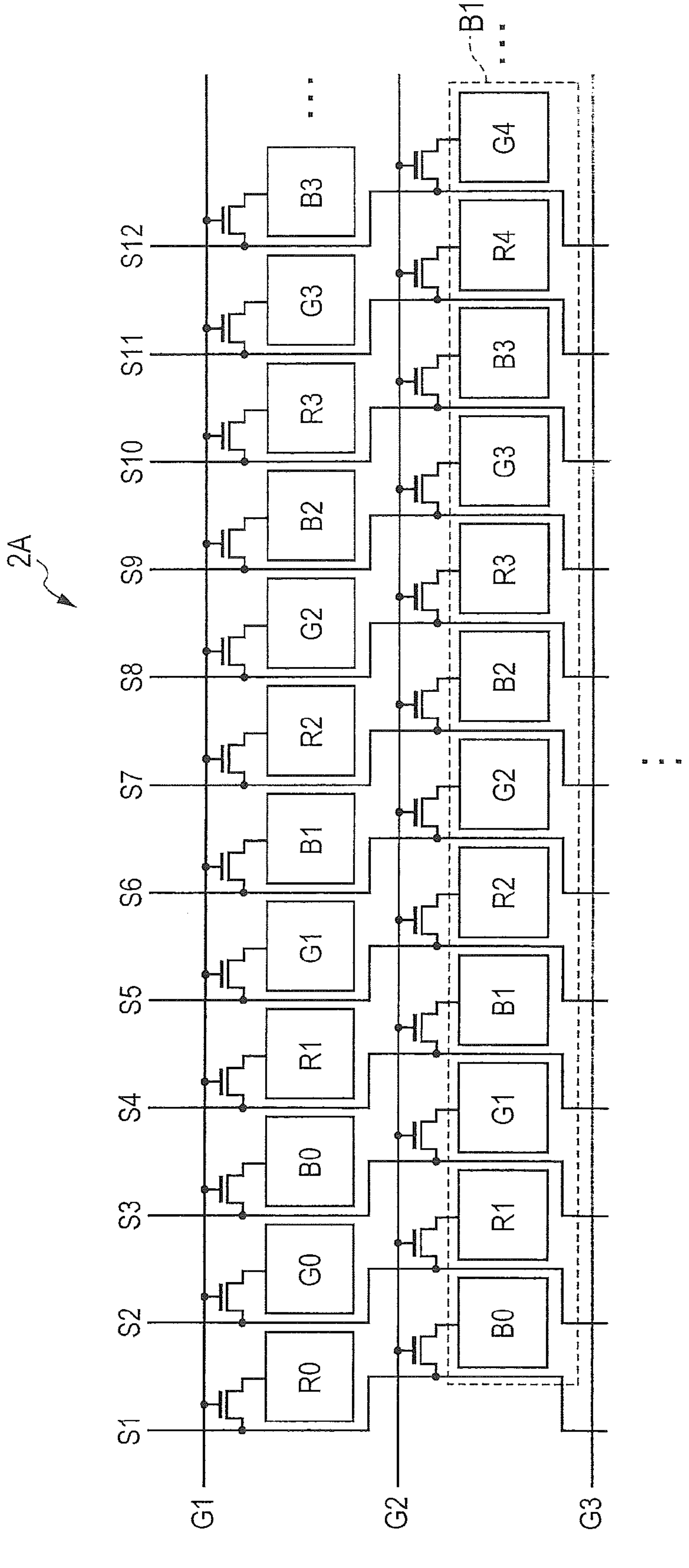
FIG. 12A is a drawing showing the pixel color placement in the liquid crystal display panel of the second embodiment.
Figure 12B:
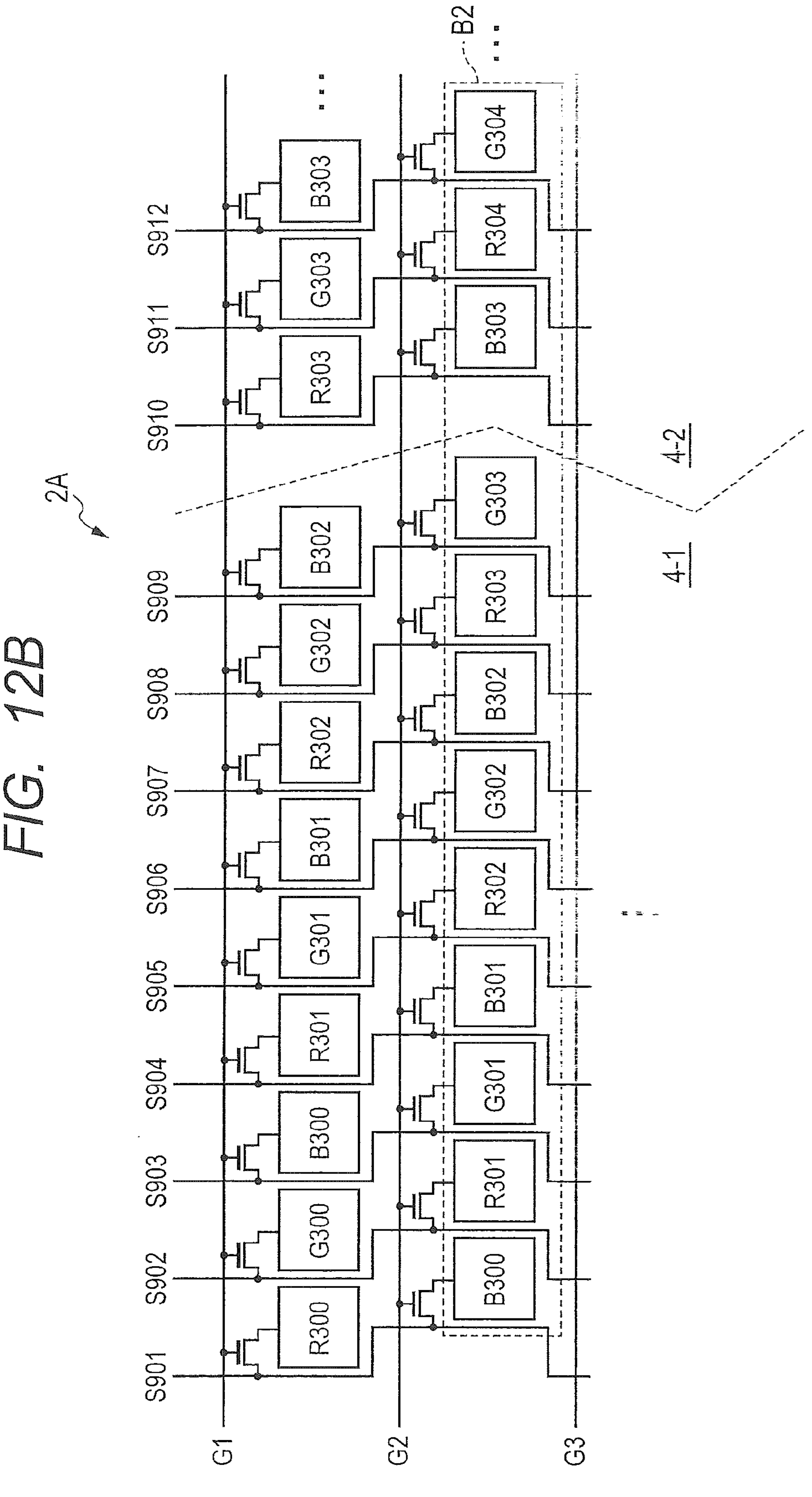
FIG. 12B is a drawing showing the pixel color placement in the liquid crystal display panel of the second embodiment.
Figure 13A:
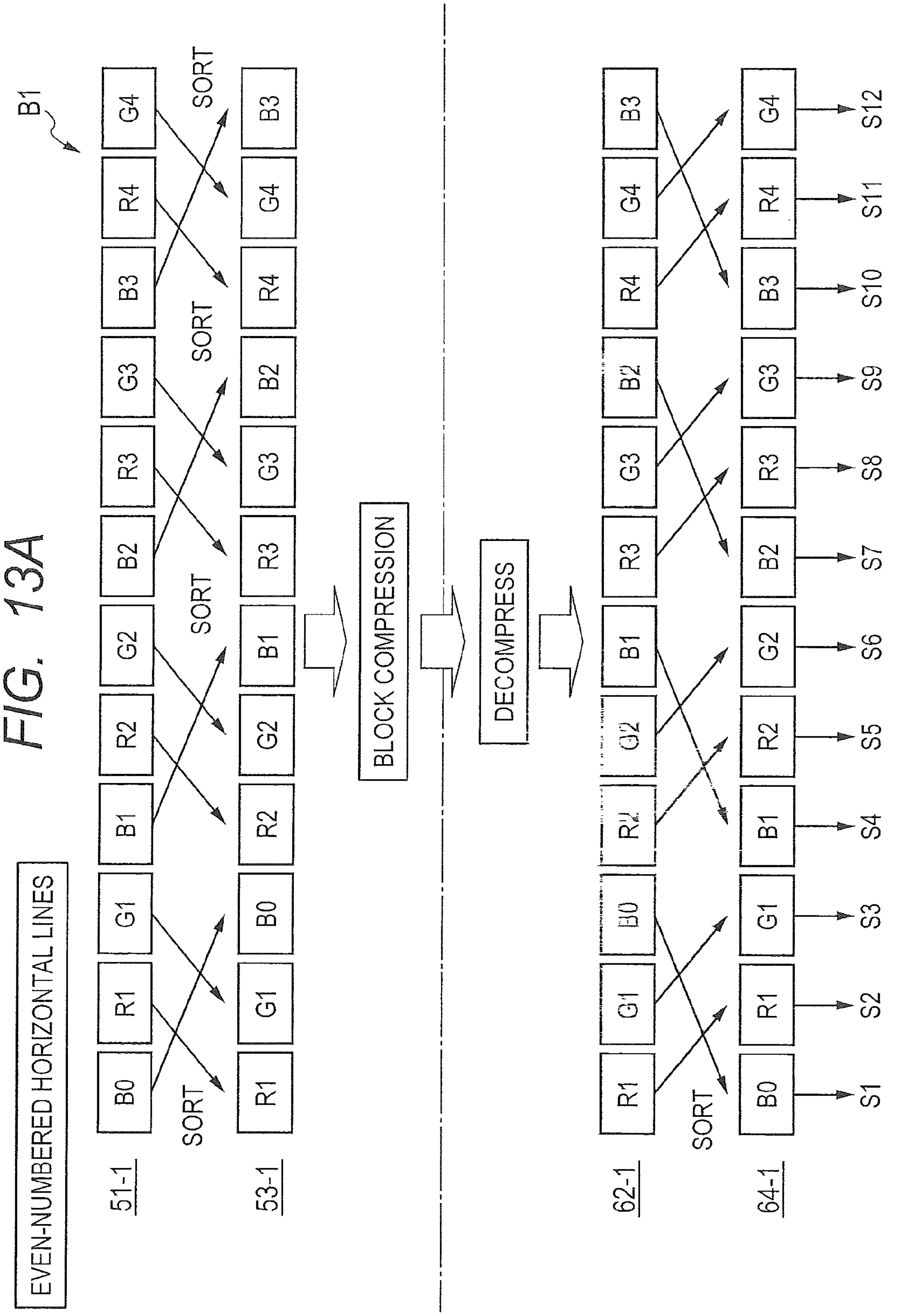
FIG. 13A is a concept view showing the "sorting" processing performed on the even-numbered horizontal lines in the second embodiment.
Figure 13B:
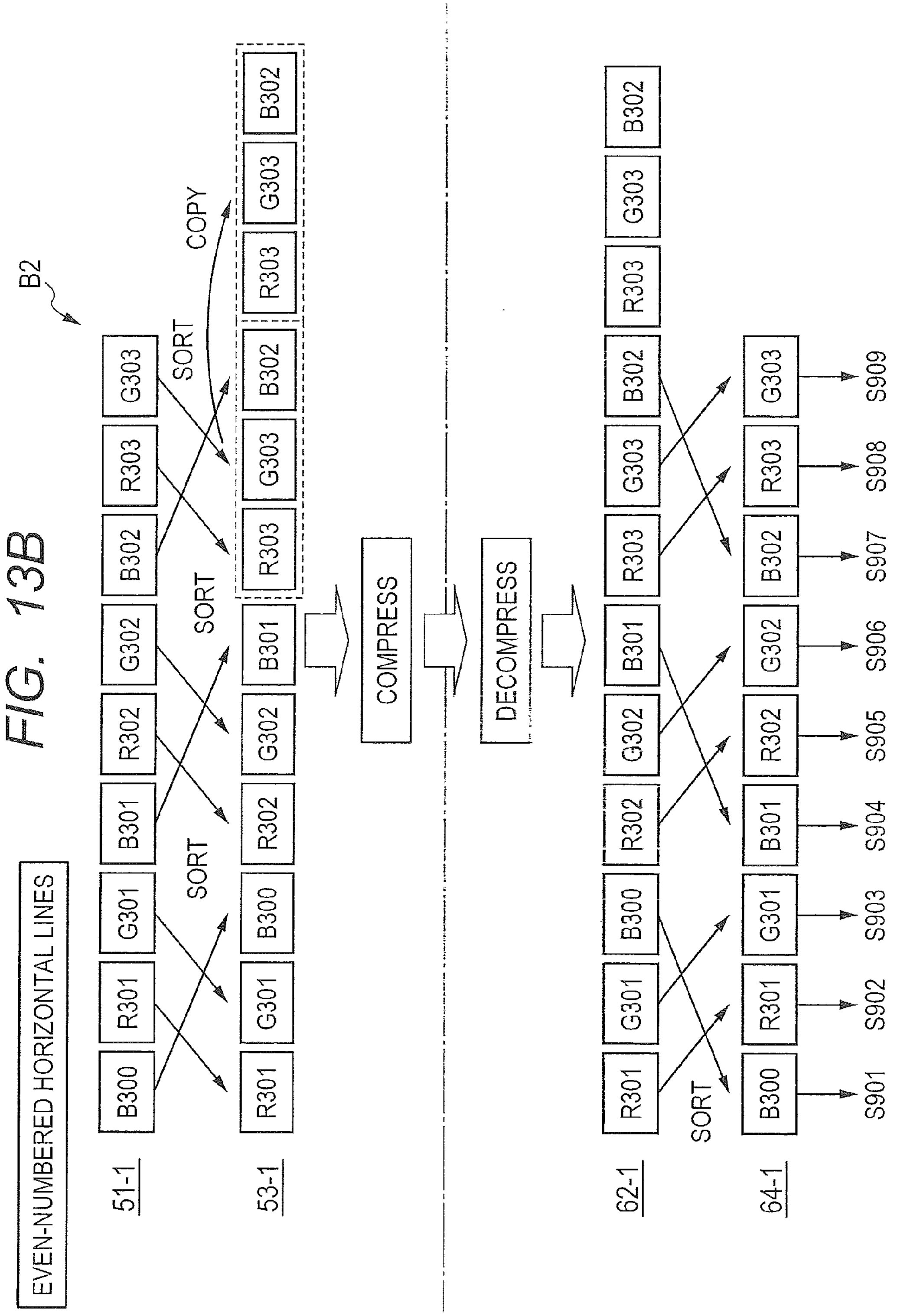
FIG. 13B is a concept view showing the "sorting" processing performed on the even-numbered horizontal lines in the second embodiment.

FIG. 13A and FIG. 13B on the other hand, are drawings showing details of the "sorting" processing implemented on the image data 51-1 corresponding to the pixel 11 for the even-numbered horizontal lines of the liquid crystal display panel 2A. More specifically, FIG. 13A shows details of the "sorting" processing implemented on the image data 51-1 corresponding to the pixel 11 positioned at section B1 (See FIG. 12A) of the liquid crystal display panel 2. FIG. 13B on the other hand, shows details of the "sorting" processing implemented on the image data 51-1 corresponding to the pixel 11 positioned at section B2 of the liquid crystal display panel 2. Here, the section B2 is the section where the nine sub-pixels R300, G300, B300, R301, G301, B301, R302, G302, B302 are formed, positioned on the right end (border with the section corresponding to the source driver 4-2) of the section corresponding to the source driver 4-1 for the even-numbered horizontal lines.

The image data 51-1 for the section B1 in the liquid crystal display panel 2 is input in the following sequence (time sequence or spatial sequence) to the sorter circuit 35 of the compression-sorter circuit 34-1 as shown in FIG. 13A.

(1) Image data of sub-pixel B0 (B data)
(2) Image data of sub-pixel R1 (R data)
(3) Image data of sub-pixel G1 (G data)
(4) Image data of sub-pixel B1 (B data)
(5) Image data of sub-pixel R2 (R data)
(6) Image data of sub-pixel G2 (G data)
(7) Image data of sub-pixel B2 (B data)
(8) Image data of sub-pixel R3 (R data)
(9) Image data of sub-pixel G3 (G data)
(10) Image data of sub-pixel B3 (B data)
(11) Image data of sub-pixel R4 (R data)
(12) Image data of sub-pixel G4 (G data)

The sorter circuit 35 sorts this image data in the following sequence, generates image data 53-1, and supplies this generated sorted image data 53-1 to the compression circuit 36.

(1) Image data of sub-pixel R1 (R data)
(2) Image data of sub-pixel G1 (G data)
(3) Image data of sub-pixel B0 (B data)
(4) Image data of sub-pixel R2 (R data)
(5) Image data of sub-pixel G2 (G data)
(6) Image data of sub-pixel B1 (B data)
(7) Image data of sub-pixel R3 (R data)
(8) Image data of sub-pixel G3 (G data)
(9) Image data of sub-pixel B2 (B data)
(10) Image data of sub-pixel R4 (R data)
(11) Image data of sub-pixel G4 (G data)
(12) Image data of sub-pixel B3 (B data)

The compression circuit 36 compresses the sorted image data 53-1 that was input in this type of sequence, to generate the compression data 54-1.

The sorter circuit 45 of the decompress-sorter circuit 41-1 implements "sorting" processing to restore the original image data 51-1 from the decompression data 62-1. More specifically, the decompression circuit 44 outputs the decompression data 62-1 in a sequence identical to that of the sorted image data 53-1. The sorter circuit 45 sorts the decompression data 62-1 into the same sequence as the original data 51-1, to generate the sorted image data 64-1, and supplies the sorted image data 64-1 to the display driver circuit 42-1. The display driver circuit 42-1 drives the source lines S1 through S12 in response to the sorted image data 64-1 input in this type of sequence.

In section B2 of the liquid crystal display panel B2 on the other hand, the image data 51-1 is input in this sequence (time sequence or spatial sequence) to the sorter circuit 35 of the compression-sorter circuit 34-1 as illustrated in FIG. 13B.

(1) Image data of sub-pixel B300 (B data)
(2) Image data of sub-pixel R301 (R data)
(3) Image data of sub-pixel G301 (G data)
(4) Image data of sub-pixel B301 (B data)
(5) Image data of sub-pixel R302 (R data)
(6) Image data of sub-pixel G302 (G data)
(7) Image data of sub-pixel B302 (B data)
(8) Image data of sub-pixel R303 (R data)
(9) Image data of sub-pixel G303 (G data)

The sorter circuit 35 implements the "sorting" processing on this image data to generate the sorted image data 53-1, and supplies the generated sorted image data 53-1 to the compression circuit 36. However, as illustrated in FIG. 13B, since the number of pixels 11 for driving the source driver 4-1 is 303 pixels (=909/3) for the compression processing implemented in units of four pixels 11, there are 3 pixels 11 in the section A2 in other words, only the image data 51-1 corresponds to nine sub-pixels 12. Whereupon, in the "sorting" processing, the image data for a specified number of pixels 11 positioned at the end of a section corresponding to the source driver 4-1 of the liquid crystal display panel 2, are copied as the image data for the sub-pixels 12 that are lacking in the compression processing.

The sorter circuit 35 in other words sorts the above image data in the following sequence to generate the sorted image data 53-1.

(1) Image data of sub-pixel R301 (R data)
(2) Image data of sub-pixel G301 (G data)
(3) Image data of sub-pixel B300 (B data)
(4) Image data of sub-pixel R302 (R data)
(5) Image data of sub-pixel G302 (G data)
(6) Image data of sub-pixel B301 (B data)
(7) Image data of sub-pixel R303 (R data)
(8) Image data of sub-pixel 6303 (G data)
(9) Image data of sub-pixel B302 (B data)
(10) Image data of sub-pixel R303 (R data)
(11) Image data of sub-pixel G303 (G data)
(12) Image data of sub-pixel B302 (B data)

Here, the reader should be aware that the sorted image data 53-1 contains redundant image data 51-1 for the sub-pixels R303, 6303, B302. The compression circuit 36 implements compression processing of the sorted image data 53-1 that was input in this type of sequence, to generate the compression data 54-1.

The sorter circuit 45 of the decompress-sorter circuit 41-1 implements "sorting" processing so as to restore the original image data 51-1 from the decompression data 62-1. More specifically, the decompression circuit 44 outputs the decompression data 62-1 in the same sequence as the sorted image data 53-1.

The sorter circuit 45 sorts this decompression data in the same sequence as the original image data 51-1 to generate the sorted image data 64-1, and supplies this sorted image data 64-1 to the display driver circuit 42-1. The decompression data for the redundant sub-pixels R303, G303, B302 is deleted. The display driver circuit 42-1 drives these source lines S901 through S909 in response to the sorted image data 64-1 that was input in this type of sequence.

The liquid crystal display device 1 may also be configured with a structure that does not generate fractions when the number of pixels capable of being driven by each source driver 4 is divided by the number of pixels 11 (four in this embodiment) units for compression processing. In such cases, during the "sorting" processing, there is no need to copy the image data for the pixel 11 positioned at the end of the section corresponding to each source driver 4.

Figure 14A:
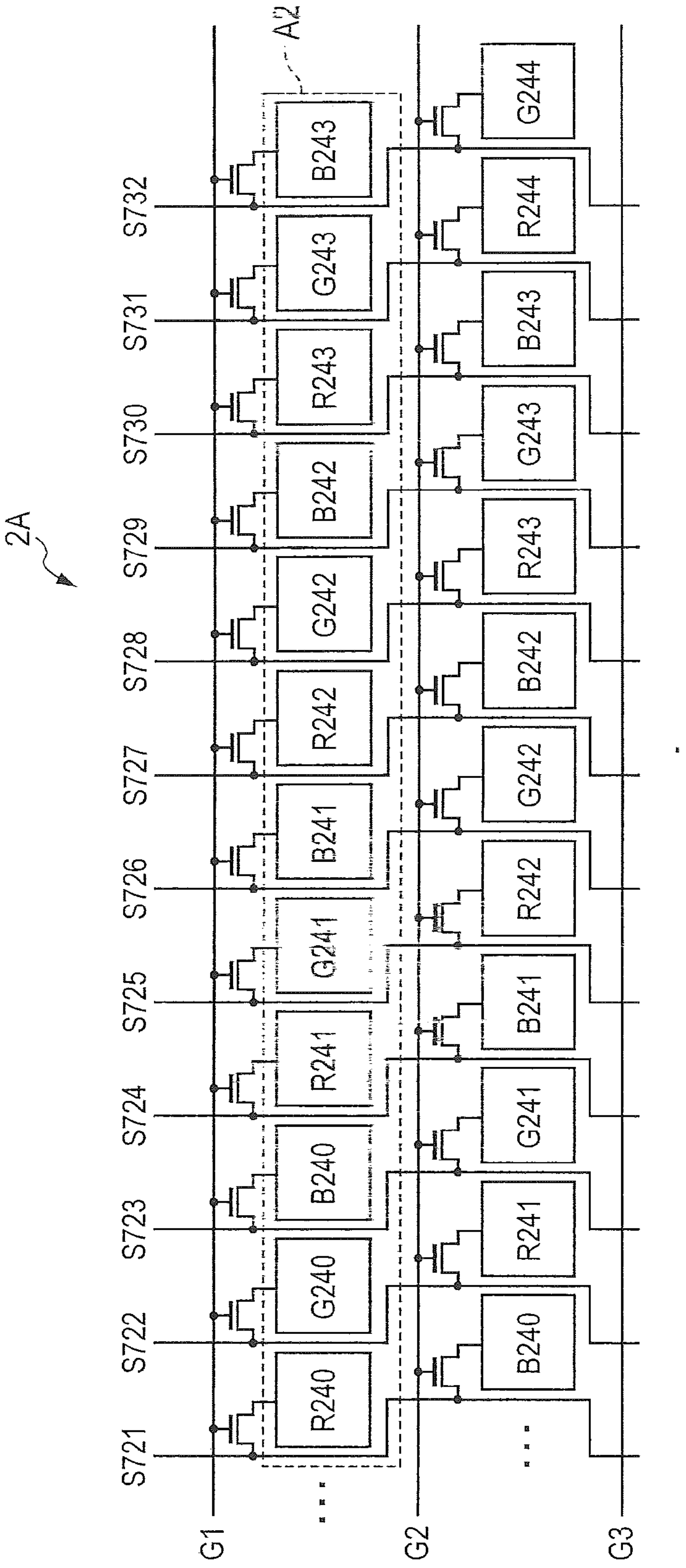
FIG. 14A is a drawing showing the pixel color placement in the liquid crystal display panel of the second embodiment.
Figure 14B:
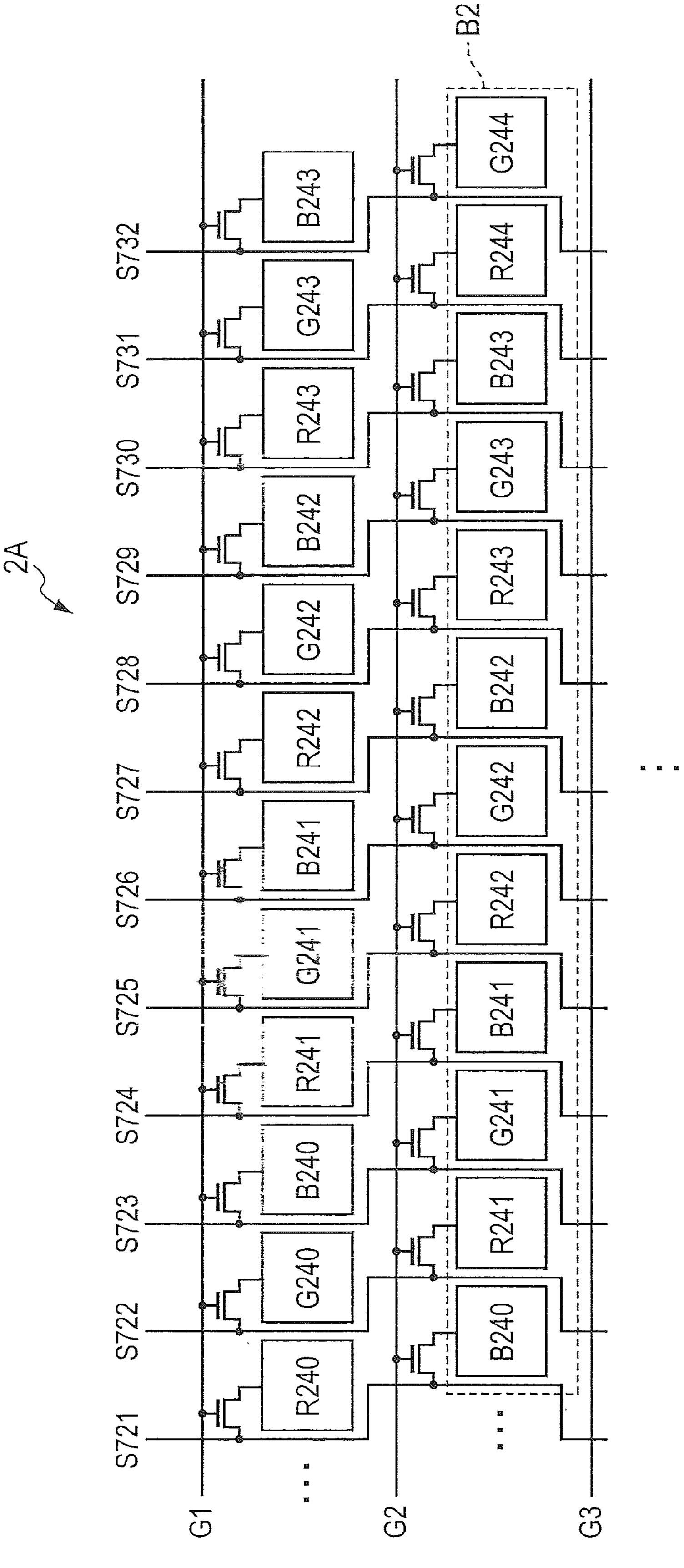
FIG. 14B is a drawing showing the pixel color placement in the liquid crystal display panel of the second embodiment.

For example when the number of outputs is 732 for each source driver 4 as shown in FIG. 14A and FIG. 14B, the number of pixels 11 capable of being driven by each of the source drivers 4 is 244 pixels. In this case, no fractions occur when the number of pixels 11 (namely, 244) capable of being driven by each source driver 4 is divided by the number of pixels 11 units in compression processing.

Figure 15A:
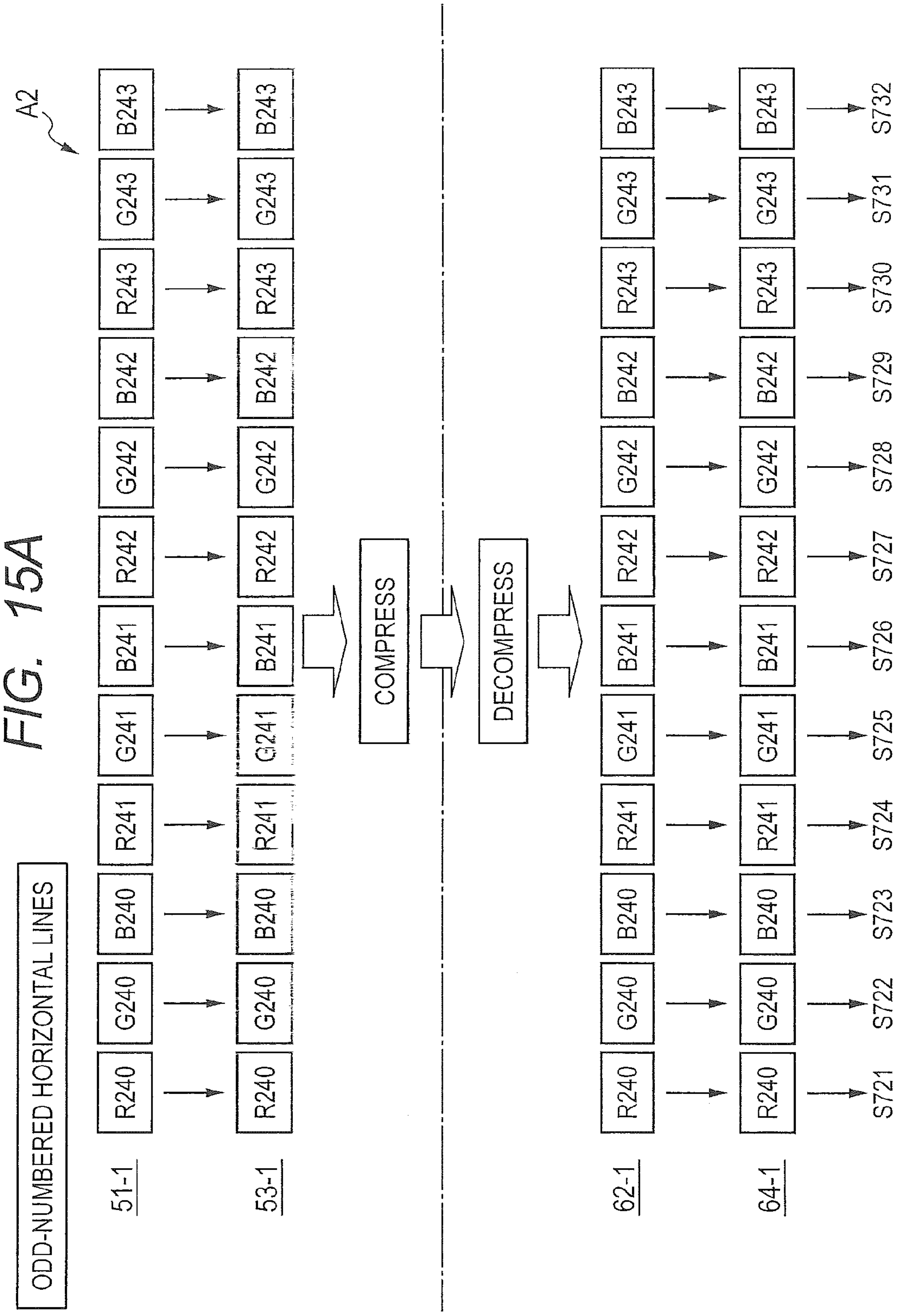
FIG. 15A is a concept view showing the "sorting" processing performed on the odd-numbered horizontal lines in the second embodiment.
Figure 15B:
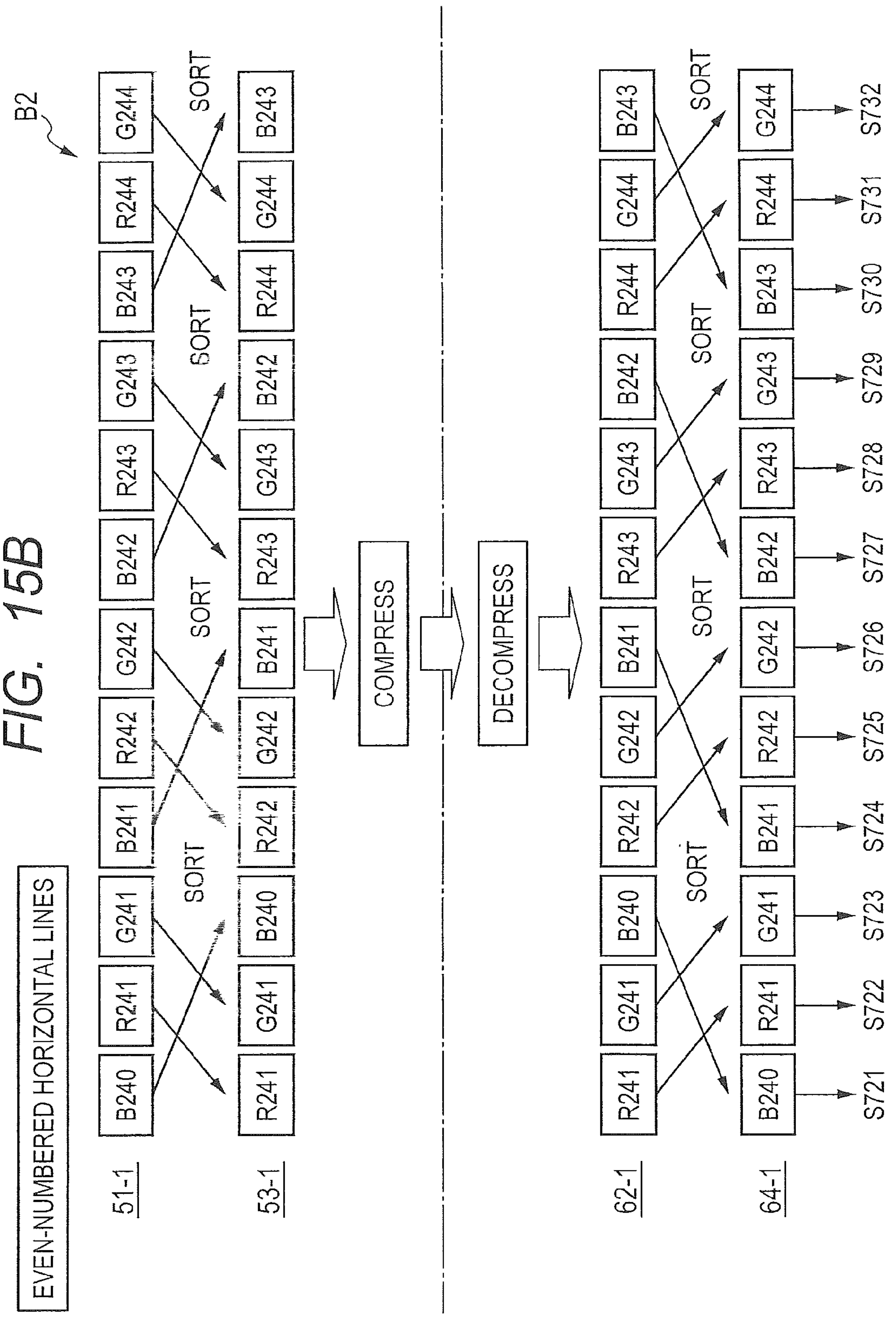
FIG. 15B is a concept view showing the "sorting" processing performed on the even-numbered horizontal lines in the second embodiment.

FIG. 15A and FIG. 15B are drawings showing details of the "sorting" processing implemented on the odd-numbered horizontal lines and even-numbered horizontal lines of the liquid crystal display panel 2A having the structures shown in FIG. 14A and FIG. 14B. Here, FIG. 15A shows details of the "sorting" processing implemented on the image data 51-1 corresponding to the pixel 11 positioned on section A2 (See FIG. 14A) of the liquid crystal display panel 2. FIG. 15B on the other hand, shows details of the "sorting" processing implemented on the image data 51-1 corresponding to the pixel 11 positioned on the section B2 of the liquid crystal display panel 2A. In this embodiment, only interchanging of the sequence of image data for the R sub-pixel, G sub-pixel, and B sub-pixel is implemented and there is no copying of image data for the sub-pixel 12 positioned at the end of the section corresponding to each source driver 4.

The same processing is also performed in the sorter circuit 35 of compression-sorter circuit 34 and the sorter circuit 45 for the decompress-sorter circuit 41 for the other source drivers 4. If at this time a non-zero fraction occurs when the number of pixels capable of being driven by each source driver 4 is divided by the number of pixel 11 units in the compression process (four in the present embodiment), then the image data for the pixel 11 positioned at the end of the section corresponding to each source driver is copied as needed and used in the compression processing.

Third Embodiment

Figure 16A:
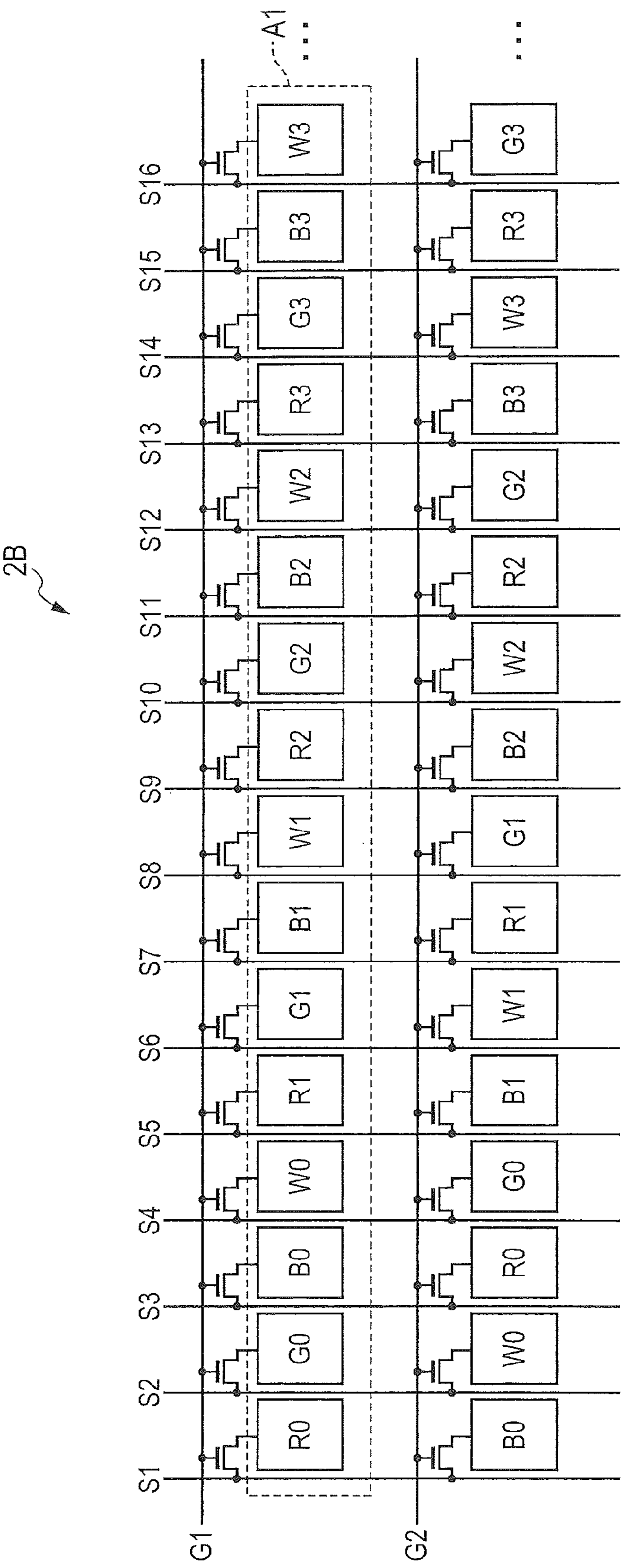
FIG. 16A is a drawing showing the pixel color placement in the liquid crystal display panel of the third embodiment.
Figure 16B:
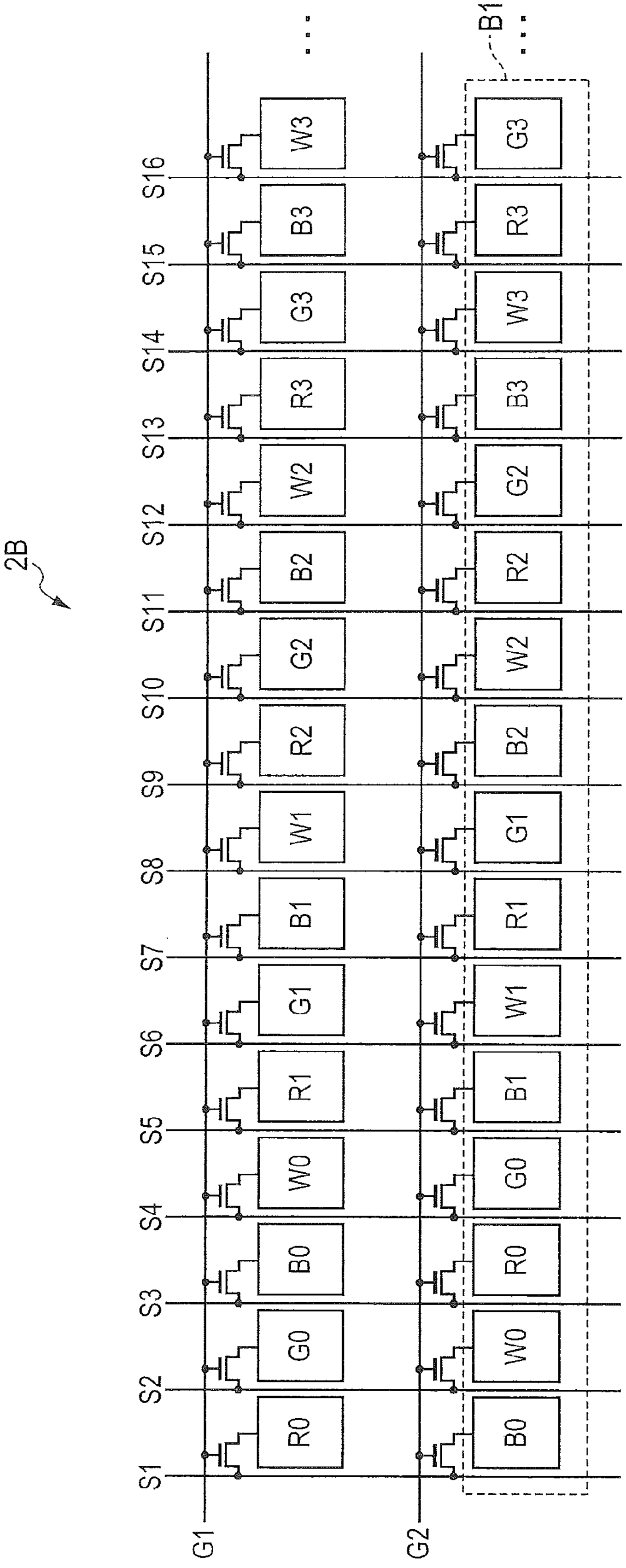
FIG. 16B is a drawing showing the pixel color placement in the liquid crystal display panel of the third embodiment.

FIG. 16A and FIG. 16B are drawings showing the structure of the liquid crystal display panel 2B in the third embodiment. This third embodiment utilizes a liquid crystal display panel 2B having the structure in which each pixel 11 contains the four sub-pixels or namely the R sub-pixels, G sub-pixels, B sub-pixels, and W sub-pixels. Here, the W sub-pixel is a sub-pixel for displaying a white color. The other structure of the liquid crystal display devices 1 is identical to the structures illustrated in FIG. 2A and FIG. 3.

Even in the liquid crystal display panel 2B illustrated in FIG. 16A and FIG. 16B, the color placement of the sub-pixels is different between the pixel lines (odd-numbered horizontal lines) coupled to the odd-numbered gate lines G1, G3, G5 . . . , and the pixel lines (even-numbered horizontal lines) coupled to the even-numbered gate lines G2, G4, G6 . . . . More specifically, on the odd-numbered horizontal lines, the R sub-pixels, G sub-pixels, B sub-pixels, and W sub-pixels are respectively coupled to the source lines S1, S2, S3, S4 and the sub-pixels 12 are coupled in the same sequence even to the remaining source lines. On the even-numbered horizontal lines on the other hand, the B sub-pixels, W sub-pixels, R sub-pixels, G sub-pixels are respectively coupled to the source lines S1, S2, S3, S4 and the sub-pixels 12 are coupled in the same sequence even on the remaining source lines.

When driving of the liquid crystal display panel 2B, the image data corresponding to each of the R sub-pixels, G sub-pixels, B sub-pixels, and W sub-pixels in each pixel 11 is supplied from the line memory 32 to the driver unit line memories 33-1 through 33-6. Image data is further supplied from the driver unit line memories 33-1 through 33-6 to the compression-sorter circuits 34-1 through 34-6, and the image data is compressed and supplied to the source drivers 4-1 through 4-6.

Here, when video data from each pixel 11 input to the timing controller 3 from an external point is provided in RGB format, the image data for the R sub-pixels, G sub-pixels, B sub-pixels, and W sub-pixels in each pixel 11 may be calculated from the video data of the pixel 11 according to the following formula.

$$W=\min(R_{IN},G_{IN},B_{IN}) \tag{2a}$$

$$R=R_{IN}-W \tag{2b}$$

$$G=G_{IN}-W \tag{2c}$$

$$B=B_{IN}-W \tag{2d}$$

In formulas (2a) through (2d), the $R_{IN}$, $G_{IN}$, $B_{IN}$ are the red color level value, green color level value, blue color level value recorded in the RGB format video data. The W, R, G, B, are respectively image data values for the R sub-pixel, G sub-pixels, B sub-pixels, and W sub-pixels of each pixel 11.

Figure 17A:
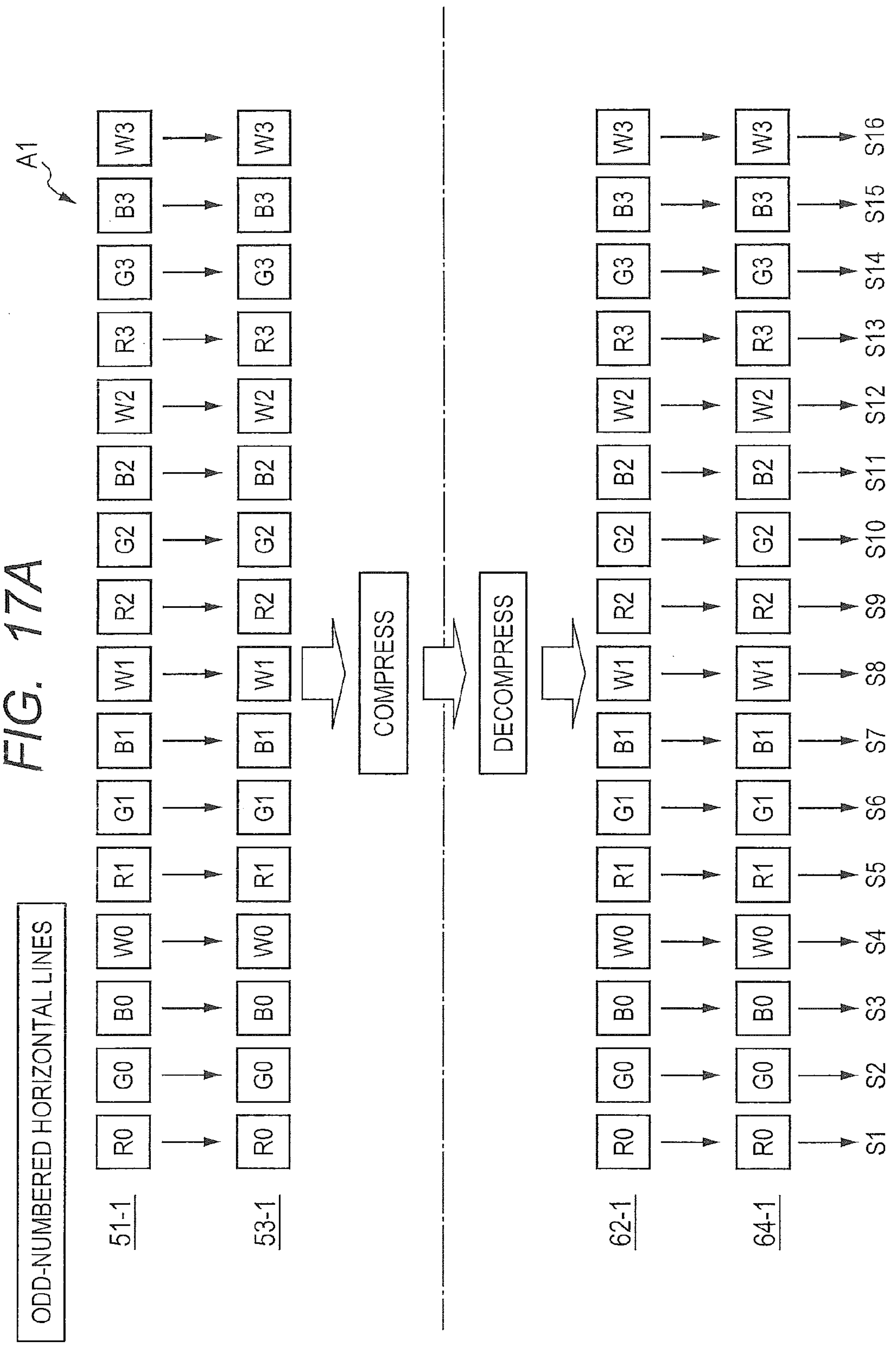
FIG. 17A is a concept view showing the "sorting" processing performed on the odd-numbered horizontal lines in the third embodiment.

FIG. 17A is a drawing showing details of the "sorting" processing implemented on the image data 51-1 corresponding to the pixels 11 for the odd-numbered horizontal lines of the liquid crystal display panel 2B having the structures shown in FIG. 16A and FIG. 16B. More specifically, FIG. 17A shows details of the "sorting" processing implemented on the image data 51-1 corresponding to the sixteen sub-pixels 12 positioned on section A1 (See FIG. 16A) of the liquid crystal display panel 2B.

There is basically no "sorting" processing performed on the odd-numbered horizontal lines as shown in FIG. 17A. In other words, the image data 51-1 for the sub-pixels R0, G0, B0, W0, R1, G1, B1, W1, R2, G2, B2, W2, R3, G3, B3, W3 is input while maintained in that time sequence or spatial sequence to the input of the compression circuit 36

Here, the compression processing implemented by the compression circuit 36 of the third embodiment, for the W sub-pixels formed in each pixel 11 is different from the compression processing implemented by the compression circuit in the first embodiment. In one embodiment the block compression described next may also be performed by the compression circuit 36.

The luminance data Y, color difference data Cb, Cr are first of all calculated for each pixel 11 by the following formulas (3a) through (3c).

$$Y=0.2989\times R+0.5866\times G+0.1145\times B \tag{3a}$$

$$Cb=-0.168\times R-0.3312\times G+0.5000\times B \tag{3b}$$

$$Cr=0.5000\times R-0.4183\times G-0.0816\times B \tag{3c}$$

Here, the R, G, B, are respectively level values for the R sub-pixel, G sub-pixels, and B sub-pixels of the image data.

The compression data 54-1 is generated so as to contain the respective luminance data Y0, Y1, Y2, Y3 for the four pixels; the W sub-pixel image data W0, W1, W2, W3; the average value Cbave of the color difference data Cb for the four pixels; and the average value Crave for the color difference data Cb of the four pixels. Here, the average value Cbave for the color difference data Cb of the four pixels, and the average value Crave for the color difference data Cb of the four pixels are calculated by the following formulas (4a) and (4b).

$$Cbave=(Cb0+Cb1+Cb2+Cb3)/4 \tag{4a}$$

$$Crave=(Cr0+Cr1+Cr2+Cr3)/4 \tag{4b}$$

In the formulas (4a) and (4b), the Cbi (i=any of 0 to 3) is color difference data Cb respectively calculated from the image data for the sub-pixels Ri, Gi, Bi; and the Cri (i=any of 0 to 3) is color difference data Cr respectively calculated from the image data for the sub-pixels Ri, Gi, Bi.

In the decompression processing in the decompression circuit 44, the image data for the sub-pixels R0, G0, B0, R1, G1, B1, R2, G2, B2, R3, G3, B3 is restored for example by way of the following formula (5-1) through (5-12).

$$R0=Y0+1.402\times(Crave-128) \tag{5-1}$$

$$G0=Y0-0.34414\times(Cbave-128)-0.71414\times(Crave-128) \tag{5-2}$$

$$B0=Y0+1.772\times(Cbave-128) \tag{5-3}$$

$$R1=Y1+1.402\times(Crave-128) \tag{5-4}$$

$$G1=Y1-0.34414\times(Cbave-128)-0.71414\times(Crave-128) \tag{5-5}$$

$$B1=Y1+1.772\times(Cbave-128) \tag{5-6}$$

$$R2=Y2+1.402\times(Crave-128) \tag{5-7}$$

$$G2=Y2-0.34414\times(Cbave-128)-0.71414\times(Crave-128) \tag{5-8}$$

$$B2=Y2+1.772\times(Cbave-128) \tag{5-9}$$

$$R3=Y3+1.402\times(Crave-128) \tag{5-10}$$

$$G3=Y3-0.34414\times(Cbave-128)-0.71414\times(Crave-128) \tag{5-11}$$

$$B3=Y3+1.772\times(Cbave-128) \tag{5-12}$$

The image data W0, W1, W2, W3 for the W sub-pixel contained in the compression data is utilized unchanged as the image data for the sub-pixel W0, W1, W2, W3 in the decompression data 62-1.

The decompression data 62-1 for the sub-pixels R0, G0, B0, W0, R1, G1, B1, W1, R2, G2, B2, W2, R3, G3, B3, W3 output from the decompression circuit 44 is input while maintained in that time sequence or spatial sequence to the display driver circuit 42-1 as the sorted image data 64-1. The display driver circuit 42-1 drives the source lines S1 through S16 in response to the sorted image data 64-1.

Figure 17B:
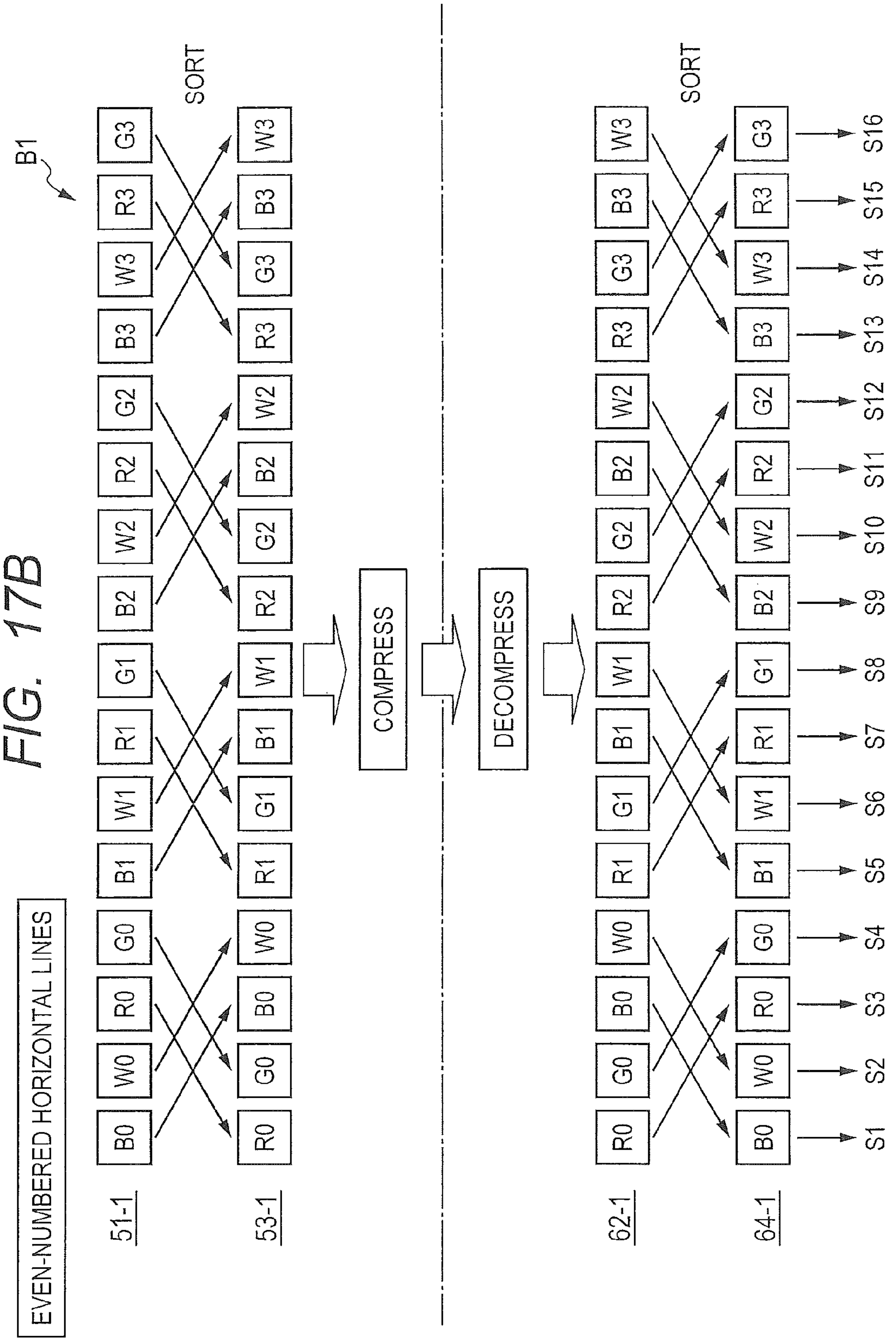
FIG. 17B is a concept view showing the "sorting" processing performed on the even-numbered horizontal lines in the third embodiment.

FIG. 17B is a drawing showing details of the "sorting" processing implemented on the image data 51-1 corresponding to the pixels 11 for the even-numbered horizontal lines of the liquid crystal display panel 2B. More specifically, FIG. 17B shows details of the "sorting" processing implemented on the image data 51-1 corresponding to the sixteen sub-pixels 12 positioned on section B1 (See FIG. 16B) of the liquid crystal display panel 2B.

As shown in FIG. 17B, the image data 51-1 for section B1 of the liquid crystal display panel 2B is input to the sorter circuit 35 of the compression-sorter circuit 34-1 in the following sequence (time sequence or spatial sequence).

(1) Image data of the sub-pixel B0 (B data)
(2) Image data of the sub-pixel W0 (W data)
(3) Image data of the sub-pixel R0 (R data)

(4) Image data of the sub-pixel G0 (G data)
(5) Image data of the sub-pixel B1 (B data)
(6) Image data of the sub-pixel W1 (W data)
(7) Image data of the sub-pixel R1 (R data)
(8) Image data of the sub-pixel G1 (G data)
(9) Image data of the sub-pixel B2 (B data)
(10) Image data of the sub-pixel W2 (W data)
(11) Image data of the sub-pixel R2 (R data)
(12) Image data of the sub-pixel G2 (G data)
(13) Image data of the sub-pixel B3 (B data)
(14) Image data of the sub-pixel W3 (W data)
(15) Image data of the sub-pixel R3 (R data)
(16) Image data of the sub-pixel G3 (G data)

Here, W data signifies the image data for the W sub-pixel.

The sorter circuit 35 sorts (rearranges) this image data in the following sequence to generate the sorted image data 53-1, and supplies the generated sorted image data 53-1 to the compression circuit 36.

(1) Image data of the sub-pixel R0 (R data)
(2) Image data of the sub-pixel G0 (G data)
(3) Image data of the sub-pixel B0 (B data)
(4) Image data of the sub-pixel W0 (W data)
(5) Image data of the sub-pixel R1 (R data)
(6) Image data of the sub-pixel G1 (G data)
(7) Image data of the sub-pixel B1 (B data)
(8) Image data of the sub-pixel W1 (W data)
(9) Image data of the sub-pixel R2 (R data)
(10) Image data of the sub-pixel G2 (G data)
(11) Image data of the sub-pixel B2 (B data)
(12) Image data of the sub-pixel W2 (W data)
(13) Image data of the sub-pixel R3 (R data)
(14) Image data of the sub-pixel G3 (G data)
(15) Image data of the sub-pixel B3 (B data)
(16) Image data of the sub-pixel W3 (W data)

The compression circuit 36 compresses the sorted image data 53-1 input in this type of sequence, to generate the compression data 54-1.

The sorter circuit 45 of the decompress-sorter circuit 41-1 implements "sorting" processing in order to restore the original image data 51-1 from the decompression data 62-1. More specifically, the decompression circuit 44 outputs the decompression data 62-1 in a sequence identical to that of the sorted image data 53-1. The sorter circuit 45 sorts the decompression data 62-1 in a sequence identical to the original image data 51-1 to generate the sorted image data 64-1, and supplies the sorted image data 64-1 to the display driver circuit 42-1. The display driver circuit 42-1 drives the source lines S1 through S16 in response to the sorted image data 64-1 that was input in this type of sequence.

The same processing is also performed in the sorter circuit 35 of the compression-sorter circuit 34 and the sorter circuit 45 for the decompress-sorter circuit 41 of the other source drivers 4. If at this time a non-zero fraction occurs when the number of pixels capable of being driven by each source driver 4 is divided by the number of pixel 11 units in the compression process (four in the present embodiment), then the image data for the sub-pixel 12 positioned at the end of the section corresponding to each source driver is copied as needed and used in the compression processing.

The each pixel 11 in the above description is provided in a structure including a W sub-pixel in addition to the R sub-pixel, G sub-pixel, and B sub-pixel however a Y sub-pixel displaying a yellow color may be utilized instead of the W sub-pixel.

Fourth Embodiment

Figure 18:
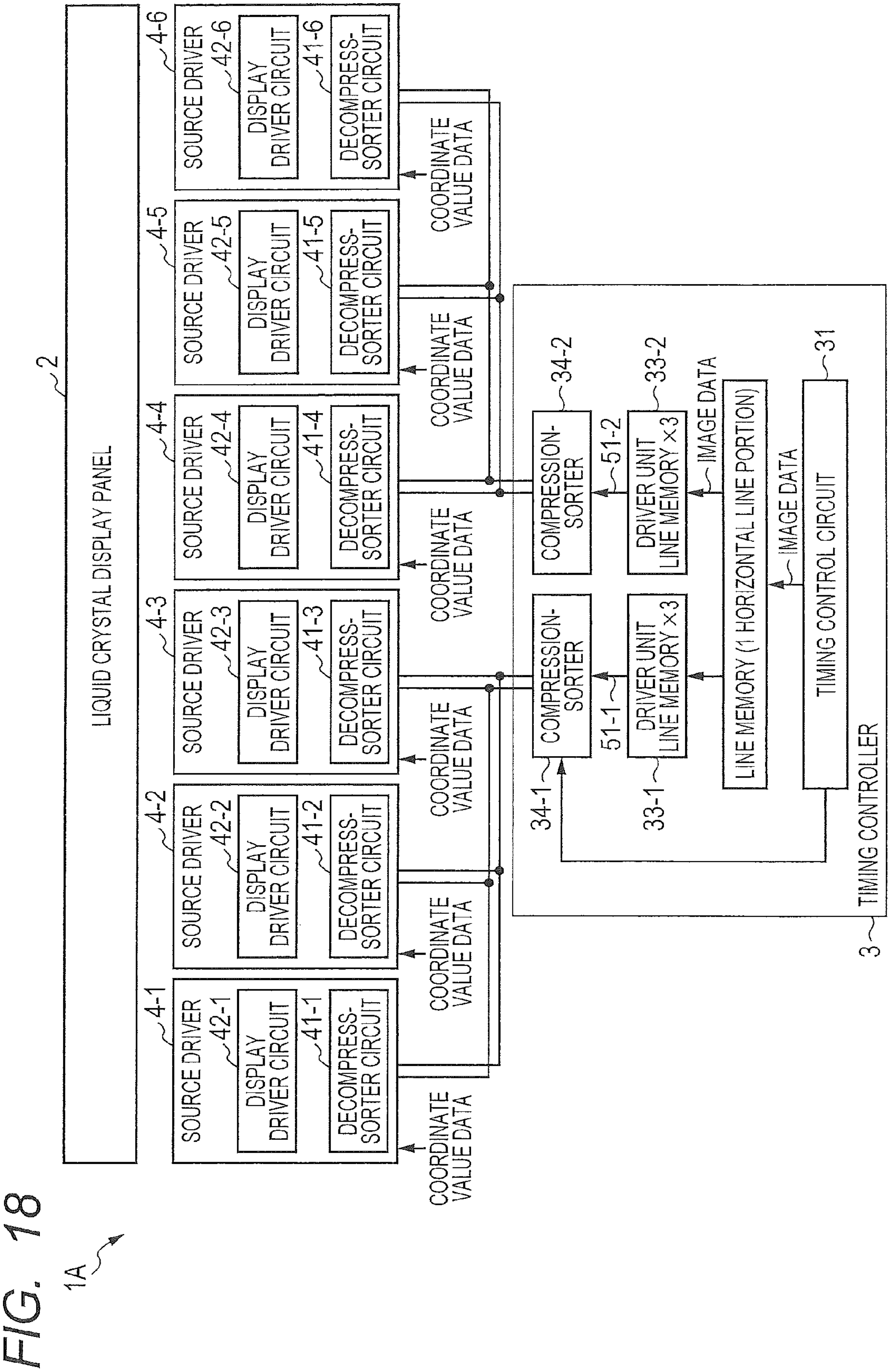
FIG. 18 is a block diagram showing the structure of the timing controller and the source driver in the fourth embodiment.

FIG. 18 is a block diagram showing the structure of the liquid crystal display device 1A in the fourth embodiment of the present invention. In contrast to the first embodiment described above in which the timing controller 3 and the source driver 4-1 through 4-6 were coupled in a peer-to-peer relation, in the present embodiment, the timing controller 3 and the source driver 4-1 through 4-6 are connected by a multi-drop. The structure of the liquid crystal device 1A of the present embodiment is described next.

In the present embodiment, the timing controller 3 and the source driver 4-1 through 4-3 are coupled by way of a bus 7-1, and the timing controller 3 and the source driver 4-4 through 4-6 are multi-drop coupled by way of a bus 7-2.

The structure of the timing controller 3 is nearly the same as the structure shown in FIG. 3 however the structure differs in the point that the driver unit line memory 33 and the compression-sorter circuits 34 are made to correspond to a plurality of source drivers 4.

More specifically, the driver unit line memory 33-1 loads and stores image data from the line memory 32 that must be sent to the respective source drivers 4-1 through 4-3. The driver unit line memory 33-2 on the other hand loads and stores image data from the line memory 32 that must be sent to the respective source drivers 4-4 through 4-6.

The compression-sorter circuit 34-1 loads the image data from the driver unit line memory 33-1, and generates the transfer data 6-1 for transfer to the source drivers 4-1 through 4-3. More specifically, the compression-sorter circuit 34-1 implements "sorting" processing (in other words, processing to sort the image data by time sequence or by spatial sequence) on the image data loaded from the driver unit line memory 33-1, the same as in the first through the third embodiments. The compression-sorter circuit 34-1 compresses the sorted image data obtained in this "sorting" processing to generate compression data, inserts that compression data into the transfer data 6-1, and transfers that transfer data 6-1 to the source drivers 4-1 through 4-3.

The compression-sorter circuit 34-2 loads image data from the driver unit line memory 33-2 in the same way, to generate the transfer data 6-2 for transfer to the source drivers 4-4 through 4-6. More specifically, the compression-sorter circuit 34-2 implements the "sorting" processing on the image data loaded from the driver unit line memory 33-2 compresses the sorted image data obtained from that "sorting" processing to generate compression data. The compression-sorter circuit 34-2 inserts that compression data into the transfer data 6-2 and transfers that transfer data 6-2 to the source drivers 4-4 through 4-6.

The source drivers 4-1 through 4-6 respectively contain a decompress-sorter circuit 41 and display driver circuit 42. Here, FIG. 3 shows the decompress-sorter circuit 41 contained in the source driver 4-i with the reference symbol 41-i; and shows the display driver circuit 42 contained in the source driver 4-i with the reference symbol 42-i.

The decompress-sorter circuits 41-1 through 41-3 for the source drivers 4-1 through 4-3 implement decompression processing on the compression data contained in the transfer data 6-1 loaded from the compression-sorter circuit 34-1 to generate decompression data, and also implement "sorting" of the decompression data along with placement of the color for the sub-pixels 12 in the liquid crystal display panel 2. This "sorting" implemented by the decompress-sorter circuits 41-1 through 41-3 is basically performed to restore the image data loaded from the driver unit line memory 33-1. The display driver circuits 42-1 through 42-3 drive the source lines allocated to the source drivers 4-1 through 4-3 in response to the "sorted" (rearranged) decompression data.

The decompress-sorter circuits 41-4 through 41-6 for the source drivers 4-4 through 4-6 implement decompression processing on the compression data contained in the transfer data 6-2 loaded from the compression-sorter circuit 34-2 to generate the decompression data, and further implement "sorting" of the decompression data along with placement of the color of the sub-pixel 12 in the liquid crystal display panel 2. The "sorting" implemented by the decompress-sorter circuits 41-4 through 41-6 is basically performed to restore the image data loaded from the driver unit line memory 33-2. The display driver circuits 42-4 through 42-6 drive the source lines allocated to the source drivers 4-4 through 4-6 in response to the "sorted" decompression data.

In the present embodiment, the respective source drivers are structured so as to selectively load compression data that corresponds to the section of the liquid crystal panel 2 driven by a particular source driver among compression data contained in the transfer data 6-1 or 6-2. More specifically, in the present embodiment, each respective source driver is supplied with coordinate data that specifies which section of the liquid crystal display panel 2 that each source driver 4 must drive. The coordinate data may be stored in the register (not shown in drawing) formed in each source driver or may be supplied from an external source. Each source driver 4 checks the coordinate value data and loads the necessary compression data from among the compression data contained in the transfer data 6-1 or 6-2.

Here, in the present embodiment, the plurality of pixels (four pixels in the present embodiment) are collectively compressed by block compression so that pixels corresponding to a particular compression data might occur that span a plurality of source drivers 4. In the present embodiment, if at this time the pixel 11 corresponding to a particular compression data includes a pixel 11 corresponding to a particular source driver 4, and a pixel 11 corresponding to a source driver 4 adjacent to that source driver 4, then both of two source drivers load the compression data. The decompress-sorter circuit 41 for the source driver 4 that loaded the compressed data, implements decompression processing on the loaded compression data and generates decompression data, and discards decompression data for pixels 11 not corresponding to the source driver 4 among the decompression data. The decompress-sorter circuit 41 implements "sorting" processing on the decompression data to generate sorted image data, and the display driver circuits 42 drives the source line in response to this sorted image data. The compression processing, "sorting" processing and the decompression processing in the present embodiment are described next.

Figure 19A:
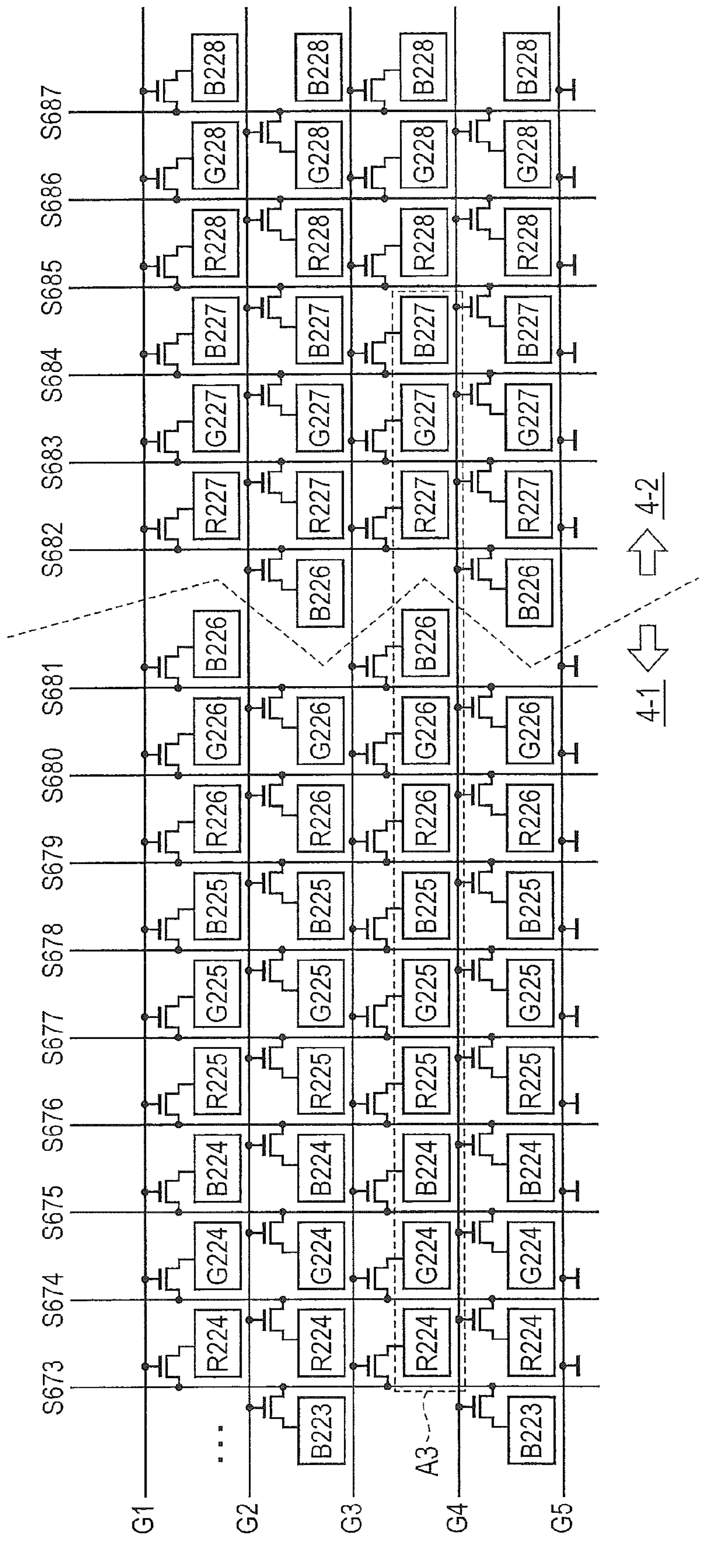
FIG. 19A is a drawing showing the pixel color placement in the liquid crystal display panel of the second embodiment.
Figure 19B:
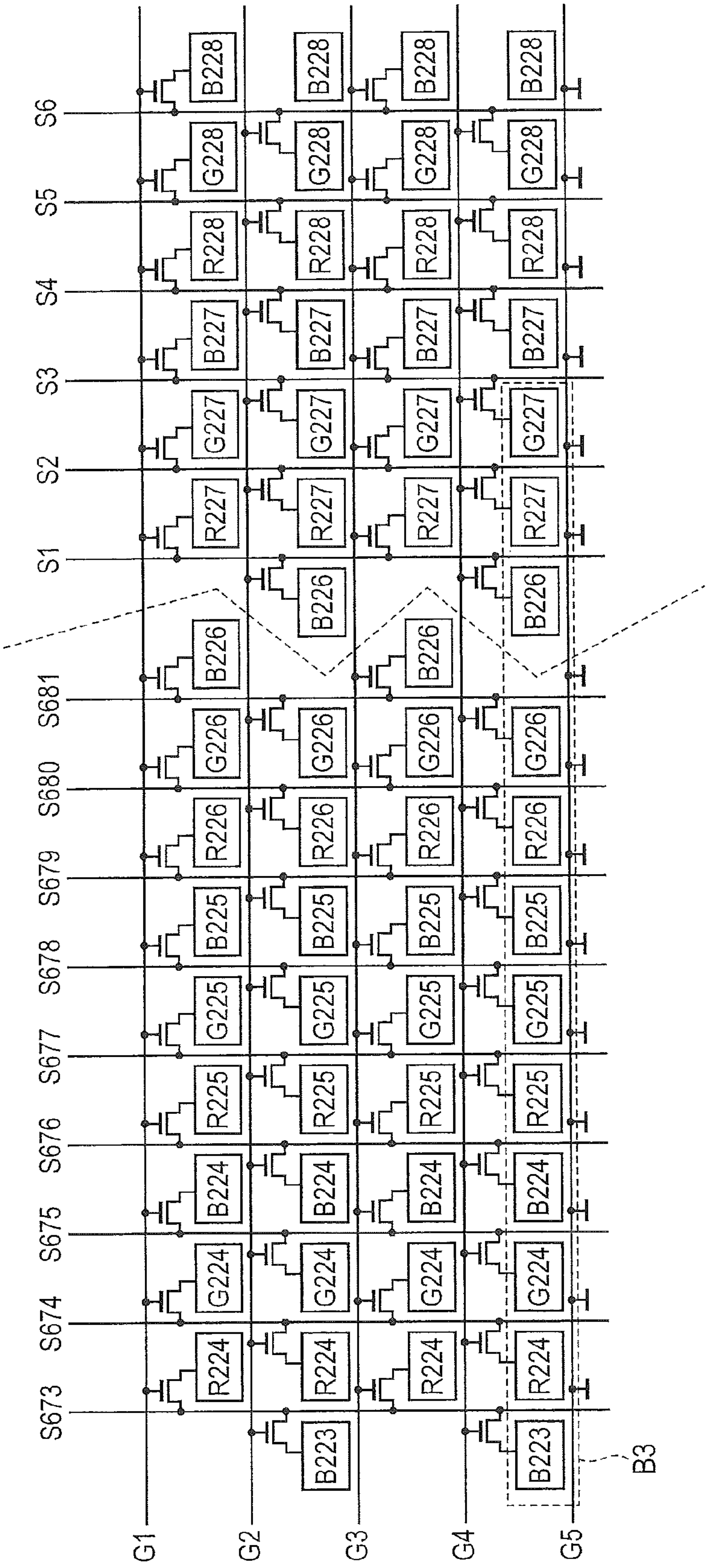
FIG. 19B is a drawing showing the pixel color placement in the liquid crystal display panel of the second embodiment.

FIG. 19A and FIG. 19B are drawings showing the structure of the liquid crystal display panel 2 of the present embodiment. FIG. 19A shows the section A3 positioned on an odd-numbered line (in FIG. 19A, the horizontal line of pixel 11 connected to the gate line G3) and moreover shows section A3 as a section where the four pixel units to generate compression data spanning the source drivers 4-1, 4-2. In other words, the source driver 4-1 drives the odd-numbered horizontal line sub-pixels R224, G224, B224, R225, G225, B225, R226, G226, B226; and the source driver 4-2 drives the sub-pixels R227, G227, B227. The image data for the odd-numbered horizontal lines of the sub-pixels R224, G224, B224, R225, G225, B225, R226, G226, B226, R227, G227, B227 on the other hand is collectively compressed to generate the compression data.

In FIG. 19B on the other hand, shows the section B3 positioned on an even-numbered line (in FIG. 19B, the horizontal line of pixel 11 connected to the gate line G4) and moreover shows section B3 as a section where the four pixel units generate compression data spanning the source drivers 4-1, 4-2. Namely, the source driver 4-1 drives the even-numbered horizontal line sub-pixels B223, R224, G224, B224, R225, G225, B225, R226, G226; and the source driver 4-2 drives the sub-pixels B226, R227, G227. The image data for the even-numbered horizontal line sub-pixels B223, R224, G224, B224, R225, G225, B225, R226, G226, B226, R227, G227 on the other hand is collectively compressed to generate compression data. The compression processing, "sorting" processing and the decompression processing implemented on the image data for the pixel 11 corresponding to these sections A3, and B3 is described next.

Figure 20A:
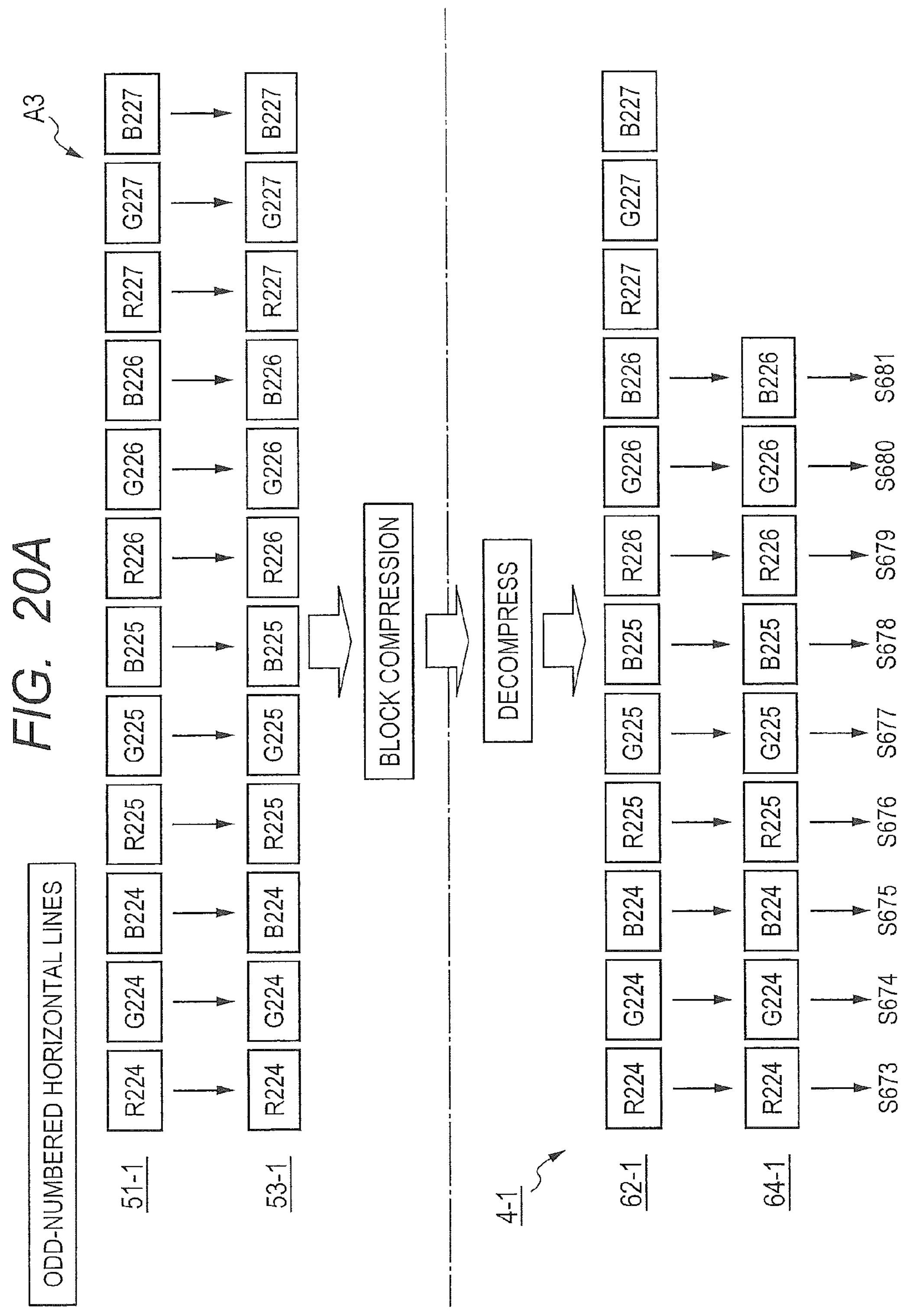
FIG. 20A is a concept view showing the "sorting" processing performed on the odd-numbered horizontal lines in the second embodiment.
Figure 20B:
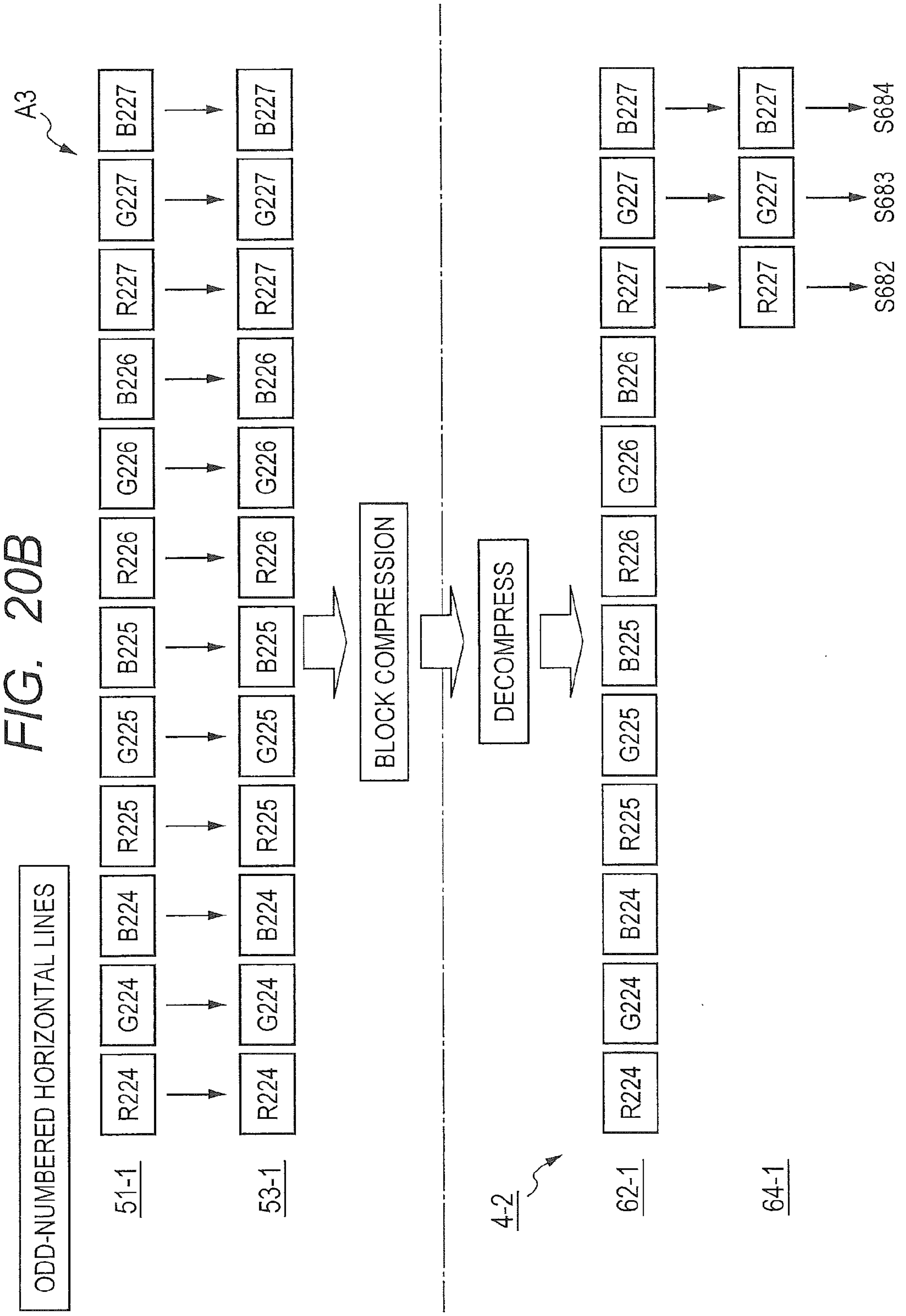
FIG. 20B is a concept view showing the "sorting" processing performed on the odd-numbered horizontal lines in the second embodiment.

FIG. 20A and FIG. 20B show details of the "sorting" processing implemented on the image data 51-1 corresponding to the pixel 11 positioned on section A3 of the liquid crystal display panel 2. Here, FIG. 20A shows the decompression processing and the "sorting" processing for the source driver 4-1. FIG. 20B shows the decompression processing and the "sorting" processing for the source driver 4-2.

As can be seen in FIG. 20A and FIG. 20B, no "sorting" is implemented on the odd-numbered horizontal lines. Namely, the image data 51-1 for the sub-pixels R224, G224, B224, R225, G225, B225, R226, G226, B226, R227, G227, B227 is input to the compression circuit 36 as sorted image data 53-1 while still maintaining in that unchanged time sequence or spatial sequence. The compression circuit 36 compresses the loaded sorted image data 53-1 to generate compression data, inserts that compression data into the transfer data 6-1 and outputs that transfer data 6-1 on the bus 7-1.

The source drivers 4-1 and 4-2 decide from the respectively supplied coordinate value data what compression data generated for section A3 is necessary and load that compression data. The respective decompression circuits 44 for the source drivers 4-1, 4-2 decompress the compression data to generate the decompression data 62-1, 62-2. The content of the decompression data 62-1, 62-2 respectively generated by the source drivers 4-1, 4-2 is identical.

Here, the respective sorter circuits 45 for the source drivers 4-1, 4-2 extract just the decompression data for the sub-pixels 12 corresponding to themselves from among the generated decompression data 62-1. In other words as shown in FIG. 20A, the sorter circuit 45 for the source driver 4-1 extracts the decompression data for the sub-pixels R224, G224, B224, R225, G225, B225, R226, G226, B226, and outputs that decompression data as the sorted image data 64-1 to the display driver circuit 42-1 while maintaining that unchanged time sequence and spatial sequence. The display driver circuit 42-1 drives the source lines S673 through S681 in response to the decompression data for the sub-pixels R224, G224, B224, R225, G225, B225, R226, G226, B226. As shown in FIG. 20B on the other hand, the sorter circuit 45 of the source driver 4-2 extracts the decompression data for the sub-pixels R227, G227, B227 and outputs that decompression data as the sorted image data 64-2 to the display driver circuit 42-2 while maintaining that unchanged time sequence and spatial sequence. The display driver circuit 42-2 drives the source lines S682 through S684 in response to the decompression data for the sub-pixels R227, G227, and B227.

Figure 20C:
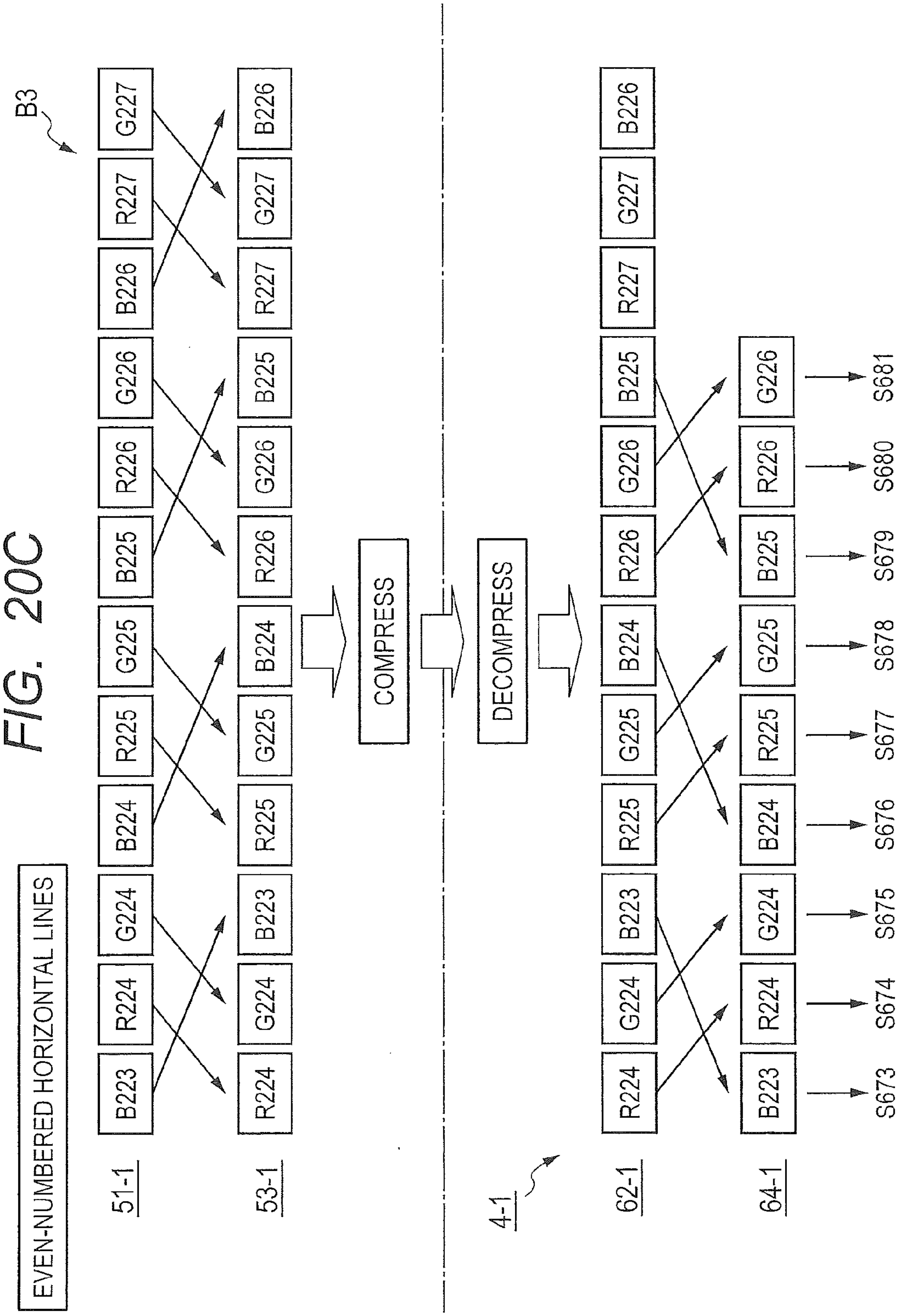
FIG. 20C is a concept view showing the "sorting" processing performed on the even-numbered horizontal lines in the second embodiment.
Figure 20D:
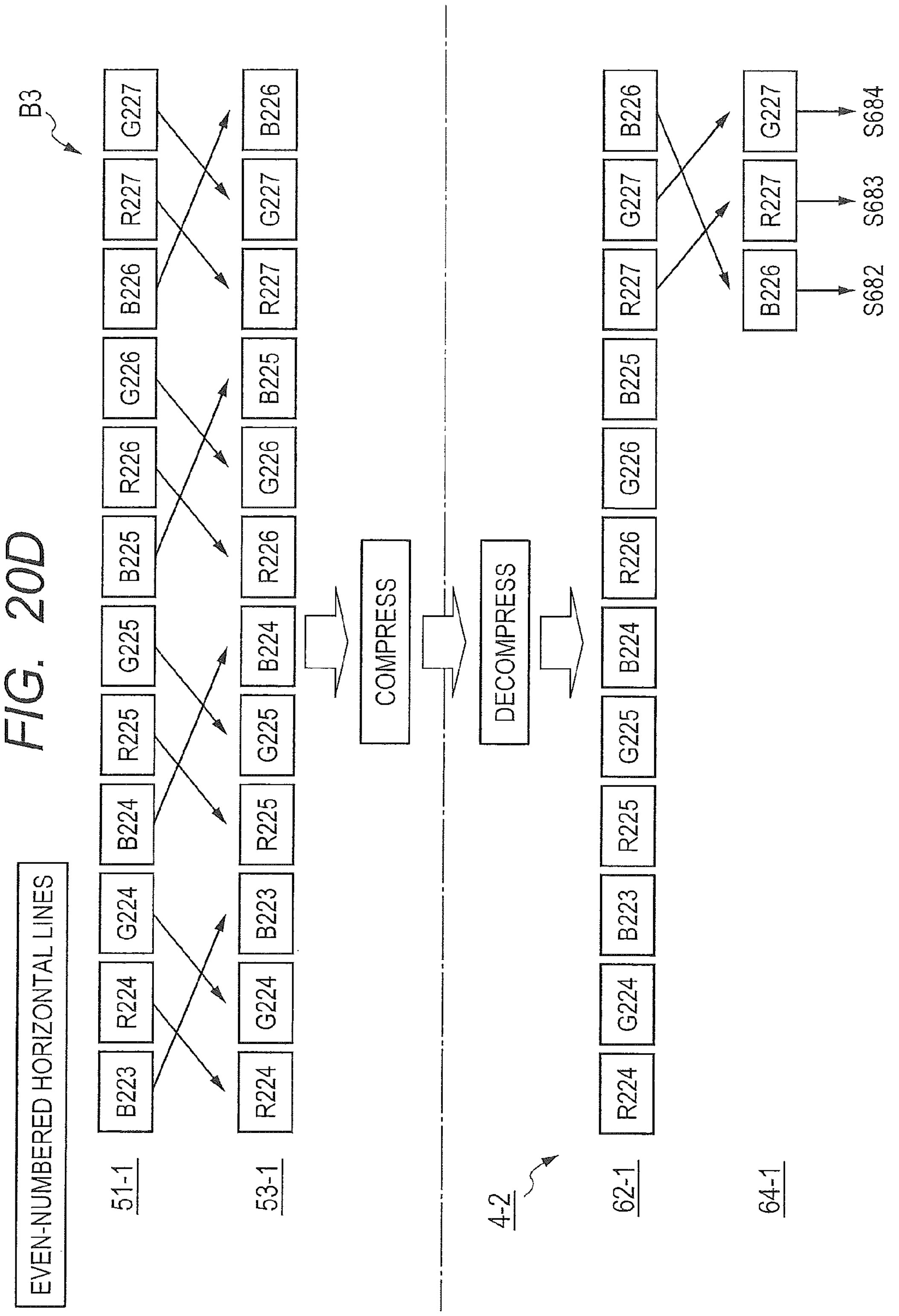
FIG. 20D is a concept view showing the "sorting" processing performed on the even-numbered horizontal lines in the second embodiment.

FIG. 20C and FIG. 20D on the other hand, show details of the "sorting" processing implemented on the image data 51-1 corresponding to the pixel 11 positioned on section B3 of the liquid crystal display panel 2. Here, FIG. 20C shows the decompression processing and the "sorting" processing on the source driver 4-1. FIG. 20D shows the decompression processing and the "sorting" processing on the source driver 4-2.

As shown in FIGS. 20C and 20D, the image data 51-1 for section B3 of the liquid crystal display panel 2 is input to the sorter circuit 35 of the compression-sorter circuits 34-1 in the following sequence (time sequence or spatial sequence).

(1) Image data for the sub-pixel B223 (B data)
(2) Image data for the sub-pixel R224 (R data)
(3) Image data for the sub-pixel G224 (G data)
(4) Image data for the sub-pixel B224 (B data)
(5) Image data for the sub-pixel R225 (R data)
(6) Image data for the sub-pixel G225 (G data)
(7) Image data for the sub-pixel B225 (B data)
(8) Image data for the sub-pixel R226 (R data)
(9) Image data for the sub-pixel G226 (G data)
(10) Image data for the sub-pixel B226 (B data)
(11) Image data for the sub-pixel R227 (R data)
(12) Image data for the sub-pixel G227 (G data)

The sorter circuit 35 sorts this image data and generates the sorted image data 53-1, and supplies the generated sorted image data 53-1 to the compression circuit 36.

(1) Image data for the sub-pixel R224 (R data)
(2) Image data for the sub-pixel G224 (G data)
(3) Image data for the sub-pixel B223 (B data)
(4) Image data for the sub-pixel R225 (R data)
(5) Image data for the sub-pixel G225 (G data)
(6) Image data for the sub-pixel B224 (B data)
(7) Image data for the sub-pixel R226 (R data)
(8) Image data for the sub-pixel G226 (G data)
(9) Image data for the sub-pixel B225 (B data)
(10) Image data for the sub-pixel R227 (R data)
(11) Image data for the sub-pixel G227 (G data)
(12) Image data for the sub-pixel B226 (B data)

The compression circuit 36 compresses the loaded sorted image data 53-1 input in this type of sequence, and inserts the compression data into the transfer data 6-1, and outputs the transfer data 6-1 to the bus 7.

The source drivers 4-1 and 4-2 decide from the respectively supplied coordinate value data what compression data generated for section A3 is necessary and load that compression data. The respective decompression circuits 44 for the source drivers 4-1, 4-2 decompress the compression data to generate the decompression data 62-1, 62-2. The content of the decompression data 62-1, 62-2 respectively generated by the source drivers 4-1, 4-2 is identical.

Here, the respective sorter circuits 45 for the source drivers 4-1, 4-2 extract just the decompression data for the sub-pixels 12 corresponding to themselves from among the generated decompression data 62-1 and implement "sorting" processing on the extracted decompression data. More specifically, as shown in FIG. 20C, the sorter circuit 45 for the source driver 4-1 extracts the decompression data for the sub-pixels R224, G224, B223, R225, G225, B224, R226, G226, B225, further implements "sorting" processing so as to restore the original image data 51-1 from that decompression data, and generates the sorted image data 64-1. The display driver circuit 42-1 drives the source lines S673 through S681 in response to the generated sorted image data 64-1. As shown in FIG. 20D on the other hand, the sorter circuit 45 of the source driver 4-2 extracts the decompression data for the sub-pixels R227, G227, B226 and further implements "sorting" processing so as to restore a portion of the original image data 51-1 from that decompression data, and generates the sorted image data 64-2. The display driver circuit 42-2 drives the source lines S682 through S684 in response to the generated sorted image data 64-2.

In the present embodiment as described above, sorter circuits (35, 45) are formed respectively in the timing controller 3 and source controller 4, and sorting processing is performed to sort (rearrange) the time sequence and/or spatial sequence of the image data. The display device drivers can in this way drive the display devices whose pixel color placement varies on each line and perform transfer data while utilizing color (chrominance) information and using compression processing having high-efficiency and low image quality deterioration.

Also in the present embodiment, compression processing and decompression processing having reduced deterioration in image quality can be implemented by utilizing data transfer in a multi-drop configuration, even in cases where the number of pixels that are units in the compression processing do not match the number of source driver 4 outputs. In other words, when the sub-pixels corresponding to a certain compression data, include pixels driven by two adjacent source drivers 4, both of the adjacent source drivers 4 load the compression data and implement decompression processing on the compression data. Each of the source drivers 4 drives the pixels by utilizing decompression data corresponding to the pixels that source driver itself should drive from among the decompression data obtained in the decompression processing. The problem of the number of pixels forming units in the compression processing not matching the number of output from the source driver 4 is in this way resolved.

The operation described for the present embodiment is to cases where the timing controller and source driver 4 are coupled in a multi-drop configuration and the reader should be aware that the structure of the liquid crystal display panel is not related to this operation. The operation described in this embodiment is also to liquid crystal display panels utilizing the structure described in any of the first through the third embodiments.

(Preferred Block Compression Processing and Decompression Processing)

1. Overview of Compression-Decompression Methods and Circuit Configuration

The preferred configuration of the compression processor unit 36*b* and the decompression processing unit 44*a* in the first, second, and fourth embodiments, as well as their preferred block compression processing and decompression processing performed in these embodiments is described next.

Block compression in the above described embodiment was implemented in four pixel units arrayed in one row and four columns. Hereafter, four pixels forming a unit for block compressions are referred to as a "block", and the four target pixels for implementing block compression are referred to as "target blocks." A diagram of the block configuration is shown in FIG. 21C. Hereafter, the pixel on the left end among four pixels of a block is pixel A, the pixel second from the left is pixel B, the pixel second from the right is pixel C, the pixel on the right end is pixel D. The level values for the R sub-pixels of the pixels A, B, C, D are respectively listed as $R_A$, $R_B$, $R_C$, $R_D$, and the level values for the G sub-pixels of the pixels A, B, C, D are respectively listed as $G_A$, $G_B$, $G_C$, $G_D$, and the level values for the B sub-pixels of the pixels A, B, C, D are respectively listed as $B_A$, $B_B$, $B_C$, $B_D$.

In the preferred embodiment, the compression processor unit 36*b* compresses the image data 51-1 of each loaded block by using any of the following five types of compression methods.

Lossless compression
(1×4) pixel compression
(2+1×2) pixel compression
(2×2) pixel compression
(4×1) pixel compression Here, lossless compression is a method for compressing to allow completely restoring the original image data from the compression data. In the present embodiment, lossless compression is utilized for the case where the image data for the target block configured from four pixels for compression is a specified pattern. The (1×4) pixel compression is a method for compressing the image data for separately processing all four pixels of the target block to reduce the number of bit planes. This (1×4) pixel compression is preferable when there is little correlation among the image data of the four pixels. The (2+1×2) pixel compression is a method for compressing the image data by establishing typical values for representing image data for two pixels among the four pixels in a target block, and this method also implements processing (in this embodiment, dither processing utilizing a dither matrix) on the other respective two pixels to reduce the number of bit planes. Usage of this (2+1×2) pixel compression is preferred when the image data for two pixels among the four pixels have a high correlation, and further the image data for the other two pixels have a low correlation. The (2×2) pixel compression is a method for compressing the image data by dividing all four pixels of the target block into two sets of two pixels, and establishing typical values for representing the respective image data for the two sets of pixels. This (2×2) pixel compression is a preferred method when there is a high correlation between image data for two pixels among the four pixels, and further there is a high correlation in the image data for the other two pixels. The (4×1) pixel compression is a method for compressing the image data by establishing typical values for representing image data of four pixels of a target block. This (4×1) pixel compression is preferred method when there is a high correlation between image data for all four pixels of the target block. The content of the above described five compression methods are described in detail later on.

One advantage from selecting these types of compression methods is that image compression with reduced block noise and granular noise can be achieved. The compression methods utilized in this embodiment are a compression method (in this embodiment, (4×1) pixel compression) to calculate a typical value corresponding to the image data for all pixels in the target block; and a compression method (in this embodiment, (1×4) pixel compression) to separately process all four pixels in the target block to reduce the respective number of bit planes. This embodiment also utilizes a compression method (in this embodiment (2+1×2) pixel compression and (2×2) pixel compression) that calculates typical values corresponding to the image data for a plurality of pixels (not all) in the target block. These types of compression methods are effective in reducing block noise and granular noise. Using a compression method that separately implements processing for reducing the number of bit planes on pixels having a high image data correlation will cause granular noise to occur, but implementing block encoding on pixels with a low image data correlation will cause block noise to occur. The compression method of the present embodiment corresponds to a compression method that calculates typical values corresponding to image data for a plurality of pixels (not all) in a target block implements processing to reduce the number of bit planes on pixels having high image data correlation or avoids a state where block encoding is performed on pixels having low image data correlation. This compression method is effective in reducing block noise and granular noise.

Utilizing a structure capable of implementing lossless compression for the case where the image data in the target block is a specified pattern, is effective in making the needed inspections of the liquid crystal display panel. Inspections of the liquid crystal display panel are made to evaluate the luminance characteristics and color level (gamut) characteristics. A specified pattern image is displayed in the liquid crystal display panel in this evaluation of luminance characteristics and color (gamut) characteristics. In order to correctly evaluate the luminance characteristics and color level (gamut) characteristics, an image that faithfully reproduces the color relative to the image data that was input must be displayed on the liquid crystal display panel. However if there is compression distortion, then correctly evaluating the luminance characteristics and color level (gamut) characteristics is impossible. The present embodiment however contains a compression processor unit **36*b*** configured to perform lossless compression Which among the five compression methods to utilize is decided depending upon whether or not the image data of the target block contains a specified pattern, and also the correlation among the 1-row 4-column pixel image data that configures the target block. For example, if (4×1) pixel compression is utilized when there is a high correlation in image data among all four pixels, and (2×2) pixel compression is utilized when there is a high correlation in image data between two pixels among the four pixels and there is also a high correlation in image data between other two pixels. The selection of the compression method is described later on in detail.

Figure 21A:
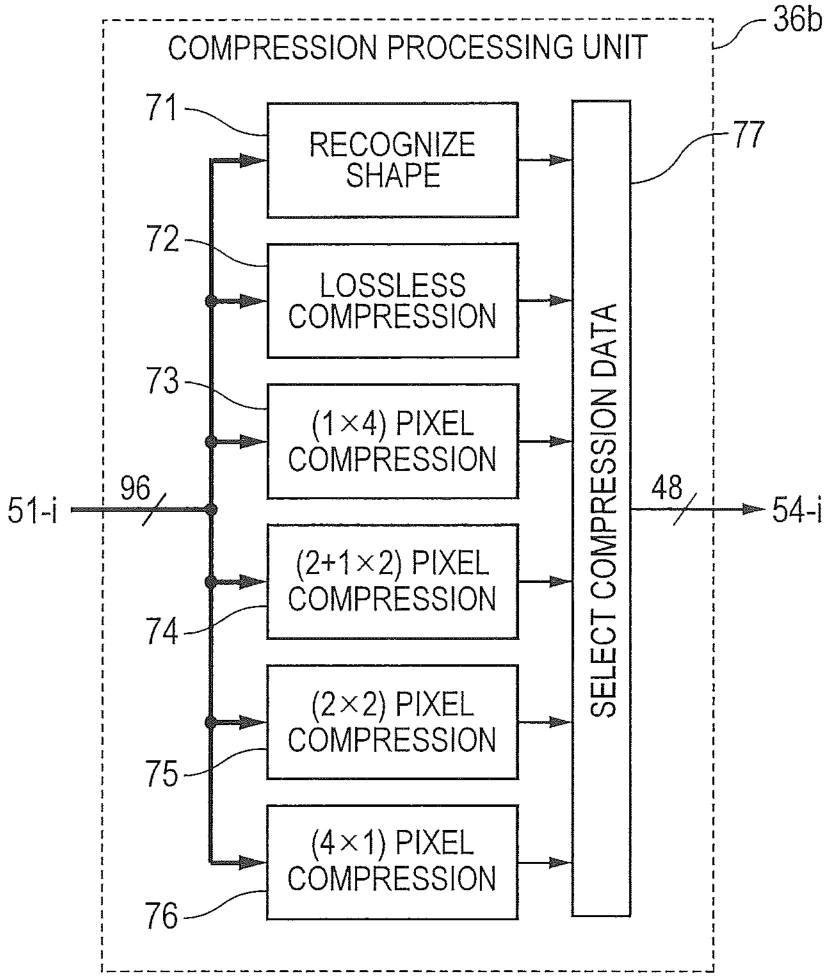
FIG. 21A is a block diagram showing the structure of the compression processing unit in the embodiments.

To perform the above operation, the compression processor unit **36*b* as shown in FIG. 21A, includes a shape recognition unit 71, and a lossless compression unit 72, a (1×4) pixel compression unit 73, a (2+1×2) pixel compression unit 74, a (2×2) pixel compression unit 75, a (4×1) pixel compression unit 76, and a compression data selector unit 77**.

The shape recognition unit 71 loads the 1-row 4-column pixel image data and decides which among the above five compression methods to select. The shape recognition unit 71 for example recognizes which combination of pixel image data among the 1-row 4-column pixel image data has a high correlation, or which pixel has a low correlation of image data relative to other pixels. Moreover, the shape recognition unit 71 generates selection data for specifying any of: lossless compression, (1×4) pixel compression, (2+1×2) pixel compression, (2×2) pixel compression, and (4×1) pixel compression from among the five compression method.

The lossless compression unit 72 implements the above described lossless compression to generate lossless compression data, the (1×4) pixel compression unit 73 implements (1×4) pixel compression to generate (1×4) compression data. In the same way, the (2+1×2) pixel compression unit 74 implements (2+1×2) pixel compression to generate (2+1×2) compression data, and the (2×2) pixel compression unit 75 implements (2×2) pixel compression to generate (2×2) compression data. The (4×1) pixel compression unit 76 further implements (4×1) pixel compression to generate (4×1) compression data.

The compression data selector unit 77 selects any of the (1×4) compression data, the (2+1×2) compression data, the (2×2) compression data, and the (4×1) compression data based on the selection data sent from the shape recognition unit 71 and outputs it as the compression data 54-i. This compression data 54-i contains a compression type recognition bit that shows which among the above five compression methods was utilized.

Figure 21B:
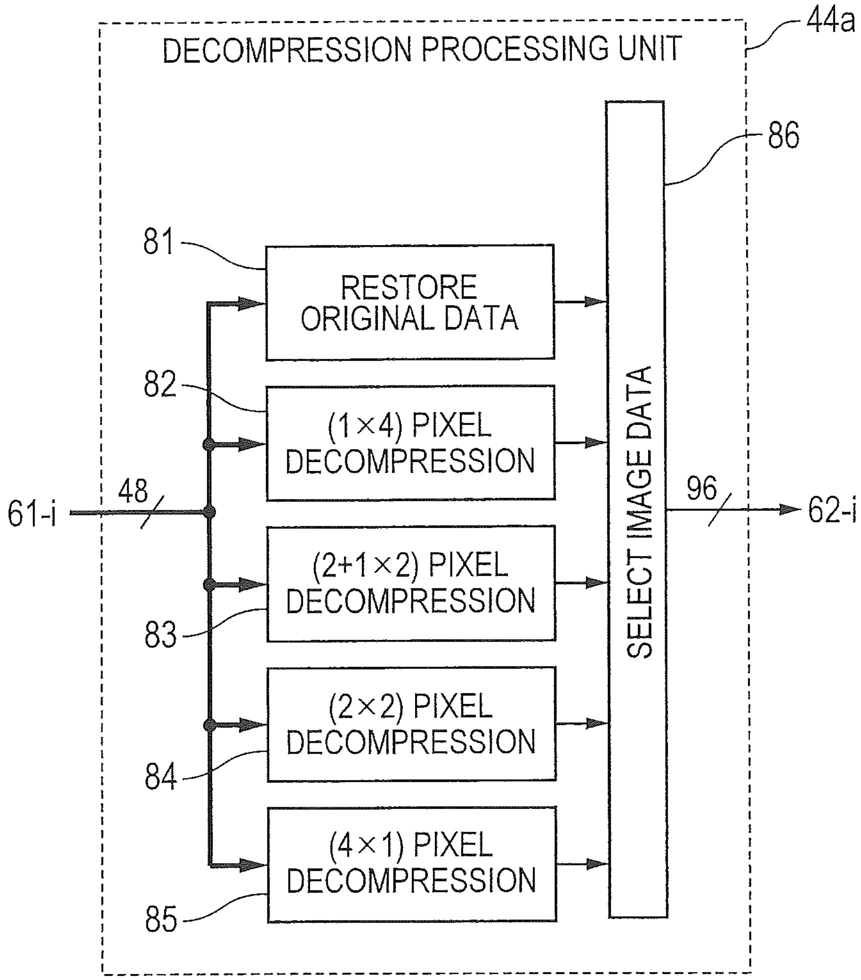
FIG. 21B is a block diagram showing the structure of the decompression processing unit in the embodiments.
Figure 21C:
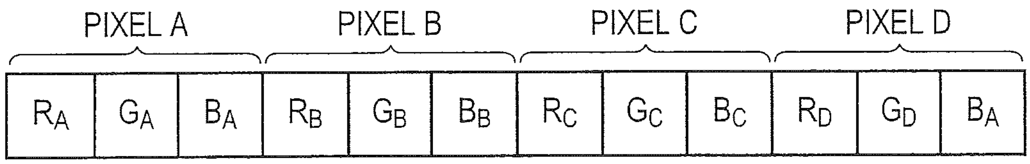
FIG. 21C is a block diagram showing the structure of the block in the embodiments.

The decompression processing unit 44*a* on the other hand, decides by which of the above five compression methods that the compression data 61-i of each block was compressed, and decompresses the compression data 61-i by way of a decompression method corresponding to the compression method that was utilized for compression. In order to implement this operation, the decompression processing unit 44*a* as shown in FIG. 21B, includes an original data restoration unit 81, a (1×4) pixel decompression unit 82, a (2+1×2) pixel decompression unit 83, a (2×2) pixel decompression unit 84, a (4×1) pixel decompression unit 85, and an image data selector unit 86. The original data restoration unit 81 includes a function to decompress the compression data that was compressed by lossless compression. The (1×4) pixel decompression unit 82 contains a function to decompress the compression data that was compressed by (1×4) pixel compression. The (2+1×2) pixel decompression unit 83 contains a function to decompress the compression data that was compressed by (2+1×2) pixel compression. The (2×2) pixel decompression unit 84 contains a function to decompress the compression data that was compressed by (2×2) pixel compression. Also, the (4×1) pixel decompression unit 85 contains a function to decompress the compression data that was compressed by (4×1) pixel compression.

The image data selector unit 86 recognizes the compression method utilized in the actual compression from the compression type recognition bit contained in the compression data. The image data selector unit 86 based on the recognition data, selects generated data that was decompressed by a decompression method corresponding to the compression method that was actually utilized from among the decompression data output from the original data restoration unit 81, the (1×4) pixel decompression unit 82, the (2+1×2) pixel decompression unit 83, the (2×2) pixel decompression unit 84, and the (4×1) pixel decompression unit 85.

2. Selecting the Compression Method

The operation for selecting the compression method for actual use from among the above five compression methods is described next.

Figure 22:
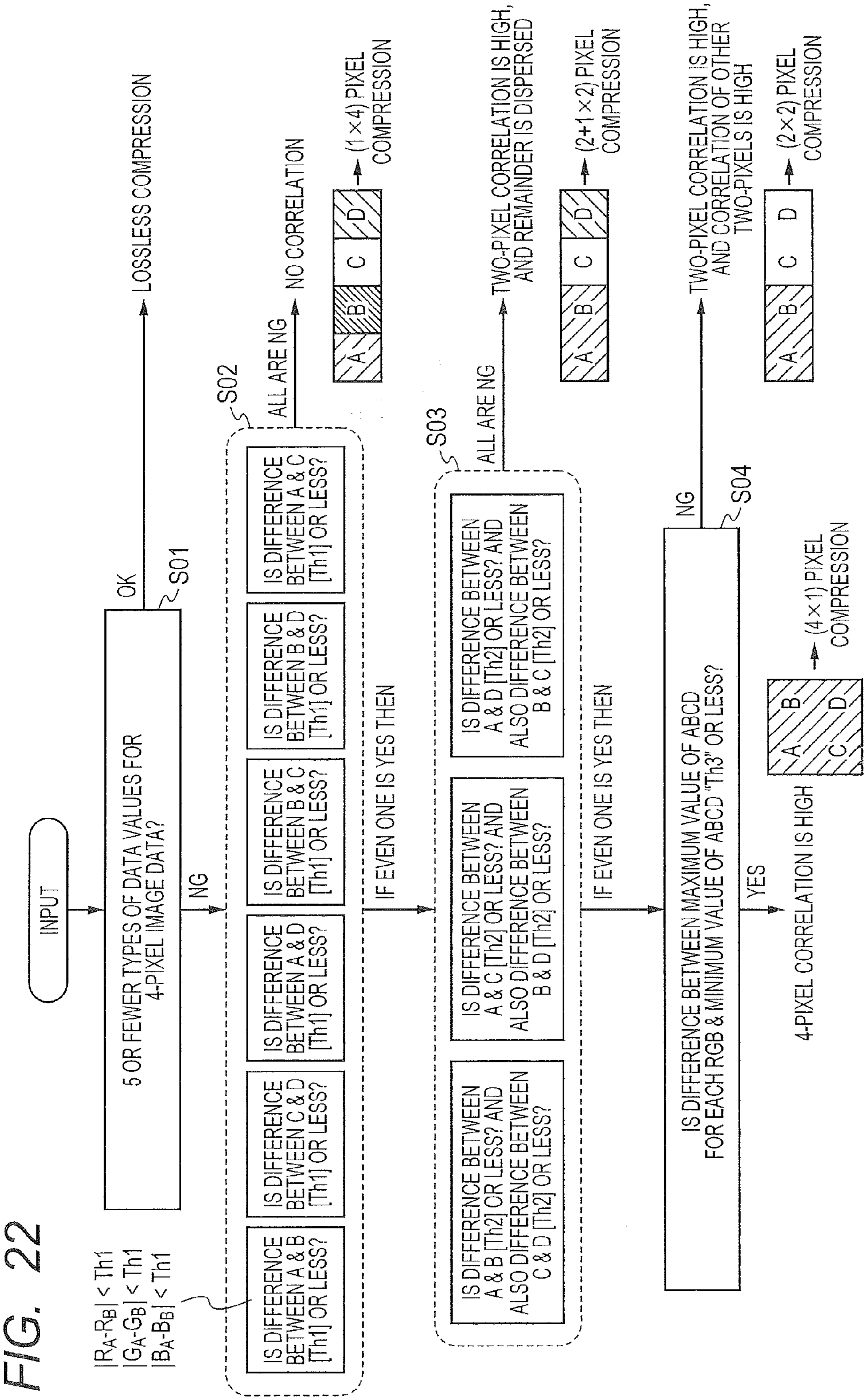
FIG. 22 is a flow chart for describing the operation to select of the compression method that is actually used.

FIG. 22 is a flow chart for describing the operation for selecting the compression method for actual use in this embodiment. In the present embodiment, a decision is first of all made whether the image data of the four pixels in the target block applies the specified pattern or not (step S01), and lossless compression is implemented if the image data applies the specified pattern. In the present embodiment, specified patterns of data values for five or fewer image data for target block pixels can be selected as specified patterns for implementing lossless compression.

More specifically, if image data for four pixels in the target block applies any of the following four patterns (1) through (4), then lossless compression is implemented.

(1) Each color level value of the four pixels is identical (FIG. 23A)

Lossless compression is implemented when any of the following conditions (1a) for image data for the four pixels in the target block are satisfied.

$$R_A=R_B=R_C=R_D,$$

$$G_A=G_B=G_C=G_D,$$

$$B_A=B_B=B_C=B_D. \quad \text{Condition (1a)}$$

In the above case, there are three types of data values for image data for the four pixels in the target block.

(2) The color level values of the R sub-pixels, G sub-pixels, B sub-pixels among the four pixels are identical. (FIG. 23B)

Lossless compression is implemented when the following conditions (2a) for image data for the four pixels in the target block are satisfied.

$$R_A=G_A=B_A,$$

$$R_B=G_B=B_B,$$

$$R_C=G_C=B_C,$$

$$R_D=G_D=B_D. \quad \text{Condition (2a)}$$

In this case, there are four types of data values for image data for the four pixels in the target block.

(3) The level values for two colors among the R, G, B for the four pixels in the target block are identical. (FIG. 23C through 23E)

Lossless compression is implemented when any among the following three conditions (3a) through (3c) are satisfied.

$$G_A=G_B=G_C=G_D=B_A=B_B=B_C=B_D. \quad \text{Condition (3a)}$$

$$B_A=B_B=B_C=B_D=R_A=R_B=R_C=R_D. \quad \text{Condition (3b):}$$

$$R_A=R_B=R_C=R_D=G_A=G_B=G_C=G_D. \quad \text{Condition (3c)}$$

In this case, there are five types of data values for image data for the four pixels in the target block.

(4) The level value for one color among the R, G, B are identical, and moreover the level values for the remaining two colors are identical for the four pixels of the target block. (FIG. 23F through 23H)

Lossless compression is implemented when any among the following three conditions (4a) through (4c) are satisfied.

$$G_A=G_B=G_C=G_D,$$

$$R_A=B_A,$$

$$R_B=B_B,$$

$$R_C=B_C,$$

$$R_D=B_D. \quad \text{Condition (4a)}$$

$$B_A=B_B=B_C=B_D.$$

$$R_A=G_A,$$

$$R_B=G_B,$$

$$R_C=G_C.$$

$$R_D=G_D. \quad \text{Condition (4b)}$$

$$R_A=R_B=R_C=R_D.$$

$$G_A=B_A,$$

$$G_B=B_B,$$

$$G_C=B_C,$$

$$G_D=B_D. \quad \text{Condition (4c)}$$

In this case, there are five types of data values for image data for the four pixels in the target block.

If not performing lossless compression, the compression method is selected according to the correlation among the four pixels. More specifically, the shape recognition unit 71 decides whether the 1-row 4-column four-pixel image data of the target block applies to any of the following:

Case A: Low correlation among image data for optional pixel combinations among the four pixels.

Case B: There is a high correlation between image data for two pixels; and there is a low correlation between the other two pixels and the first two pixels, moreover a low mutual correlation between image data for the other two pixels.

Case C: There is a high correlation among two pixel image data; and there is also a high correlation between the image data for the other two pixels.

Case D: There is a high correlation among the four pixel image data.

More specifically, if the following condition (A) cannot be established for all combinations of i, j:

$i \in \{A,B,C,D\}$ $j \in \{A,B,C,D\}$ $i \neq j$ then the shape recognition unit 71 decides that Case A applies (Namely, there is a low correlation among image data for optional pixel combinations among the four pixels (step S02).

Condition (A):

$|Ri-Rj| \leq Th1$, and $|Gi-Gj| \leq Th1$, and $|Bi-Bj| \leq Th1$.

When Case A is found to apply, the shape recognition unit 71 sets (1×4) pixel compression as the compression method to use.

If judged that Case A does not apply, then the shape recognition unit 71, specifies a first pair of two pixels and a second pair of two pixels. The shape recognition unit 71 then judges if condition is satisfied that: the difference in image data among the first pair of two pixels is lower than a specified value; and the difference among the image data for the second pair of two pixels is lower than a specified value. More specifically, the shape recognition unit 71 judges whether any of the following conditions (B1) through (B3) is established or not (step S03).

Condition (B1)

$|R_A-R_B| \leq Th2$, and $|G_A-G_B| \leq Th2$, and $|B_A-B_B| \leq Th2$, and $|R_C-R_D| \leq Th2$, and $|G_C-G_D| \leq Th2$, and $|B_C-B_D| \leq Th2$.

Condition (B2):

$|R_A-R_C| \leq Th2$, and $|G_A-G_C| \leq Th2$, and $|B_A-B_C| \leq Th2$, and $|R_B-R_D| \leq Th2$, and $|G_B-G_D| \leq Th2$, and $|B_B-B_D| \leq Th2$.

Condition (B3):

$|R_A-R_D| \leq Th2$, and $|G_A-G_D| \leq Th2$, and $|B_A-B_D| \leq Th2$, and $|R_B-R_C| \leq Th2$, and $|G_B-G_C| \leq Th2$, and $|B_B-B_C| \leq Th2$.

If any of the following conditions (B1) through (B3) is not established, the shape recognition unit 71 judges that Case B applies (Namely, there is a high correlation among two pixel image data; and there is a mutually low correlation among image data for the other two pixels.) In this case, the shape recognition unit 71 sets (2+1×2) pixel compression as the compression method to use.

If judged that neither of the Cases A or B apply then the shape recognition unit 71 decides whether or not the difference between the maximum value and the minimum value of the four pixel image data is smaller than a specified value. More specifically, the shape recognition unit 71 decides whether the following condition C is established or not (step S04).

Condition (C):

$\max(R_A,R_B,R_C,R_D)-\min(R_A,R_B,R_C,R_D)<Th3$, and $\max(G_A,G_B,G_C,G_D)-\min(G_A,G_B,G_C,G_D)<Th3$, and $\max(B_A,B_B,B_C,B_D)-\min(B_A,B_B,B_C,B_D)<Th3$.

If condition (C) cannot be established, the shape recognition unit 71 decides that Case C applies (Namely, there is a high correlation among two pixel image data; and there is also a high correlation between the image data for the other two pixels). In this case, the shape recognition unit 71 sets (2×2) pixel compression as the compression method to use.

However, if condition C cannot be established, the shape recognition unit 71 decides that Case D applies (There is a high correlation among the four pixel image data). In this case, the shape recognition unit 71 sets (4×1) pixel decompression as the compression method to use.

The shape recognition unit 71 generates selection data specifying usage of any of (1×4) pixel compression, (2+1×2) pixel compression, (2×2) pixel compression, or (4×1) pixel compression based on the above correlation recognition results and sends the selection data to the compression data selector unit 77. As already described above, the compression data selector unit 77 outputs any of the (1×4) compression data, (2+1×2) compression data, (2×2) compression data, or (4×1) compression data, as the compression data 54-i based on the selection data sent from the shape recognition unit 71.

3. Details of the Compression Method and Decompression Method

The lossless compression, (1×4) pixel compression, (2+1×2) pixel compression, (2×2) pixel compression, and (4×1) pixel compression, and the decompression method for the compression data that was compressed by these compression methods is described next.

3-1. Lossless Compression

Figure 24:
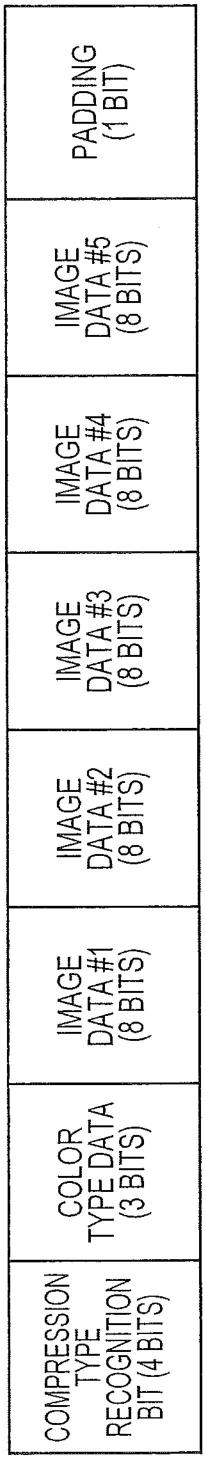
FIG. 24 is a drawing showing the lossless compression data format.

In the present embodiment, lossless compression is implemented by sorting (interchanging) the data values for image data of pixel in the target block. FIG. 24 is a drawing showing the format of lossless compression data generated by lossless compression. In the present embodiment, the lossless compression data is 48 bits. The lossless compression data is configured from compression type recognition bit, color type data, image data #1 through #5, and padding data.

The compression type recognition bit is data showing the type of compression method utilized for compression. In lossless compression, 4 bits are allocated to the compression type recognition bit. In the present embodiment, the value of the compression type recognition bit for lossless compression data is "1111."

Color type data is data showing which of the patterns in FIG. 23A through FIG. 23H that the image data for four pixels in the target block applies. In the present embodiment, eight specific patterns are defined so the color type data is 3 bits.

The image data #1 through #5 is data obtained by sorting (rearranging) data values for image data of pixels in the target block. The image data #1 through #5 is all 8 bit data. The data values for image data for four pixels in the target block is five or fewer types so all of the data value can be stored in the image data #1 through #5.

Padding data is data that is added in order to make the number of bits of lossless compression data the same as the compression data that is compressed by other compression methods. In the present embodiment, the padding data is 1 bit.

Decompressing of the lossless compression data that was generated by the above described lossless compression is implemented by sorting (rearranging) the image data #1 through #5 while referring to the color type data. Whether or not the image data for the four pixels in the target block applies to any of the patterns in FIG. 23A through FIG. 23H is recorded in the color type data, so referring to the color type data allows completely restoring the original image data for the four pixels in the target block without generating some type of compression distortion. Driving the liquid crystal display panel 2 according to fully restored image data allows making an effective and appropriate evaluation of the luminance characteristics and color level characteristics of the liquid crystal display panel 2.

3-2. (1×4) Pixel Compression and Decompression Method

Figure 26:
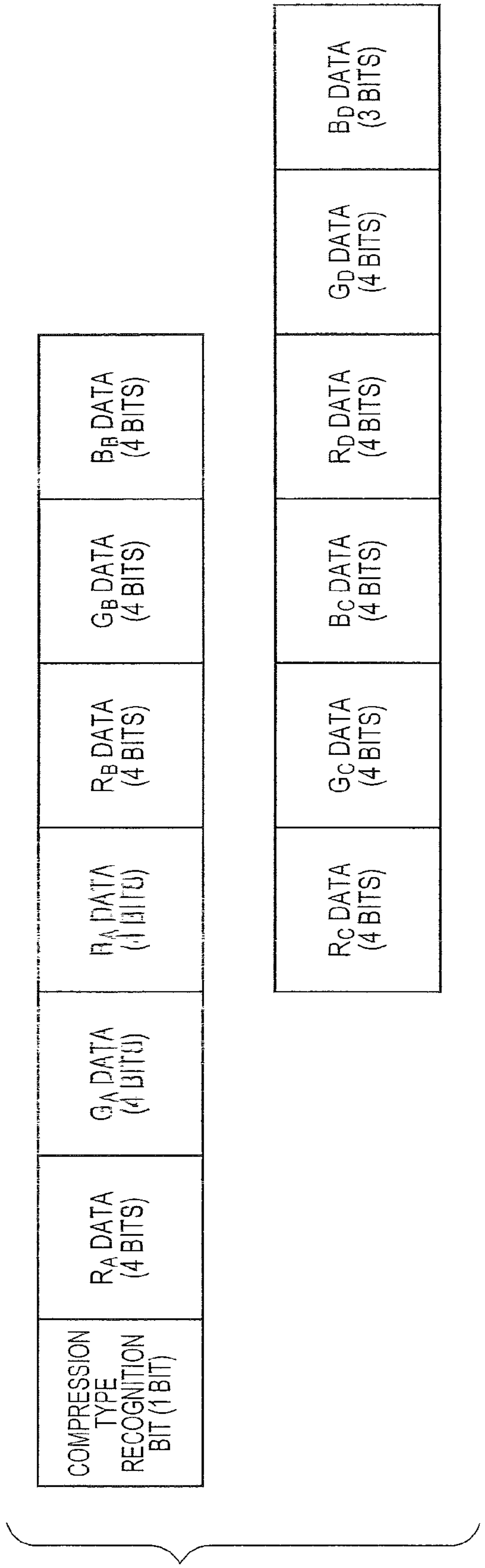
FIG. 26 is a drawing showing the (1×4) compression data format.

FIG. 25A is a concept diagram for describing (1×4) pixel compression. FIG. 26 is a concept diagram for showing the format of the (1×4) compression data. As described above, (1×4) pixel compression is a compression method utilized when there is a low correlation among image data of optional pixel combinations among the four pixels. As seen in FIG. 26, the (1×4) compression data of the present embodiment is configured from compression type recognition bit, $R_A$, $G_A$, $B_A$ data corresponding to image data for pixel A; $R_B$, $G_B$, $B_B$ data corresponding to image data for pixel B; $R_C$, $G_C$, $B_C$ data corresponding to image data for pixel C; and $R_D$, $G_D$, $B_D$ data corresponding to image data for pixel D. This (1×4) compression data is 48 bit data. Here, the compression type recognition bit is data showing the type of compression method utilized for compression. In the (1×4) compression data, 1 bit is allocated to the compression type recognition bit. In the present embodiment, "0" is the value of the compression type recognition bit in the (1×4) compression data.

The $R_A$, $G_A$, $B_A$ data on the other hand, is bit-plane-reduced data obtained by processing to reduce the bit planes relative to the level values of the R, G, B sub-pixels in the A pixel. The $R_B$, $G_B$, $B_B$ data is bit-plane-reduced data obtained by processing to reduce the bit planes relative to the level values of the R, G, B sub-pixels in the B pixel. In the same way, the $R_C$, $G_C$, $B_C$ data is bit-plane-reduced data obtained by processing to reduce the bit planes relative to the level values of the R, G, B sub-pixels in the C pixel, and the $R_D$, $G_D$, $B_D$ data is bit-plane-reduced data obtained by processing to reduce the bit planes relative to the level values of the R, G, B sub-pixels in the D pixel. In the present embodiment, only the $B_D$ data corresponding to the B sub-pixel in image D is 3 bit data, and the others are 4 bit data.

The (1×4) pixel compression is hereafter described while referring to FIG. 25A. In (1×4) pixel compression, dither processing is implemented on the respective pixels A through D by utilizing a dither matrix and in this way reduce the number of bit planes in the image data for pixel A through D. More specifically, processing to add the respective error data α of the image data for pixels A, B, C, D is first of all implemented. In the present embodiment, the error data a for each pixel is set from the pixel coordinates by utilizing a basic matrix called the Bayer matrix. The calculation of the error data α is separately described later on. A description of the error data α established for the pixels A, B, C, D is described using 0, 5, 10, 15 respectively for each pixel.

Rounding and bit round-down processing is also implemented to generate $R_A$, $G_A$, $B_A$ data, $R_B$, $G_B$, $B_B$ data, $R_C$, $G_C$, $B_C$ data, and $R_D$, $G_D$, $B_D$ data. More specifically, in the level value for the B sub-pixel of pixel D, after adding the value 16, round-down processing is implemented on the lower 5 bits. After adding the value 8 to the other level values, round-down processing is implemented on the lower 4 bits. Adding a "0" value as the compression type recognition bit to the $R_A$, $G_A$, $B_A$ data, $R_B$, $G_B$, $B_B$ data, $R_C$, $G_C$, $B_C$ data, and $R_D$, $G_D$, $B_D$ data generated in this way, serves to generate the (1×4) compression data.

FIG. 25B is a drawing showing the decompression method for compression data that was compressed by the (1×4) pixel compression (method). To decompress data compressed by (1×4) pixel compression, the bits in the $R_A$, $G_A$, $B_A$ data, $R_B$, $G_B$, $B_B$ data, $R_C$, $G_C$, $B_C$ data, and $R_D$, $G_D$, $B_D$ data are first of all rounded up. More specifically, 5 bit rounding up of the $B_D$ data corresponding to the B sub-pixel of pixel D is implemented, and 4-bit rounding up is implemented on the other data.

Reducing of the error data α is also implemented, and in this way, the image data for the pixels A through D (in other words, level values for the R sub-pixel, G sub-pixel, and B sub-pixel,) is restored. Comparing the image data for pixels A through D in the right box in FIG. 25B, with the image data for pixels A through D in the left box in FIG. 25A allows understanding that the above decompression method largely restores the original image data of pixels A through D.

3-3. (2+1×2) Pixel Compression

Figure 28A:
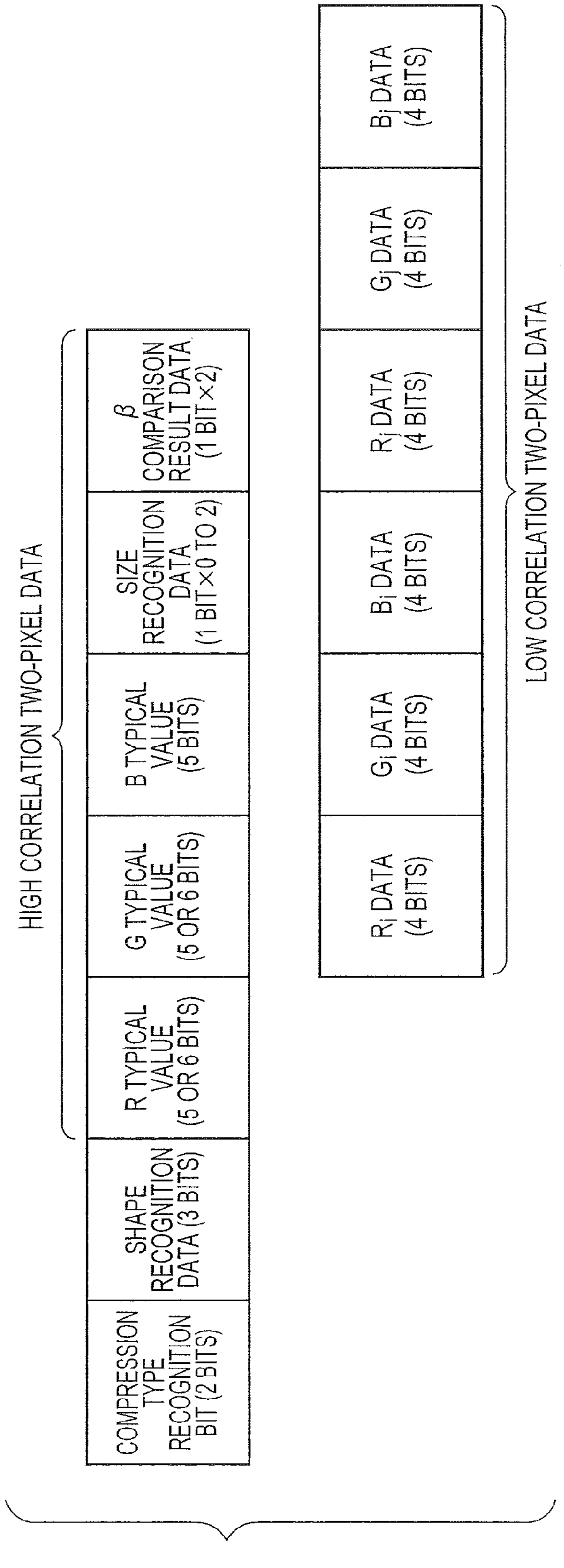
FIG. 28A is a drawing the (2+1×2) compression data format.

FIG. 27A is a concept diagram for describing (2+1×2) pixel compression. FIG. 28A is a concept diagram showing the format of the (2+1×2) compression data. As already described, (2+1×2) pixel compression is utilized when the image data for two pixels among the four pixels has a high correlation, and further the image data for the other two pixels has a low correlation with the first two pixels, and moreover the mutual correlation is low. As shown in FIG. 28A, the (2+1×2) compression data in the present embodiment is configured from a compression type recognition bit, selection data, R typical value, G typical value, B typical value, size recognition data, β comparison result data, $R_i$, $G_i$, $B_i$ data, and $R_j$, $G_j$, $B_j$ data. The (2+1×2) compression data is 48 bit data the same as the above described (1×4) compression data.

The compression type recognition bit is data showing the type of compression method utilized for compression. In (2+1×2) compression data, 2 bits are allocated to the compression type recognition bit. In the present embodiment, the value for the compression type recognition bit for (2+1×2) compression data is "10".

The selection data is 3 bit data showing which image data for two pixels among the pixels A through D has a high correlation. When using (2+1×2) pixel compression, the correlation among image data for two pixels among the A through D pixels is high, and the correlation of the remaining two pixels with image data of other pixels is low. Therefore, two pixel combinations having a high image data correlation are the following six combinations.

Pixels A, C
Pixels B, D
Pixels A, B
Pixels C, D
Pixels B, C
Pixels A, D

The three bits of the selection data shows if there are two pixels with a high correlation among the image data among any of these six combinations.

The R typical value, G typical value, and B typical value are respectively values for representing the level values of the R sub-pixel, G sub-pixel, and B sub-pixel for two pixels having a high correlation. In the example in FIG. 28A, 5 bit or 6 bit data is in the R typical value and G typical value, and the B typical value is 5 bit data.

The β comparison data is data showing whether or not the difference in level values for R sub-pixels of two pixels having a high correlation; and the difference in image data of G sub-pixels of two pixels having a high correlation is higher than a specified threshold value β. In the present embodiment, the β comparison data is 2 bit data. The size recognition data on the other hand, is data showing which level value of R sub-pixel in the pixel is large among two pixels having a high correlation, and which level value of the G sub-pixel in the pixel is large. The size recognition data corresponding to the R sub-pixel is generated only when the difference in level values of the R sub-pixels of two high correlation pixels is larger than a threshold value β, and the size recognition data corresponding to the G sub-pixel is generated only when the difference in level values of the GR sub-pixels of two high correlation pixels is larger than a threshold value β. The size recognition data is therefore 0 to 2 bit data.

The $R_i$, $G_i$, $B_i$ data, and the $R_j$, $G_j$, $B_j$ data are bit-plane reduced data obtained by processing that reduces the bit planes relative to the level values of the R, G, B sub-pixels for two pixels having a low correlation. In the present embodiment, the $R_i$, $G_i$, $B_i$ data, and the $R_j$, $G_j$, $B_j$ data are four bit data.

The (2+1×2) pixel compression is hereafter described while referring to FIG. 27A. FIG. 27A describes the generating of (2+1×2) compression data for the case where the correlation among image data for pixels A and B is high, the image data of pixels C, D has a low correlation with image data of pixels A and B, and further the correlation of image data of the C and D pixels is mutually low. One skilled in the art can readily understand that the (2+1×2) compression data can be generated in the same way for other pixels.

The compression process for image data of pixels A and B (having a high correlation) is first of all described. An average value of the level values is first of all calculated respectively for the R sub-pixels, G sub-pixels, and B sub-pixels. The average values of the Rave, Gave, and Bave for the R sub-pixels, G sub-pixels, and B sub-pixels are calculated by the following formulas:

$$Rave=(R_A+R_B+1)/2,$$

$$Gave=(G_A+G_B+1)/2,$$

$$Bave=(B_A+B_B+1)/2.$$

A comparison is made on whether the difference $|R_A-R_B|$ in level values of the R sub-pixels of pixels A, B, and the difference $|G_A-G_B|$ in level values of the G sub-pixels is larger than a specified threshold value β. The results of this comparison are recorded as β comparison data in the (2+1×2) compression data.

Size recognition data for the R sub-pixels and G sub-pixels of the pixels A, B is formed by the following procedure. When the difference $|R_A-R_B|$ in level values of the R sub-pixels of pixels A, B is larger than the specified threshold value β, the larger level value among either of the R sub-pixels of pixels A, B is recorded in the size recognition data. When the difference $|R_A-R_B|$ in level values of the R sub-pixels of pixels A, B is lower than the specified threshold value β, the size relation of the level values of the R sub-pixels of pixels A, B is not recorded in the size recognition data. In the same way, when the difference $|G_A-G_B|$ in level values of the G sub-pixels of pixels A, B is larger than the specified threshold value β, the larger level value among either the G sub-pixels of pixels A, B is recorded in the size recognition data. When the difference $|G_A-G_B|$ in level values of the G sub-pixels of pixels A, B is lower than the specified threshold value β, the size relation of the level values of the G sub-pixels of pixels A, B is not recorded in the size recognition data.

In the example in FIG. 27A, the level values of the R sub-pixels for pixels A, B are respectively 50, 59 and the threshold value β is 4. In this case, the difference $|R_A-R_B|$ in level values is larger than the threshold value β so that information is recorded in the β comparison data. The information that the level values for the R sub-pixels for pixels A, B is larger than the level values of the R sub-pixel for pixel A is recorded in the β comparison data. The respective level values for the G sub-pixels of pixels A, B on the other hand are 2 and 1. The difference $|G_A-G_B|$ in level values is smaller than the threshold value β so that value is recorded in the β comparison data. The size relation of the G sub-pixels of pixels A, B is not recorded. In the example in FIG. 27A, the size recognition data is 1 bit data.

The error data α is next added to the average values Rave, Gave, Bave of the level values for the R sub-pixels, G sub-pixels, and B sub-pixels. In the present embodiment, the error data α is determined by utilizing a basic matrix configured from coordinates from each two-pixel combination. The calculation of the error data α is separately described later on. A description of the error data α established for the pixels A, B is described using 0.

Rounding and bit round-down processing is also implemented and the R typical value, G typical value, and B typical value are calculated. More specifically, the number of bits rounded down in the bit round-off processing and the numerical value added in the rounding processing for the R sub-pixels and G sub-pixels are determined based on the size relation of the level value differences $|R_A-R_B|$, $|G_A-G_B|$ and the threshold value β. In regards to the R sub-pixels, if the difference $|R_A-R_B|$ in level values of the R sub-pixels is larger than the threshold value β, then processing is implemented to round-down the lower 3 bits after adding a value 4 to the average value $R_{ave}$ of the level value of the R sub-pixels, in this way calculate a R typical value. If not larger, processing is implemented to round down the lower 2 bits after adding a value 2 to the average value $R_{ave}$ and in this way calculate a R typical value. In regards to the G sub-pixel in the same way, if the difference in level values $|G_A-G_B|$ is larger than the threshold value β, then processing is implemented to round-down the lower 3 bits after adding a value 4 to the average value Gave of the level value of the G sub-pixels to in this way calculate a G typical value. If not larger, processing is implemented to round down the lower 2 bits after adding a value 2 to the average value Rave and in this way calculate a G typical value. In the example in FIG. 27A for the average value Rave of the R sub-pixel, processing is implemented to round-down the lower 3 bits after adding a value 4; and for the average value $G_{ave}$ of the G sub-pixel, processing is implemented to round-down the lower 2 bits after adding a value 2.

In regards to the B sub-pixel on the other hand, processing is implemented to round down the lower 3 bits after adding a value 4 to the average value Bave for the level value of the B sub-pixel to in this way calculate the B typical value. The compression processing of the image data for pixels A, B is now complete.

The (1×4) pixel compression is implemented in the same way on (low correlation) image data for pixels C and D. Namely, dither processing is separately implemented by utilizing a dither matrix for these pixels C and D, and the number of the bit planes in the image data for pixels C and D is in this way reduced. More specifically, the processing adds the error data α to the respective image data for pixels C and D. This error data α is calculated from the coordinates of the pixel as described above. In the following description the error data a established for pixels C and D is respectively 10 and 15.

The $R_C$, $G_C$, $B_C$ data and $R_D$, $G_D$, $B_D$ data is generated by implemented rounding and bit round-down processing. More specifically, after adding the value 8 to each of the level values of the R, G, B sub-pixels for pixels C and D, the lower 4 bits are rounded down. The $R_C$, $G_C$, $B_C$ data and $R_D$, $G_D$, $B_D$ data is calculated in this way.

The (2+1×2) compression data is generated by applying the compression type recognition bit and the selection data to the R typical value, G typical value, B typical value, size recognition data, β comparison result data, $R_C$, $G_C$, $B_C$ data and $R_D$, $G_D$, $B_D$ data generated in this way.

FIG. 27B is a drawing showing the decompression method for compression data compressed by (2+1×2) pixel compression. FIG. 27B illustrates decompression of the (2+1×2) compression data when there is a high correlation in image data for A and B pixels, a low correlation between image data for C and D pixels with image data for A and B pixels, and moreover a low mutual correlation in image data for pixels C and D. One skilled in the art can readily understand that decompression of the (2+1×2) compression data can also be applied in other cases.

Decompression processing of (high correlation) image data for pixels A and B is first of all described. Bit round-up processing is first of all implemented on the R typical value, G typical value, and B typical value. The number of bits for bit round-up processing for R typical values and G typical values is determined by the size relation between the differences $|R_A-R_B|$, $|G_A-G_B|$ in level values recorded in the β comparison data and the threshold value β. If the difference $|R_A-R_B|$ for the level value of the R sub-pixel is larger than the threshold value β, then 3 bit round-up processing is performed on the R typical value. If the difference is not larger, 2 bit round-up processing is performed. In the same way, when the difference $|G_A-G_B|$ for the level value of the G sub-pixel is larger than the threshold value β, 3 bit round-up processing is performed on the G typical value, and if not larger, then 2 bit round-up processing is performed. In the example in FIG. 27B, 3 bit round-up processing is performed on the R typical value, and 2 bit round-up processing is performed on the G typical value. However, 3 bit round-up processing is performed on the B typical value.

Further, after processing to reduce the error data α0 for the respective R typical value, G typical value, and B typical value, processing is next implemented to restore the level values of the R, G, B sub-pixels of pixels A and B from the R typical value, G typical value, and B typical value.

The β comparison data and size recognition data is utilized to restore the level value of the R sub-pixels of pixels A and B. When the difference $|R_A-R_B|$ for the level value of the R sub-pixel is larger than the threshold value β as recorded in the β comparison data, then a value added by a fixed value 5 in the R typical value is restored as the level value of the R sub-pixel recorded in the size recognition data as the large value among pixels A and B; and a value reduced by a fixed value 5 in the R typical value is restored as the level value in the R sub-pixel recorded in the size recognition data as the small value. However when the difference $|R_A-R_B|$ for the level value of the R sub-pixel is smaller than the threshold value β, then the level value for the R sub-pixel of pixels A and B is restored as the match for the R typical value. In the example in FIG. 27B, the level value for the R sub-pixel of pixel A is restored as a value reduced just by a value 5 from the R typical value, and the level value for the R sub-pixel of pixel B is restored as a value where just a value 5 is added to the R typical value.

The same processing is also implemented utilizing the β comparison data and the size recognition data in the restoration of the level value of G sub-pixels A and B. In the example in FIG. 27B, the values for all of the G sub-pixels of pixels A and B are restored to match the G typical value.

When restoring the level values for the B sub-pixels of pixels A and B on the other hand, the values for the B sub-pixels of pixels A and B are all restored to match the B typical value regardless of the β comparison data and the size recognition data.

The restoration of level values for the R sub-pixels, G sub-pixels, and B sub-pixels of pixels A and B is now complete.

The processing the same as the (1×4) pixel compression is implemented on (low correlation) image data for pixels C and D. In the decompression processing for image data of pixel C and D, 4 bit round-up processing is first of all performed on the $R_C$, $G_C$, $B_C$ data and $R_D$, $G_D$, $B_D$ data. Reducing of the error data α is also implemented, and in this way the image data (in other words, the level values for the R sub-pixels, G sub-pixels, and B sub-pixels) for pixels C and D is restored. The above processing completes the restoration of the level values for the R sub-pixels, G sub-pixels, and B sub-pixels for pixels C and D.

Comparing image data for pixels A through D in the right box in FIG. 27B with image data for pixels A through D in the left box in FIG. 27A allows one to readily understand that applying the above described decompression method can largely restore the image data for pixels A through D.

While 3 bits were applied to the selection data as a variation example for the compression processing and decompression processing in FIG. 27A and FIG. 27B, since there are six combinations of two pixels with a high image data correlation, the number of bits applied to the typical value can be increased for specific pixel combinations as illustrated by defining the selection data as follows (x is optionally “0” and “1”).

Combination of pixels A and B: 00x
Combination of pixels A and C: 010
Combination of pixels A and D: 011
Combination of pixels B and C: 100
Combination of pixels B and D: 101
Combination of pixels C and D: 11x In this case, though the number of bits applied to the selection data is 2 bits when the two pixels having the high correlation image data is pixels A and B, and when the pixels C and D; the number of bits applied to any of the R typical value, G typical value, and B typical value can be increased by 1 bit.

Figure 28B:
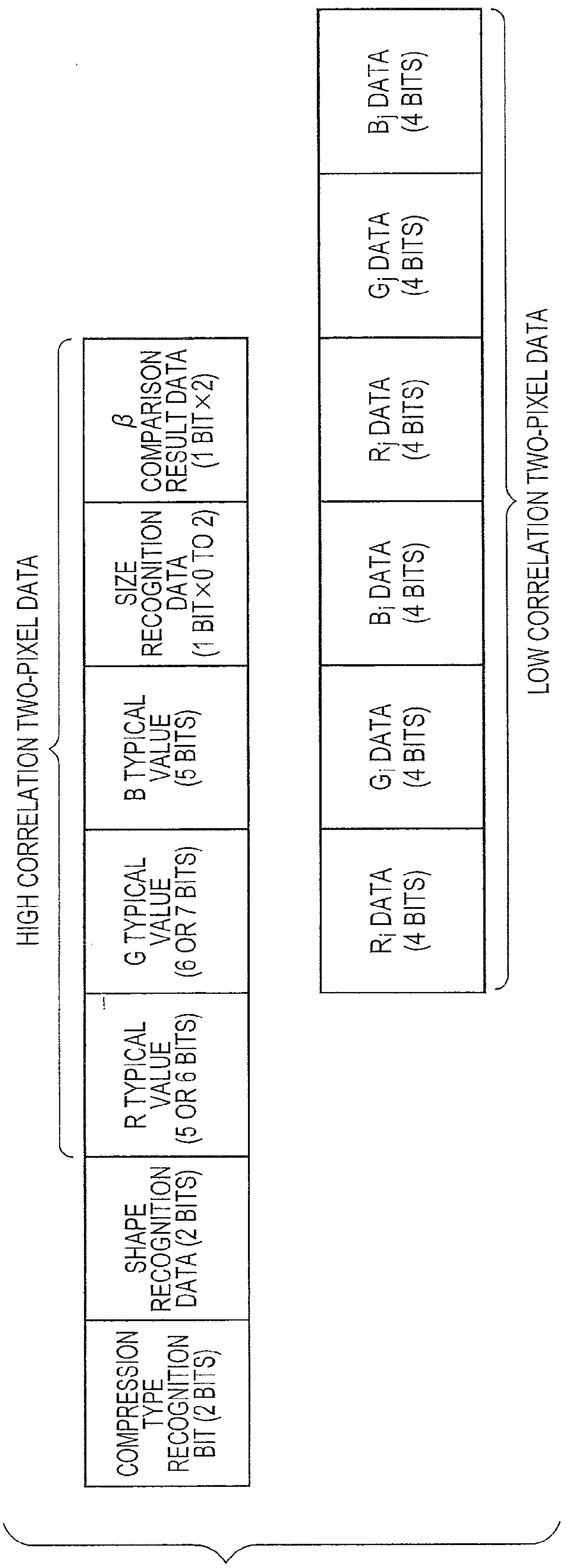
FIG. 28B is a drawing the (2+1×2) compression data format.

FIG. 28B is a drawing showing the data format of the (2+1×2) compression data when two pixels having the high correlation in image data are pixels A and B, or pixels C and D; and when the number of bits applied to the G typical value is increased 1 bit. In the format in FIG. 28B, 2 bits are applied to the selection data, and 6 bits or 7 bits are applied to the G typical value according to the size relation between the difference $|G_A-G_B|$ in level values and the β comparison data. The compression distortion can be reduced by increasing the information quantity by increasing the number of bits applied to the G typical value. In this case, 1 or 2 bit round-up processing is implemented on the G typical value in the decompression processing. The number of bits in the round-up processing is determined according to the threshold value β and the difference $|G_A-G_B|$ in level values.

3-4. (2×2) Pixel Compression

Figure 29A:
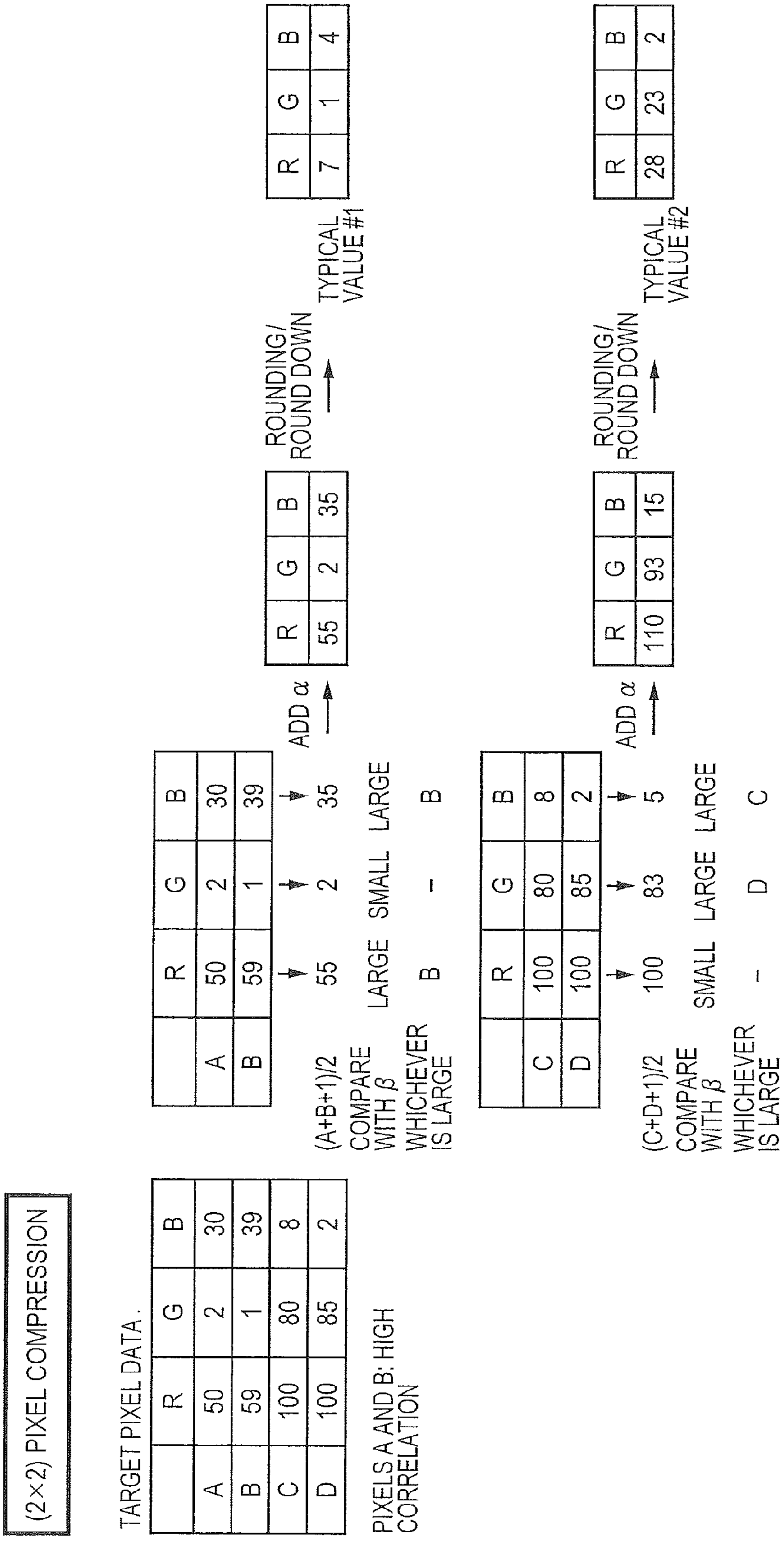
FIG. 29A is a concept view for describing (2×2) pixel compression.
Figure 30A:
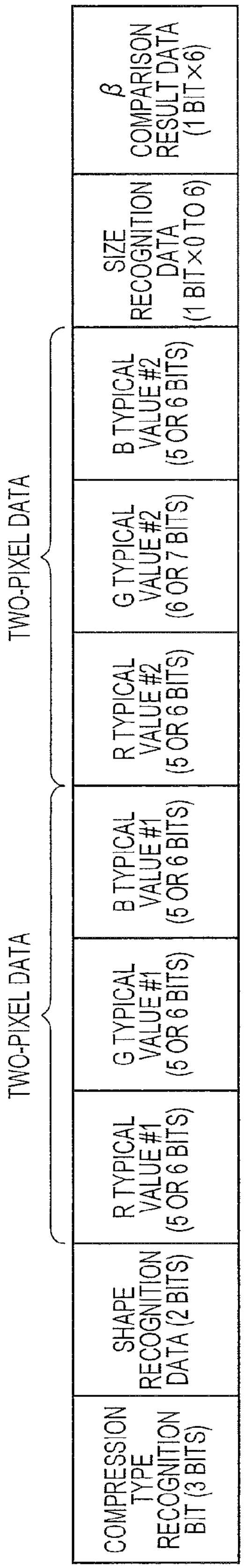
FIG. 30A is a drawing the (2×2) compression data format.

FIG. 29A is a concept diagram for describing the (2×2) pixel compression. FIG. 30A is a concept diagram showing the format for the (2×2) compression data. As described previously, (2×2) pixel compression is a compression method utilized when there is a high correlation between image data for two pixels (among the four pixels), and also a high correlation in the image data for the other two pixels. In the present embodiment as shown in FIG. 30A, the (2×2) compression data is 48 bit data, and is configured from a compression type recognition bit, selection data, R typical value #1, G typical value #1, B typical value #1, R typical value #2, G typical value #2, B typical value #2, size recognition data, and β comparison result data.

The compression type recognition bit is data showing the type of compression method utilized for (data) compression, and 3 bits is allocated to the compression type recognition bit in the (2×2) compression data. In the present embodiment, the value "110" is the value of the compression type recognition bit in the (2×2) compression data.

The selection data is 2 bit data showing a high correlation in image data for any two pixels among the four pixels A through D. If (2×2) pixel compression is utilized then there is a high correlation between image data for two pixels among A through D, and moreover there is a high correlation in image data for the other two pixels. Therefore, two pixel combinations with a high image data correlation are the following three cases:

High correlation of pixels A and B, high correlation of pixels C and D;

High correlation of pixels A and C, high correlation of pixels B and D;

High correlation of pixels A and D, high correlation of pixels B and C;

The selection data is shown by 2 bits as any of these three combinations.

The R typical value #1, G typical value #1, B typical value #1 are respectively values representing the level values of the R sub-pixels, G sub-pixels, and B sub-pixels of the two pixels. The R typical value #2, G typical value #2, and B typical value #2 are respectively values representing the level values of the R sub-pixels, G sub-pixels, and B sub-pixels of the other two pixels. In the example in FIG. 30A, the R typical value #1, G typical value #1, B typical value #1, R typical value #2, and B typical value #2 are data of 5 bits or 6 bits; and the G typical value #2 is 6 bit or 7 bit data.

The β comparison data is data showing whether or not the difference in level values of R sub-pixels for two pixels with a high correlation; the difference in image data of G sub-pixels for two pixels with a high correlation; and the difference in image data of B sub-pixels for the two pixels is larger than a specified threshold value β. In the present embodiment, the β comparison data is 6 bits of data with 3 bits allocated to each of the two pairs of two pixels. The size recognition data on the other hand, is data showing which of two pixels with a high correlation has a large level value for the R sub-pixels, and which has a large level value for the G sub-pixels. The size recognition data for the R sub-pixels is data generated only when the difference in level value of R sub-pixels for two pixels with a high correlation is larger than a threshold value β; the size recognition data for the G sub-pixels is data generated only when the difference in level value of G sub-pixels for two pixels with a high correlation is larger than a threshold value β; the size recognition data for the B sub-pixels is data generated only when the difference in level value of the B sub-pixels for two pixels with a high correlation is larger than a threshold value β. The size recognition data is therefore data from 0 to 6 bits.

The (2×2) pixel compression is described next while referring to FIG. 29A. FIG. 29A illustrates the generation of (2×2) compression data when there is a high correlation among image data for pixels A and B, and there is a high correlation among image data for pixels C and D. One skilled in the art can readily understand that the (2×2) compression data can be generated in the same way for other cases.

First of all, the average value of the level values for the R sub-pixels, G sub-pixels, and B sub-pixels is calculated. The average values Rave1, Gave1, Bave1 for the level values of the R sub-pixels, G sub-pixels, and B sub-pixels of the pixels A and B; and the average values Rave2, Gave2, Bave2 for the level values of the R sub-pixels, G sub-pixels, and B sub-pixels of the pixels C and D are calculated by the following formulas.

$$Rave1=(R_A+R_B+1)/2,$$

$$Gave1=(G_A+G_B+1)/2,$$

$$Bave1=(B_A+B_B+1)/2,$$

$$Rave2=(R_A+R_B+1)/2,$$

$$Gave2=(G_A+G_B+1)/2,$$

$$Bave1=(B_A+B_B+1)/2.$$

Further, the difference $|R_A-R_B|$ for the level values of the R sub-pixels of pixels A and B, the difference $|G_A-G_B|$ for the level value of the G sub-pixels (of pixels A and B), the difference $|B_A-B_B|$ for the level values of the B sub-pixels (of pixels A and B) are compared as to whether larger than a specified threshold value β. In the same way, the difference $|R_C-R_D|$ for the level values of the R sub-pixels of pixels C and D, the difference $|G_C-G_D|$ for the level values of the G sub-pixels, the difference $|B_C-B_D|$ for the level values of the B sub-pixels are compared as to whether larger than a specified threshold value β. The results from these comparisons is recorded in the (2×2) compression data as β comparison data.

Size recognition data is formed from the combination of pixels A and B, and combination of pixels C and D.

More specifically, if the difference $|R_A-R_B|$ in the level values of the R sub-pixels of pixels A and B is larger than the threshold value β, which of the A and B pixel's R sub-pixel level values is larger is recorded in the size recognition data. If the difference $\equiv R_A-R_B|$ in the level values of the R sub-pixels of pixels A and B is smaller than the threshold value β, the size relation of the level values of the R sub-pixels of pixels A and B is not recorded in the size recognition data. In the same way, if the difference $|G_A-G_B|$ in the level values of the G sub-pixels of pixels A and B is larger than the threshold value β, which of the A and B pixel's G sub-pixel level values is larger is recorded in the size recognition data. If the difference $|G_A-G_B|$ in the level values of the G sub-pixels of pixels A and B is larger than the threshold value β, the size relation of the level values of the G sub-pixel of pixels A and B is not recorded in the size recognition data. If the difference $|B_A-B_B|$ in the level values of the B sub-pixels of pixels A and B is larger than the threshold value β, which of the A and B pixel's B sub-pixel level values is larger is recorded in the size recognition data. If the difference $|B_A-B_B|$ in the level values of the B sub-pixels of pixels A and B is smaller than the threshold value β, the size relation of the level values of the B sub-pixels of pixels A and B is not recorded in the size recognition data.

In the same way, if the difference $|R_C-R_D|$ in the level values of the R sub-pixels of pixels C and D is larger than the threshold value β, which of the C and D pixel's R sub-pixel level values is larger is recorded in the size recognition data. If the difference $|R_C-R_D|$ in the level values of the R sub-pixels of pixels C and D is smaller than the threshold value β, the size relation of the level values of the R sub-pixels of pixels C and D is not recorded in the size recognition data. In the same way, if the difference $|G_C|G_D|$ in the level values of the G sub-pixels of pixels C and D is larger than the threshold value β, which of the C and D pixel's G sub-pixel level values is larger is recorded in the size recognition data. If the difference $|G_C-G_D|$ in the level values of the G sub-pixels of pixels C and D is smaller than the threshold value β, the size relation of the level values of the R sub-pixels of pixels C and D is not recorded in the size recognition data. If the difference $|B_C-B_D|$ in the level values of the B sub-pixels of pixels C and D is larger than the threshold value β, which of the C and D pixel's B sub-pixel level values is larger is recorded in the size recognition data. If the difference $|B_C-B_D|$ in the level values of the B sub-pixels of pixels C and D is smaller than the threshold value β, the size relation of the level values of the B sub-pixels of pixels C and D is not recorded in the size recognition data.

In the example in FIG. 29A, the level values of the R sub-pixels of the pixels A and B are respectively 50 and 59, and the threshold value β is 4. In this case, the difference $|R_C-R_D|$ in the level values is larger than the threshold value β, so that information is recorded in the β comparison data; and the information that the level value of the R sub-pixel in pixel B is larger than the level value of the R sub-pixel of pixel A is recorded in the size recognition data. The level values of the G sub-pixels of pixels A and B on the other hand are respectively 2 and 1. In this case, the difference $|G_A-G_B|$ in the level values is smaller than the threshold value β, so that information is recorded in the β comparison data. The size relation of the level values of the G sub-pixels of pixels A and B is not recorded in the size recognition data. Moreover, the level values of the B sub-pixels of pixels A and B are respectively 30 and 39. In this case, the difference $|B_A-B_B|$ in the level values is larger than the threshold value β, so that information is recorded in the β comparison data. The information that the level values for the B sub-pixel of pixel B is larger than the level value of the B sub-pixel of pixel A is recorded in the size recognition data.

The level values of the R sub-pixels in the C and D pixels are all 100. In this case, the difference $|R_C-R_D|$ in the level values is smaller than the threshold value β, so that information is recorded in the β comparison data. The size relation of the level values in the G sub-pixels of the pixels A and B is not recorded in the size recognition data. The level values of the G sub-pixels in pixels C and D are respectively 80 and 85. In this case, the difference $|G_A-G_B|$ in the level values is larger than the threshold value β, so that information is recorded in the β comparison data, also the information that the level values of the G sub-pixels of pixel D is larger than the level values of the G sub-pixel of pixel C is recorded in the size recognition data. The level values of the B sub-pixels in the pixels C and D are respectively 8 and 2. In this case, the difference $|B_D-B_D|$ in the level values is larger than the threshold value β, so that information is recorded in the β comparison data. Moreover, the information that the level values for the B sub-pixel in pixel C are larger than the level values of the B sub-pixel in pixel D is recorded in the size recognition data Also, error data α is added to the average values Rave1, Gave1, Bave1 for the level values of the R sub-pixels, G sub-pixels, and B sub-pixels of the pixels A and B; and the average values Rave2, Gave2, Bave2 for the level values of the R sub-pixels, G sub-pixels, and B sub-pixels of the pixels C and D. In the present embodiment, the error data α is determined from the coordinates of two pixel combinations by utilizing a basic matrix called the Bayer matrix. The calculation of the error data α is separately described later on. A description of the error data α established for the pixels A, B is described using 0 for each pixel in the present embodiment next.

Utilizing rounding and round-down processing, the R typical value #1, G typical value #1, B typical value #1, R typical value #2, G typical value #2, and B typical value #2 are calculated. Describing first of all for the A and B pixels, the value to add in the rounding processing and the number of bits rounded off in the bit round-down processing is determined in 2 bits or 3 bits according to the size relation between the level value differences $|R_A-R_B|$, $|G_A-G_B|$, and $|B_A-B_B|$ and threshold value β. If the difference $|R_A-R_B|$ in level values of the R sub-pixels is larger than the threshold value β, then a value 4 is added to the average value Rave1 of the R sub-pixel level value and round-down processing is implemented to round down the lower 3 bits. The R typical value #1 is in this way calculated. If the difference is not larger than the threshold value β, then processing to add a value 2 to the average value Rave1 and then round down the lower 2 bits is implemented, to in this way calculate the R typical value #1. The R typical value #1 consequently becomes bits or 6 bits. The G sub-pixels and B sub-pixels are handled in the same way. If the difference $|G_A-G_B|$ in level values is larger than the threshold value β, processing is performed to add a value 4 to the average value Gave1 of the level value for the G sub-pixel and then round down the lower 3 bits, to in this way calculate the G typical value #1. If not larger, then processing to add a value 2 to the average value Gave1 and perform round-down processing is performed to in this way calculate the G typical value #1. Also, if the difference $|B_A-B_B|$ in level values is larger than the threshold value β, then processing to add a value 4 to the average value Bave1 of the level values for the B sub-pixels and then round down the lower 3 bits is implemented to in this way calculate the B typical value #1. If not larger, processing is performed to add a value 2 to the average value Bave1 and round off the lower 2 bits to in this way calculate the B typical value #1.

In the example in FIG. 29A, processing is performed for the average value Rave1 of the R sub-pixel of the pixels A and B to add a value 4 and then to round down the lower 3 bits to calculate the R typical value #1. The G typical value #1 is calculated by adding a value 2 and then rounding down the lower 2 bits on the average value Gave1 of the G sub-pixel of the pixels A and B. Also, for the B cub-pixel of the pixel A and B, the B typical value #1 is calculated by adding a value 4 and then rounding down the lower 3 bits on the average value Bave1 of the level value for the B sub-pixel.

The same processing is implemented on pixel C and D combinations to calculate the R typical value #2, G typical value #2, and B typical value #2. However, for the G sub-pixel of pixels C and D, the numerical value added in the rounding processing and the number of bits rounded down in the bit round-down processing is 1 bit or 2 bits. If the difference $|G_C-G_D|$ in level values is larger than the threshold value β, then processing is performed for the average value Gave2 of the level values of the G sub-pixel to add a value 2 and then the lower 2 bits rounded down to in this way calculate the G typical value #2. If not larger, processing is performed for the average value Gave2 to add a value 1 and rounded down the lower 1 bit to in this way calculate the G typical value #2.

In the example in FIG. 29A, processing is performed for the average value Rave2 of the R sub-pixel of pixels C and D to add a value 2 and then round down the lower 2 bits to calculate the R typical value #2. Moreover, for the average value Gave2 of the G sub-pixels of pixels C and D, processing is performed to add a value 4 and round down the lower 3 bits to calculate the G typical value #2. Also, for the B sub-pixels of the pixels C and D, processing is performed for the average value Bave2 of the levels values for the B sub-pixels to add a value 4 is and then round down the lower 3 bits to calculate the B typical value #2.

The process for compressing by (2×2) pixel compression is now complete.

Figure 29B:
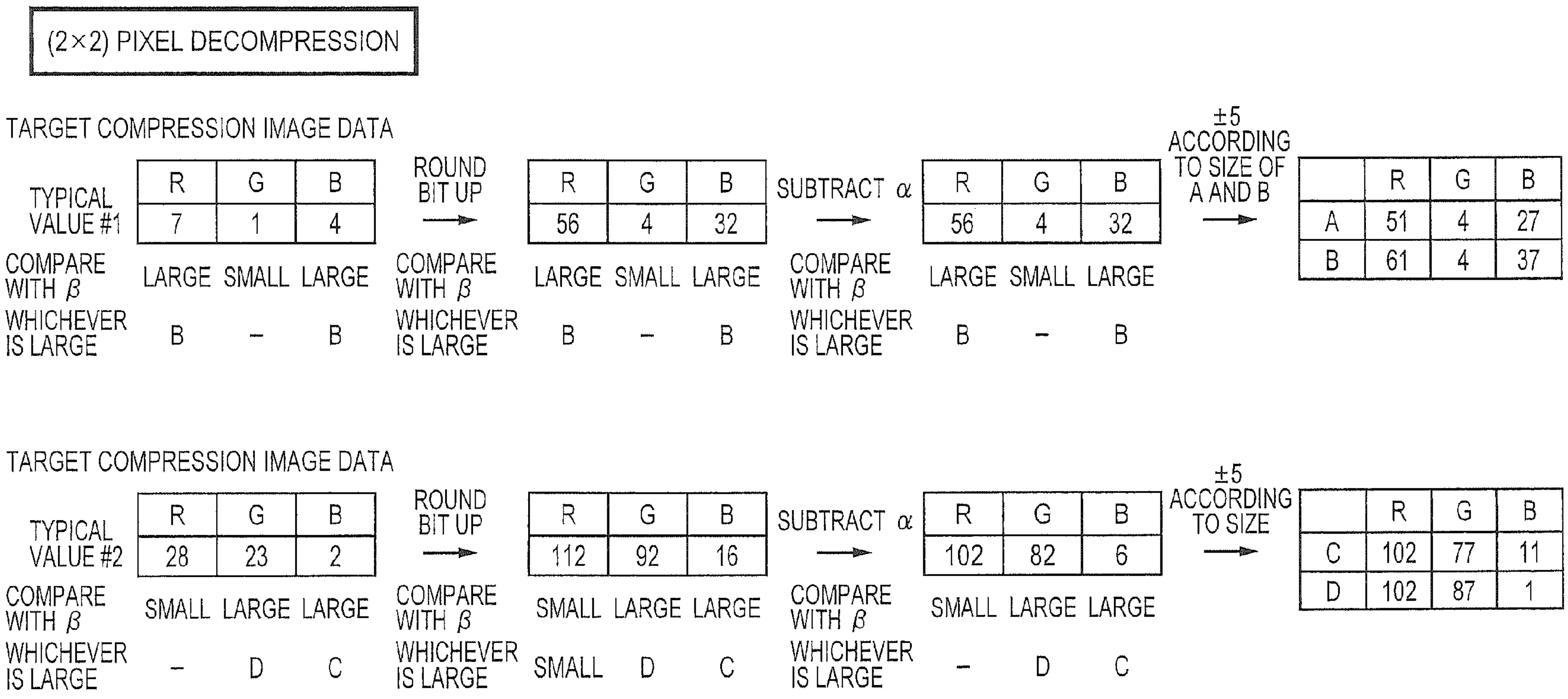
FIG. 29B is a concept view for describing the decompression method for compression data compressed by (2×2) pixel compression.

FIG. 29B on the other hand, is a drawing showing the decompression method for compression data that was compressed by (2×2) pixel compression. FIG. 29B describes the decompression of (2×2) compression data for the case where there is a high correlation between the image data of the pixels A and B, and also a high correlation between the image data of the pixels C and D. One skilled in the art can readily understand that the (2×2) compression data can be readily decompressed in the same way for other cases.

First of all, bit round-up processing is implemented on the R typical value #1, G typical value #1, and B typical value #1. The number of bits of the bit round-up processing is determined according to the size relation between the threshold value β and the difference $|R_A-R_B|$, $|G_A-G_B|$, $|B_A-B_B|$ in level values recorded in the β comparison data. When the difference $|R_A-R_B|$ in level values of the R sub-pixel of the pixels A and B is larger than the threshold value β, 3 bit round-up processing is performed on the R typical value #1. If not larger, then 2 bit round-up processing is performed. In the same way, if the difference $|G_A-G_B|$ in level values of the G sub-pixel of the pixels A and B is larger than the threshold value β, then 3 bit round-up processing is performed on the G typical value #1. If not larger, 2 bit round-up processing is performed. If the difference $|B_A-B_B|$ of level values of the B sub-pixel of the pixels A and B is larger than the threshold value β, 3 bit round-up processing is performed on the B typical value #1. If not larger, then 2 bit round-up processing is performed. In the example in FIG. 29B, 3 bit round-up processing is performed on the R typical value #1, and 2 bit round-up processing is performed on the G typical value #1, and 3 bit round-up processing is performed on the B typical value #1.

The same bit round-up processing is also implemented on the R typical value #2, G typical value #2, and B typical value #2. However, the number of bits for bit round-up processing of the G typical value #2 is selected from among 1 bit or 2 bits. When the difference $|G_C-G_D|$ in level values of the G sub-pixel of the pixels the C and D is larger than the threshold value β, 2 bit round-up processing is performed on the G typical value #2. If not larger, then 2 bit round-up processing is performed. In the example in FIG. 29B, 2 bit round-up processing is implemented on the R typical value #2, bit round-up processing is implemented on the G typical value #2, and 3 bit round-up processing is implemented on the B typical value #2.

After reducing the error data α respectively on the R typical value #1, G typical value #1, B typical value #1, R typical value #2, G typical value #2, and B typical value #2, processing is performed to restore the level values for the R, G, B sub-pixels of the pixels A and B, and the level values for the R, G, B sub-pixels of the pixels C and D from these (typical) values.

The β comparison data and size recognition data are utilized to restore the level values. When the difference $|R_A-R_B|$ in level values of the R sub-pixel of the pixels A and B is larger than the threshold value β that is recorded in the β comparison data; a value for which a fixed value 5 is added to the R typical value #1, is restored as the level value for R sub-pixels recorded in the size recognition data in the pixels A and B as the larger value; and a value for which a fixed value 5 was subtracted from the R typical value #1 is restored as the level value for R sub-pixels recorded in the size recognition data as the smaller value. When the difference $|R_A-R_B|$ in level values of the R sub-pixel of the pixels A and B is smaller than the threshold value β, the level values of the R sub-pixel of the pixels A and B is restored to match the R typical value #1. In the same way, the level value of the G sub-pixel and B sub-pixel of the pixels A and B, and level values of the R sub-pixels, G sub-pixels, and B sub-pixels of the pixels C and D are restored by the same procedure.

In the example in FIG. 29B, the level value of the R sub-pixel of the pixel A is restored as a value reduced from R typical value #1 by just a value 5; the level value of the R sub-pixel of the pixel B is restored as a value added with a value 5 from the R typical value #1. Also, the level value of the G sub-pixels of the pixels A and B is restored as a value matching the G typical value #1. The level value of the B sub-pixel of the pixel A is restored as a value reduced from the B typical value #1 by just a value 5, and the level value of the B sub-pixel of the pixel A is restored as a value with a value 5 added from the B typical value #1. The level values of the R sub-pixels of the pixels C and D on the other hand, is restored as a value matching the B typical value #2. The level value of the G sub-pixel of the pixel C is restored as a value reduced from the G typical value #2 by just a value 5; and the level value of the G sub-pixel of pixel D is restored as a value with a value 5 added from the G typical value #2. Further, the level value of the B sub-pixel of the C pixel is restored as a value with a value 5 added from the G typical value #2; and the level value of the B sub-pixel of the pixel D is restored as a value reduced from the G typical value #2 by a value 5.

The above completes the restoration of the R sub-pixel, G sub-pixel, and B sub-pixel for pixels A through D. Comparing the image data for pixels A through D in the right box in FIG. 29B, with the image data of the pixels A through D in the left box in FIG. 29A shows that the above described decompression method has largely restored the original image data of pixels A through D.

In a variation of the compression processing and decompression processing in FIG. 29A and FIG. 29B, there are three 2-pixel combinations having high image data correlation, while applying 2 bits to the selection data, so that the number of bits applied to the typical value can be increased. The selection data can for example be defined as follows (x is optionally “0” and “1”).

Pixels A and B have high correlation, pixels C and D have high correlation: 0x

Pixels A and C have high correlation, pixels B and D have high correlation: 10

Pixels A and D have high correlation, pixels B and C have high correlation: 11

In this case, while setting the number of bits applied to the selection data as 1 bit only when there is a high correlation in image data among the pixels A and B, and a high correlation in image data among the pixels C and D; the number of bits applied to any of the R typical value #1, G typical value #1, B typical value #1, R typical value #2, G typical value #2, and B typical value #2 can be increased 1 bit. Increasing the number of bits applied to the G typical value #1 by 1 bit is preferable for improving the target characteristics of the data in the pixel A and B combinations, and pixel C and D combinations.

Figure 30B:
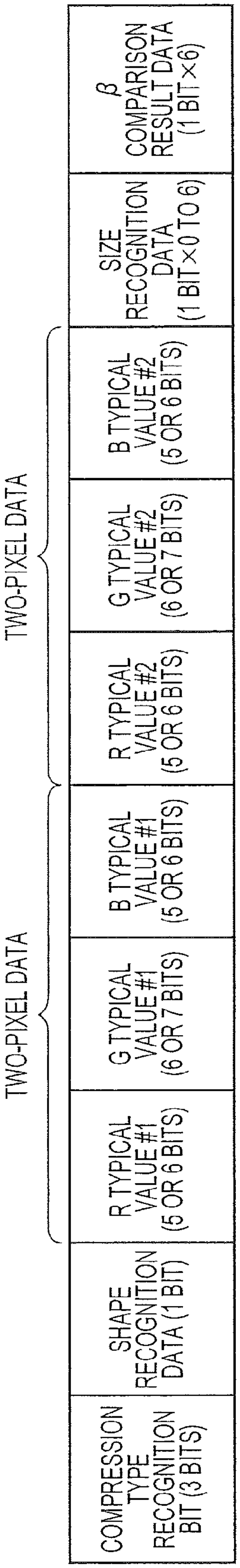
FIG. 30B is a drawing the (2×2) compression data format.

FIG. 30B is a drawing showing the format of the (2×2) compression data when adding 1 bit to the number of bits applied to the G typical value #1, when there is a high correlation in image data among pixels A and B, and a high correlation in image data among pixels C and D. In the format in FIG. 30B, 1 bit is applied to the selection data, and 6 bits or 7 bits are applied to the G typical bit #1 according to the size relation between the threshold value β and difference $|G_A-G_B|$ in level values. A reduction in compression distortion can be achieved by increasing the information quantity through increasing the number of bits applied to the G typical value #1. In this case, 1 bit or 2 bit round-up processing is implemented on the G typical value #1 in the decompression processing. The number of bits in the round-up processing is determined by the size relation of the threshold value β and the difference $|G_A-G_B|$ in the level values.

3.5. (4×1) Pixel Compression

FIG. 31A is a concept diagram for describing (4×1) pixel compression. FIG. 32 is a concept diagram (view) showing the format of the (4×1) compression data. The (4×1) pixel compression as described above is a compression method utilized when there is a high correlation in image data in the four pixels of the target block. In the present embodiment, the (4×1) compression data is 48 bit data as shown in FIG. 32; and is configured from the compression type recognition bit, and the following seven data: Ymin, Ydist0 through Ydist2, address data, Cb', and Cr'.

The compression type recognition bit is data showing the type of compression method utilized for compression, and in the (4×1) compression data, 4 bits is assigned to the compression type recognition bit. In the present embodiment, the value “1110” is the value of the compression type recognition bit in the (4×1) compression data.

The Ymin, Ydist0 through Ydist2, address data, Cb', and Cr' are data obtained by changing the image data in the four pixels of the target block from RGB data to YUV data, and further implementing compression processing on the YUV data. Here, the Ymin, Ydist0 through Ydist2 is data obtained from the luminance data among the YUV data of the four pixel of the target block; and the Cb' and Cr' are data obtained from the color difference data. The Ymin, Ydist0 through Ydist2 and Cb° and Cr' are typical values for image data in the four pixel of the target block. In the present embodiment, 10 bits are applied to the minimum luminance data Ymin, 4 bits are applied respectively to the Ydist0 through Ydist2, 2 bits to the address data, and 10 bits are respectively applied to the Cb' and Cr'. The (4×1) pixel compression is hereafter described while referring to FIG. 31A.

The luminance data Y and color difference data Cr, Cb is calculated for each of the pixels A through D, from the following matrix processing.

$$\begin{bmatrix} Y_k \\ Cr_k \\ Cb_k \end{bmatrix} = \begin{bmatrix} 1 & 2 & 1 \\ 0 & -1 & 1 \\ 1 & -1 & 0 \end{bmatrix} \begin{bmatrix} R_k \\ G_k \\ B_k \end{bmatrix}, \qquad \text{[Formula 1]}$$

Here, $Y_k$ is the luminance data for the pixel k, and $Cr_k$, $Cb_k$ are the color difference data for pixel k. As described above, the $R_k$, $G_k$, and Bk are respectively level values for the R sub-pixels, G sub-pixels, and B sub-pixels of the pixel k.

Also, the Ymin, Ydist0 through Ydist2, address data, Cb', and Cr' data are formed from the luminance data $Y_k$ of the pixels A through D, and color difference data $Cr_k$, $Cb_k$.

The Ymin is defined as the minimum (minimum luminance data) among the luminance data $Y_A$ through $Y_D$. Also, the Ydist0 through Ydist2 are generated by implementing 2 bit round-down processing on the difference between the minimum luminance data $Y_m$ and the remaining luminance data. The address data is generated as data showing which is the minimum data among the luminance data of the A through D pixels. In the example in FIG. 31A, the Ymin and the Ydist0 through Ydist2 are calculated by the following formula.

$$Ymin=Y_D=4,$$

$$Ydist0=(Y_A-Ymin)>>2=(48-4)>>2=11,$$

$$Ydist1=(Y_B-Ymin)>>2=(28-4)>>2=6,$$

$$Ydist2=(Y_C-Ymin)>>2=(16-4)>>2=3,$$

Here, “>>2” is an operator showing the 2 bit round-down processing. Information showing the luminance data $Y_D$ is the minimum is recorded in the address data.

Also, the Cr' is generated by rounding down the 1 bit in the sum of $Cr_A$ through $Cr_D$, and in the same way Cb' is generated by rounding down 1 bit in the sum of $Cb_A$ through $Cb_D$. In the example in FIG. 31A, Cr' and Cb' are calculated by the following formula.

$$\begin{aligned} Cr' &= (Cr_A + Cr_B + Cr_C + Cr_D) >> 1 \\ &= (2 + 1 - 1 + 1) >> 1 = 1, \\ Cb' &= (Cb_A + Cb_B + Cb_C + Cb_D) >> 1 \\ &= (-2 - 1 + 1 - 1) >> 1 = -1, \end{aligned}$$

Here, “>>1” is an operator showing the 1 bit round-down processing. The generation of the (4×1) compression data is now complete.

FIG. 31B on the other hand is drawings showing the decompression method for compression data compressed by (4×1) pixel compression. In decompressing the compression data compressed by (4×1) pixel compression, the respective luminance data for each of the pixels A through D is restored from the Ymin, Ydist0 through Ydist2. The luminance data for the restored A through D pixels is hereafter recorded as $Y_A'$ through $Y_D'$. More specifically, a value for the minimum luminance data Ymin is utilized as luminance data for pixels shown as the minimum by way of the address data. Also, luminance data for other pixels can be restored by adding this value to the minimum luminance data Ymin after performing 2 bit round-up processing to Ydist0 through Ydist2. In the present embodiment, the luminance data $Y_A'$ through $Y_D'$ is restored by applying the following formula:

$$Y_A' = Y\text{dist}0 \times 4 + Y\text{min} = 44 + 4 = 48,$$

$$Y_B' = Y\text{dist}1 \times 4 + Y\text{min} = 24 + 4 = 28,$$

$$Y_C' = Y\text{dist}2 \times 4 + Y\text{min} = 12 + 4 = 16,$$

$$Y_D' = Y\text{min} = 4.$$

The level values of the R, G, B sub-pixels in pixels A through D are restored from the luminance data $Y_A'$ through $Y_D'$ is and color difference data Cr' and Cb' by using the following matrix.

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} >> 2, \quad \text{[Formula 2]}$$

Here, ">>2" is an operator showing the 2 bit round-down processing. As can be understood from the above formula, the color difference data Cr' and Cb' are jointly utilized in restoring the level values of the R, G, B sub-pixels in pixels A through D.

The above restoration of the level values for the R sub-pixels, G sub-pixels, and B sub-pixels of the A through D pixels is now complete. Comparing the image data for pixels A through D in the right box in FIG. 31B, with the image data for pixels A through D in the left box in FIG. 31A allows understanding that the above decompression processing largely restores the original image data of pixels A through D.

3-6. Calculating the Error Data α

The calculation of the error data a, utilized in the (1×4) pixel compression, (2+1×2) pixel compression, (2×2) pixel compression is described next.

The error data α utilized in processing to reduce the bit planes that is implemented on each pixel as performed in (1×4) pixel compression and (2+1×2) pixel compression, is calculated from each pixel coordinate, and the basic matrix shown in FIG. 33. The basic matrix as referred to here is a matrix containing the relation between the lower 2 bits x1, x0 of the pixel x coordinate, the lower 2 bits y1, y0 of the y coordinate, and the basic value Q of the error data α. The basic value Q is a value utilized in the seed for calculating the error data α.

More specifically, the basic value Q is extracted from the elements in the basic matrix based on the lower 2 bits x1, x0 of the x coordinate, and the lower 2 bits y1, y0 of the y coordinate of the target pixels. The pixel A for example is a target for reducing of the bit plane, and when the lower 2 bits of the relevant A coordinate are "00", then "15" is extracted as the basic value Q.

After processing to reduce the bit planes, the basic value Q is processed as shown below according to the number of bits in the round-down processing, and the error data α is in this way calculated.

α=Q×2,(number of bits is 5 in bit round-down processing)

α=Q,(number of bits is 4 in bit round-down processing)

α=Q/2,(number of bits is 3 in bit round-down processing)

The error data α utilized in processing to calculate the typical value of high correlation image data for two pixels implemented in (2+1×2) pixel compression and (1×4) pixel compression, is calculated from the lower 2 bits x1, y1 of the x coordinate and y coordinate of the relevant target two pixel, and the basic matrix shown in FIG. 33. More specifically, which pixel in the target block to use as the pixel for extracting the basic value Q is determined according to the target two pixel combination contained in the target block. The pixel utilized in extracting the basic value Q is hereafter described as the Q extraction pixel. The target two pixel combination and the relation with the Q extraction pixel are as follows.

When target 2 pixels are pixels A and B: Q extraction pixel is pixel A

When target 2 pixels are pixels A and C: Q extraction pixel is pixel A

When target 2 pixels are pixels A and D: Q extraction pixel is pixel A

When target 2 pixels are pixels B and C: Q extraction pixel is pixel B

When target 2 pixels are pixels B and D: Q extraction pixel is pixel B

When target 2 pixels are pixels C and D: Q extraction pixel is pixel B

Moreover, the basic value Q corresponding to the Q extraction pixel is extracted from the relevant basic matrix according to the lower 2 bits x1, y1 of the x coordinate and y coordinate of the target two pixels. For example when the target two pixels are the pixels A and B, the Q extraction pixel is pixel A. In this case, the finally utilized basic value Q is decided as follows according to x1, y1 from among the four basic values Q corresponding to pixel A which is the Q extraction pixel in the basic matrix.

Q=15,(x1=y1="0")

Q=01,(x1="1",y1="0")

Q=07,(x1="0",y1="1")

Q=13.(x1=y1="1")

The following operation is implemented on the basic value Q according to the number of bits of the bit round-down processing performed subsequently in the process to calculate the typical value. The error data α utilized to calculate the typical value of the high correlation image data for two pixels is in this way calculated.

α=Q/2,(Number of bits is 3 in bit round-down processing)

α=Q/4,(Number of bits is 2 in bit round-down processing)

α=Q/8,(Number of bits is 1 in bit round-down processing)

When for example for a target two pixels A and B, x1=y1="1", and the number of bits in the round-down processing is 3, the error data α is determined by the following formula.

Q=13,

α=13/2=6

The method for calculating the error data α is not limited to the above described method. Other matrices such as the Bayer matrix may for example be utilized as the basic matrix.

3-7. Compression Type Recognition Bit

One important item to note in the above described compression methods is the number of bits allotted for the compression type recognition bit in the compression data. In contrast to the present embodiment where the compression data was fixed at 48 bits, the compression type recognition bit is variable between 1 through 4 bits. More specifically, the compression type recognition bits for (1×4) pixel compression, (2+1×2) pixel compression, (2×2) pixel compression, (4×1) pixel compression are as follows.

(1×4) pixel compression: "0" (1 bit)

(2+1×2) pixel compression: "10" (2 bits)

(2×2) pixel compression: "110" (3 bits)

(4×1) pixel compression: "1110" (4 bits)

One should be aware that the lower the correlation in image data for pixels in a target block, the fewer the number of bits assigned to the compression type recognition bit; and that the higher the correlation in image data for pixels in a target block, the larger the number of bits assigned to the compression type recognition bit.

Setting the number of bits for compression data at a fixed number regardless of the compression method is effective in simplifying the data transfer sequence when transferring data to the source driver 4.

Assigning the lower the correlation in image data of pixels in the target block, a smaller number of bits (namely, the number of bits assigned to image data is large) to the compression type recognition bit, is effective in reducing the overall compression distortion. When there is a high correlation in image data for pixels in the target block, the number of bits assigned to the image data can still be compressed while reducing deterioration in the image. On the other hand, when there is a low correlation in image data of pixels in the target block, a larger number of bits are assigned to the image data to in this way reduce compression distortion.

The invention rendered by the present inventors was specifically described based on the embodiments however the present invention is not limited to these embodiments and may include all manner of adaptations and not departing from the spirit and scope of the present invention.

In the above description for example, the present invention was described as applicable to display devices including a liquid crystal display panel, however the invention is also applicable to other display devices including display panels such as organic EL (electroluminescent) panels or plasma display panels. The delta placement described in the second embodiment is in particular widely employed in organic EL display panels, and the operation described in the second embodiment is especially suitable for display devices including organic EL display panels.

What is claimed is:

1. A display device comprising:

a plurality of pixels including a plurality of sub-pixels respectively corresponding to different colors, and a plurality of source lines;

a driver configured to drive the source lines; and a controller configured to compress image data showing the level of the sub-pixel and generate compression data, and supply transfer data including the compression data to the driver, wherein the controller includes:

a first sorter circuit configured to perform a first sorting process to sort data included in the image data in at least one of either a time sequence or a spatial sequence; and a compression circuit to perform compression processing on the first sorted image data output from the sorter circuit to generate the compression data, wherein the compression processing performs different processes on the image data of the sub-pixels corresponding to different colors, and wherein the driver includes:

a decompression circuit to decompress the compression data included in the transfer data and generate decompression data;

a second sorter circuit configured to perform a second sorting process on the decompression data to sort the image data in at least either a time sequence or a spatial sequence to generate second sorted image data; and a display driver circuit configured to drive the source line in response to the second sorted image data, wherein when performing the compression processing on image data corresponding to a plurality of specified pixels, one among the specified pixels includes a dummy sub-pixel not utilized in the display, wherein, when the number of a certain color sub-pixel among sub-pixels included in the specified pixels is fewer than the other color sub-pixels, the first sorter circuit in the first sorting process inserts copied image data copied from the specified sub-pixel image data for any of a certain color sub-pixel into the first sorted image data.

2. The display device according to claim 1, wherein the first sorter circuit performs the first sorting process in response to a sorting control signal generated corresponding to the color placement of the sub-pixel in the display device.

3. The display device according to claim 1, wherein the controller generates color placement data corresponding to the details of the first sorting process, inserts the color placement data into the transfer data, and sends the transfer data to the driver, and wherein the second sorter circuit of the driver performs the second sorting process according to the color placement data.

4. The display device according to claim 1, wherein the compression circuit performs compression processing on units of pixels, and wherein, when the number of the certain color sub-pixel among sub-pixels included in the specified pixels is fewer than the other color sub-pixels, the first sorter circuit in the first sorting process inserts copied image data copied from the specified sub-pixel image data for any of the certain color sub-pixel into the first sorted image data instead of the dummy data corresponding to the dummy sub-pixel; and the second sorter circuit in the second sorting process, assigns copied image data as the second sorted image data corresponding to the dummy sub-pixel.

5. The display device according to claim 4, wherein the specified sub-pixel is the sub-pixel closest to the dummy sub-pixel among the sub-pixels of the certain color.

6. The display device according to claim 1, wherein the compression processing is performed in units of α pixels, and wherein, when the number N of pixels corresponding to the driver of each horizontal line is divided by α and there is a surplus β, the first sorter circuit inserts copied image data copied from image data of (α−β) pixels, into the first sorted image data in the first sorting process, and wherein none of the data among the decompressed data corresponding to the copied image data is utilized to drive the source line.

7. The display device according to claim 1, wherein the display device includes a plurality of drivers, wherein the drivers are jointly coupled to a path to send the transfer data, wherein the drivers include a first driver and a second driver to drive the source line in a region adjacent to the display device, wherein the compression circuit performs the compression processing in units of pixels, wherein, when the pixels corresponding to the compression data includes a pixel corresponding to the first driver and a pixel corresponding to the second driver, both the first driver and the second driver insert the compression data, wherein the second sorter circuit of the first driver generates the second sorted image data from data corresponding to the pixel corresponding to the first driver among the decompression data, and wherein the second sorter circuit of the second driver generates second sorted image data from data corresponding to the pixel corresponding to the second driver among the decompression data.

8. The display device according to claim 1, wherein, when the number of the certain color sub-pixel among sub-pixels included in the specified pixels is fewer than the other color sub-pixels, the first sorter circuit in the first sorting process inserts copied image data copied from the specified sub-pixel image data for any of the certain color sub-pixel into the first sorted image data instead of the dummy data corresponding to the dummy sub-pixel.

9. The display device according to claim 1, wherein the sub-pixels corresponding to different colors includes a sub-pixel of a first color, a sub-pixel of a second color, and a sub-pixel of a third color, and wherein the compression processing in the compression circuit is performed differently among the image data of the sub-pixel of the first color, image data of the sub-pixel of the second color, and the image data of the sub-pixel of the second color.

10. The display device according to claim 1, wherein the second sorter circuit in the second sorting process, assigns copied image data as the second sorted image data corresponding to the dummy sub-pixel.

11. The display device according to claim 1, wherein the controller comprises a control circuit.

12. A driver to drive a display device including a plurality of pixels including a plurality of sub-pixels corresponding to different colors, and a plurality of source lines in response to transfer data including the compression data generated by performing a first sorting process to sort data included in the image data in at least one of either a time sequence or a spatial sequence; and compression processing to perform different processing on image data of sub-pixels corresponding to different colors for the image data, the driver comprising:

a decompression circuit to decompress the compression data included in the transfer data and generate decompression data;

a sorter circuit configured to implement a second sorting process on the decompression data in at least one of either a time sequence or a spatial sequence to generate the sorted image data; and a display driver circuit configured to drive the source line in response to the sorted image data, wherein, when performing the decompression processing on image data corresponding to a plurality of specified pixels, one among the specified pixels includes a dummy sub-pixel not utilized in the display wherein, when the number of a certain color sub-pixel among sub-pixels included in the specified pixels is fewer than the other color sub-pixels, the first sorter circuit in the first sorting process inserts copied image data copied from the specified sub-pixel image data for any of a certain color sub-pixel into the first sorted image data.

13. The driver according to claim 12, wherein the transfer data includes color placement data corresponding to the details of the first sorting process, and wherein the second sorter circuit implements a second sorting process in response to the color placement data.

14. The driver according to claim 12, wherein the decompression circuit performs decompression processing on units of pixels, and wherein the second sorter circuit in the second sorting process, assigns copied image data as the second sorted image data corresponding to the dummy sub-pixel.

15. A display device comprising:

a plurality of pixels including a plurality of sub-pixels respectively corresponding to different colors, and a plurality of source lines;

a driver configured to drive the source lines; and a controller configured to compress image data showing the level of the sub-pixel and generate compression data, and supply transfer data including the compression data to the driver, wherein the controller includes:

a first sorter circuit configured to perform a first sorting process to sort data included in the image data in at least one of either a time sequence or a spatial sequence; and a compression circuit to perform compression processing on the first sorted image data output from the sorter circuit to generate the compression data, wherein the compression processing performs different processes on the image data of the sub-pixels corresponding to different colors, wherein when performing the compression processing or the decompression processing on image data corresponding to a plurality of specified pixels, one among the specified pixels includes a dummy sub-pixel not utilized in the display, and wherein, when the number of a certain color sub-pixel among sub-pixels included in the specified pixels is fewer than the other color sub-pixels, the first sorter circuit in the first sorting process inserts copied image data copied from the specified sub-pixel image data for any of a certain color sub-pixel into the first sorted image data.

16. The display device according to claim 15, wherein the first sorter circuit performs the first sorting process in response to a sorting control signal generated corresponding to the color placement of the sub-pixel.

17. The display device according to claim 15, wherein the compression circuit performs compression processing on units of pixels, and wherein, when the number of the certain color sub-pixel among sub-pixels included in the specified pixels is fewer than the other color sub-pixels, the first sorter circuit in the first sorting process inserts copied image data copied from the specified sub-pixel image data for any of the certain color sub-pixel into the first sorted image data instead of the dummy data corresponding to the dummy sub-pixel.

18. The display device according to claim 15, wherein the driver includes:

a second sorter circuit configured to perform a second sorting process on the decompression data to sort the image data in at least either a time sequence or a spatial sequence to generate second sorted image data.

19. The display device according to claim 18, wherein the controller generates color placement data corresponding to the details of the first sorting process, inserts the color placement data into the transfer data, and sends the transfer data to the driver, and wherein the second sorter circuit of the driver performs the second sorting process according to the color placement data.

20. The display device according to claim 18, wherein the compression circuit performs compression processing on units of pixels, and wherein, the second sorter circuit in the second sorting process, assigns copied image data as the second sorted image data corresponding to the dummy sub-pixel.

* * * * *